(12) United States Patent
Xia et al.

(10) Patent No.: US 12,270,995 B2
(45) Date of Patent: *Apr. 8, 2025

(54) WAVEGUIDE WITH FOUR GRADIENT COATING

(71) Applicant: Envisics Ltd, Milton Keynes (GB)

(72) Inventors: Yiren Xia, Milton Keynes (GB); Timothy Smeeton, Milton Keynes (GB)

(73) Assignee: ENVISICS LTD, Milton Keynes (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,594

(22) Filed: Aug. 31, 2023

(65) Prior Publication Data

US 2024/0111153 A1 Apr. 4, 2024

Related U.S. Application Data

(63) Continuation-in-part of application No. 18/141,311, filed on Apr. 28, 2023, now Pat. No. 11,852,832.

(30) Foreign Application Priority Data

Sep. 27, 2022 (GB) .................................... 2214069

(51) Int. Cl.
*G02B 27/01* (2006.01)
*F21V 8/00* (2006.01)
*G02B 27/00* (2006.01)

(52) U.S. Cl.
CPC ....... *G02B 27/0103* (2013.01); *G02B 6/0035* (2013.01); *G02B 6/0055* (2013.01);
(Continued)

(58) Field of Classification Search
CPC .................. G02B 27/01; G02B 27/017; G02B 27/0172; G02B 27/0081; G02B 27/0103; G02B 2027/0109; G02B 6/0035; G02B 6/0055

See application file for complete search history.

(56) References Cited

U.S. PATENT DOCUMENTS 9,772,449 B2 * 9/2017 Sugama ................. G02B 6/428
2003/0190126 A1 * 10/2003 Toyoshima ........ G02B 6/29367
385/27

(Continued)

OTHER PUBLICATIONS

Combined Search and Examination Report in United Kingdom, Patent Application No. GB2214069.3, dated Mar. 21, 2023.
Copending U.S. Appl. No. 18/141,311, filed Apr. 28, 2023.

*Primary Examiner* — Robin J Mishler
*Assistant Examiner* — Cory A Almeida
(74) *Attorney, Agent, or Firm* — McDonnell Boehnen Hulbert & Berghoff LLP

(57) ABSTRACT

A waveguide includes a pair of complementary surfaces arranged to provide waveguiding therebetween. A first surface of the pair of complementary surfaces includes a plurality of first layers and a plurality of second layers. Each first layer includes a first dielectric. Each second layer includes a second dielectric. Each first and second layer has a first end and a second end. A percentage change in the thickness of each layer from the first end to the second end of that layer has one of a plurality of discrete allowable values. The total number of first and second layers is greater than the total number of discrete allowable values. A difference in refractive index between the first dielectric and second dielectric is greater than 0.4.

23 Claims, 24 Drawing Sheets

(52) U.S. Cl.
CPC ...... *G02B 27/0172* (2013.01); *G02B 27/0081* (2013.01); *G02B 2027/0109* (2013.01)

(56) References Cited

U.S. PATENT DOCUMENTS

| | | |
|---|---|---|
| 2014/0140654 A1 | 5/2014 | Brown |
| 2015/0116721 A1 | 4/2015 | Kats |
| 2016/0041387 A1* | 2/2016 | Valera ................. G02B 6/0055 385/36 |
| 2022/0121028 A1* | 4/2022 | Smeeton ................. G03H 1/02 |
| 2022/0283371 A1 | 9/2022 | Tekolste et al. |

* cited by examiner

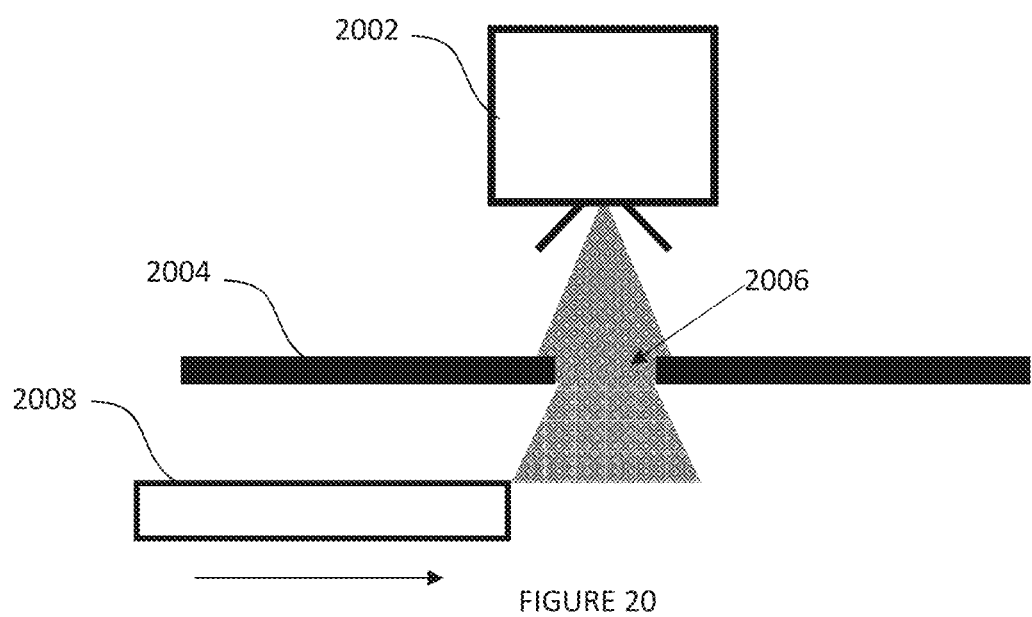
FIGURE 20
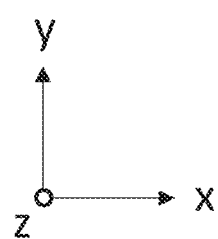

WAVEGUIDE WITH FOUR GRADIENT COATING

CROSS-REFERENCE TO RELATED APPLICATIONS

This application is a continuation-in-part of U.S. application Ser. No. 18/141,311 and claims the benefit of priority of United Kingdom Patent Application No. 2214069.3 filed Sep. 27, 2022, each of which is hereby incorporated herein by reference in its entirety.

FIELD

The present disclosure relates to pupil expansion or hologram replication. More specifically, the present disclosure relates to a waveguide, a display system comprising at least one waveguide according to the disclosure, methods of hologram replication using the at least one waveguide and a method of waveguiding a holographic wavefront. Yet more specifically, the present disclosure relates to a method of improving the uniformity of hologram replicas output by a waveguide and an optical component—such as an optical layer, dielectric layer or dielectric stack—for the same.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other embodiments, the image is a real image formed by holographic reconstruction and the image is projected or relayed to the viewing plane. The image is formed by illuminating a diffractive pattern (e.g., hologram) displayed on the display device.

The display device comprises pixels. The pixels of the display device diffract light. In accordance with well-understood optics, the magnitude of the maximum diffraction angle is determined by the size of the pixels (and other factors such as the wavelength of light).

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some examples, an image (formed from the displayed hologram) is propagated to the eyes. For example, spatially modulated light of an intermediate holographic reconstruction/image formed either in free space or on a screen or other light receiving surface between the display device and the viewer, may be propagated to the viewer.

In some other examples, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-motion box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e. size of the array of pixels). Embodiments of the present disclosure relate to a configuration in which a hologram of an image is propagated to the human eye rather than the image itself. In other words, the light received by the viewer is modulated according to a hologram of the image. However, other embodiments of the present disclosure may relate to configurations in which the image is propagated to the human eye rather than the hologram—for example, by so called indirect view, in which light of a holographic reconstruction or "replay image" formed on a screen (or even in free space) is propagated to the human eye.

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye-box) is the area in which a viewer's eyes can perceive the image. The present disclosure relates to non-infinite virtual image distances—that is, near-field virtual images—but is equally applicable to virtual images formed at infinity or even real images formed downstream of the display device/hologram.

Conventionally, a two-dimensional pupil expander comprises one or more one-dimensional optical waveguides each formed using a pair of opposing reflective surfaces, in which the output light from a surface forms a viewing window—e.g., eye-box or eye motion box for viewing by the viewer. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field or wavefront in accordance with this disclosure—a hologram is configured to route light into a plurality of channels, each channel corresponding to a different part (i.e. sub-area) of an image. The hologram may be represented, such as displayed, on a display device such as a spatial light modulator. When displayed on an appropriate display device, the hologram may spatially modulate light transformable by a viewing system into the image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram is described herein as routing light into a plurality of hologram channels merely to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be arbitrarily divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels. However, in some arrangements, a plurality of spatially separated hologram channels is formed by intentionally leaving areas of the target image, from which the hologram is calculated, blank or empty (i.e., no image content is present).

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

Broadly, a system is disclosed herein that provides pupil expansion for an input light field, wherein the input light field is a diffracted or holographic light field comprising diverging ray bundles. As discussed above, pupil expansion (which may also be referred to as "image replication" or "replication" or "pupil replication") enables the size of the area at/from which a viewer can see an image (or, can receive light of a hologram, which the viewer's eye forms an image) to be increased, by creating one or more replicas of an input light ray (or ray bundle). The pupil expansion can be provided in one or more dimensions. For example, two-dimensional pupil expansion can be provided, with each dimension being substantially orthogonal to the respective other. In embodiments in which the wavefront is a holographic wavefront, the process may be described as hologram replication.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

The spatial light modulator may be arranged to display a hologram. The diffracted or diverging light may comprise light encoded with/by the hologram, as opposed to being light of an image or of a holographic reconstruction. In such embodiments, it can therefore be said that the pupil expander replicates the hologram or forms at least one replica of the hologram, to convey that the light delivered to the viewer is spatially modulated in accordance with a hologram of an image, not the image itself. That is, a diffracted light field is propagated to the viewer.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye-box within which a viewer's eye can be located, in order to see/receive light that is output by the system.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

As above, an optical waveguide for use as a pupil expander may lightguide a light field between a pair of parallel surfaces. This may be achieved by internal reflection between the parallel surfaces. A first surface of the pair of surfaces may be partially transmissive-reflective. A second surface of the pair of surfaces may be reflective. The light field will therefore be divided at each internal reflection at the first surface such that a plurality of replicas of the light field is transmitted through a region of the first surface that forms an output port of the waveguide. Thus, a viewing window (and eye-box) is enlarged by the waveguide.

The intensity and spectrum of each successive replica emitted by the waveguide is preferably substantially constant from replica to replica. For example, an integral of the intensity of the light of each replica may be substantially constant, a mean average of the intensity of the light of each replica may be substantially constant and/or a distribution of the intensity of the light of each replica may be substantially constant. Replicas having substantially constant intensity and spectra are referred to herein as being spatially homogenous and a waveguide emitting such replicas is referred to herein as providing spatially homogenous emission. Spatially homogenous replicas advantageously reduce or minimize the variability in the brightness of the image perceived (or different areas thereof) by a viewer moving around the (expanded) viewing window. Furthermore, the overall quality of the hologram received by the viewer (and/or the resulting image perceived by the viewer) may be improved, particularly if the hologram comprises a plurality of different wavelengths of light.

The intensity of the light being waveguided between the first and second surfaces of the waveguide will decrease after each division of the light field at the first surface. A conventional waveguide may typically comprise a first surface with constant transmissivity. This results in the intensity of each successive replica decreasing. In other words, such conventional waveguides do not provide spatially homogenous emission.

A graded coating can be applied to the waveguide to provide a first surface having a varying transmissivity. In particular, the coating may be arranged so that the transmissivity of the first surface increases in the direction of waveguiding. The graded coating may be arranged such that the increased transmissivity of the first surface in the direction of waveguiding accounts (e.g. at least partially compensates) for the decrease in the intensity of light being lightguided. However, current graded coatings often result in high absorption losses of the waveguided light. Furthermore, these coatings typically allow for very limited control of spectral performance, particularly disadvantageous when the light to be waveguided comprises multiple wavelengths. While some improved graded coatings are available, these are expensive, time consuming and complex to manufacture and generally cannot be manufactured reliably. For example, such coatings may comprise a plurality (often 20 or more) layers of dielectric material, each layer having a unique percentage change of the thickness from a first end of the layer to a second end. Such a complex layered structure may be necessary to provide substantially spatially homogenous emission for the full visible spectrum but is slow to manufacture and difficult to manufacture reliably (for example, a moving grader may be required to be present in the coating chamber).

The present disclosure addresses a technical problem of providing a spatially homogenous emission from a waveguide pupil expander such that the intensity and spectrum of each replica is substantially similar. The present disclosure proposes an improved waveguide pupil expander which provides substantially homogeneous emission at least at specific wavelengths such as a red, green and blue wavelength. A first surface of the waveguide comprises a plurality of alternating layers of a first and a second dielectric that differ in refractive index. Instead of each layer having a unique percentage change of thickness, in the present disclosure each layer of dielectric has a percentage change of thickness having one of a discrete number of values, the number of discrete values being less than the total number of layers. In some embodiments, the number of discrete or allowable values is no more than four. In some embodiments, the number of layers is at least twice the number of discrete values.

The multilayer structure resulting from conventional design techniques is very complex and has low suitability for industrial scale-up. The complexity is partly caused by the need to achieve uniformity at three different wavelengths. The inventors have rethought the design process and focused on restricting it in ways that simplify the manufacturing method that will be needed and relaxing it in other ways that do not impact the image-forming (e.g. holographic) process. In particular, the inventors have focused on how the required coating machine may be simplified. The inventors have found that if the number of different gradients used in the stack is restricted (e.g. reduced to less than five or even less than four or three) and degrees of freedom are introduced for intermediate wavelengths (e.g. wavelengths between the three hologram wavelengths), adequate optical performance for three-colour hologram replication can be still be achieved. The cost of manufacture is significantly reduced because the number of different grading tools is reduced.

The inventors have found that faster and more reliable methods of manufacture can be used to produce the stack of layers of the present disclosure compared to conventional methods needed to produce a stack of layers where each layer has a unique percentage change of thickness. The inventors have appreciated that, by limiting the design of the waveguide coating to consider only specific regions of the visible spectrum, such an alternating stack of layers according to the present disclosure can be arranged to provide desirable optical performance such as spatially homogenous emission and low absorption losses at those wavelengths (but not necessarily at other wavelengths). As such, the waveguide of the present disclosure may be particularly suitable for applications in which specific wavelengths of light are to be waveguided rather than a full optical spectrum. For example, in many applications, there may be a need for spatially homogenous emission of red, green and/or blue light from the waveguide, but not other wavelengths (such as in the yellow region of the spectrum). Such applications include head-up displays. The waveguide of the present disclosure may be suitable for such applications. As the skilled person will appreciate, a full colour image can be generated using red, green and blue light.

According to a first aspect, a waveguide is provided. The waveguide comprises a pair of parallel/complementary surfaces arranged to provide waveguiding therebetween. A first surface of the pair of parallel/complementary surfaces comprises a plurality of layers. The plurality of layers may be said to comprise a plurality of layers of a first dielectric and a plurality of layers of second dielectric. The plurality of layers may comprise a plurality of first layers. Each of the plurality of first layers may comprise the first dielectric. The plurality of layers may comprise a plurality of second layers. Each of the plurality of second layers may comprise the second dielectric. The plurality of layers of the first and second dielectric may form part of a stack of dielectric layers. The plurality of layers of the first and second dielectric may be arranged in an alternating configuration. As used herein, a "layer of [first or second] dielectric" may mean that the respective layer comprises the respective dielectric. In some embodiments, the respective layer may consist of the respective material. In some embodiments, the respective layer may comprise one or more further materials (in addition to the respective dielectric material). Thus, in such embodiments, the respective layer may not consist of the [first or second] respective dielectric.

Each (first and second) layer (of the first and second dielectric) has a first end and a second end. The first end may be a (light) input end and the second end may be a (light) output end for the final replica or the end of an output port/window. A percentage change in the thickness of each layer from the first end to the second end of that layer has one of a plurality of discrete (e.g. allowable) values. The total number of layers is greater than the total number of discrete values. As used herein, the "total number of layers" refers to the total number of the plurality of layers. This may include the total number of first layers/layers comprising a first dielectric and the total number of second layers/layers comprising a second dielectric. In some embodiments, the total number of layers is equal to the sum of the number of first layers and the number of second layer or the sum of the number of layers of first dielectric and the number of layers of second dielectric. A difference in refractive index between the first dielectric and second dielectric is greater than 0.4, optionally greater than 0.5. The difference in refractive index may refer to a maximum difference in refractive index between the first dielectric and second dielectric.

References to "percentage change in the thickness" of a layer herein refer to the percentage change in thickness of that layer from the first end of that layer to the second end of that layer, unless specified otherwise. The percentage change in the thickness of a layer may be: $100 \times (t_f - t_i)/t_i$, wherein $t_i$ is the thickness of the respective layer at the first end and $t_f$ us the thickness of the respective layer at the second end. In some embodiments, the thickness of a layer may refer to a physical thickness of the respective layer. In some embodiments, the thickness may refer to an optical thickness of the layer or the optical path length. Thus, the thickness may refer to a physical path length through the layer at a given position multiplied by the refractive index of the layer at that given position. If the refractive index of the layer is constant from the first end to the second end, then the optical thickness/optical path length may correspond to the physical thickness of the respective layer from the first end to the second end. Thus, herein, references to thickness may refer to the optical path length and the percentage change in thickness may refer to a percentage change in optical path length.

Generally, each layer of the plurality of layers may be parallel to the other layers. The first end of each of layer may be aligned with the first end of the other layers and the second end of each layer may be aligned with the other layers. In other words, each layer may have a substantially similar length and/or width as the other layers but may differ in thickness or depth. The plurality of layers of the first and second dielectric may be referred to as a stack of layers or, simply, dielectric stack.

As used herein, the "alternating configuration" of the layers of the first and second dielectric means that each layer of the first dielectric is separated from the next closest layer(s) of first dielectric by a layer of the second dielectric, and vice versa.

As used herein, the plurality of discrete values means a plurality of values that are different to one another. In other words, none of the plurality of discrete values is the same as any other of the discrete values. The magnitude and/or the polarity of each of the discrete values may be different. The discrete values may be referred to as "allowable" or "predetermined" values. The rate of change of the thickness of each layer may be selected during, or determined by, the manufacturing process. For example, if the plurality of layers of the first surfaces of the waveguide are manufactured or fabricated using a shadow mask, the rate of change of the thickness of each layer may be related to the shape of the shadow mask such that each discrete value is associated with a respective shadow mask. The skilled person will appreciate that the "allowable" or "predetermined" discrete values may take any appropriate value that provides desirable optical properties in the context of a particular multi-layer structure of first and second dielectrics and that appropriate values could be calculated or determined, for example using simulations. Each discrete value may be positive or negative. A positive values means that the thickness is increasing from the first end to the second end and a negative value means that the thickness is decreasing from the first end to second end.

Each layer has a percentage change of thickness that is equal to one of the plurality of discrete values. Because there are more layers than there are discrete values, at least two of the layers will have the same percentage change of thickness from the respective first end to the respective second end. In some embodiments, more than two, optionally four or more, optionally 6 or more, optionally 8 or more, optionally 10 or more layers of the plurality of layer may have the same percentage change of thickness from the respective first end to the respective second end (and so these layers may be associated with the same discrete value). In some embodiments, the layers that have the same percentage change of thickness as each other are layers of the same dielectric (i.e. all layers having a particular percentage change of thickness value are layers of the first dielectric or layers of the second dielectric).

Each of the layers of the first or second dielectric may increase or decrease in (optical) thickness in the direction of waveguiding. A first direction may be defined from the first end to the second end of each of the plurality of layers. The pair of parallel surfaces may be arranged to provide waveguiding in the first direction. In other words, light waveguided by the pair of surfaces may interact with the first end before interacting with the second end. Furthermore, each of the layers of the first or second dielectric may increase or decrease in thickness in the first direction.

When a layer increases in (optical) thickness from the respective first end to the respective second end, the percentage change in (optical) thickness from the first end to the second end of that layer may be positive. The discrete value associated with such a layer may be positive. When a layer decreases in (optical) thickness from the respective first end to the respective second end, the percentage change in (optical) thickness from the first end to the second end of that layer may be negative. The discrete value associated with such a layer may be negative.

The minimum (optical) thickness of each of the plurality of (first and second) layers of the (first and second) dielectric, as well as the discrete values for the percentage change in thickness, may be selected to provide a waveguide with desired optical properties, in particular with a desired transmissive behavior such that a spatially homogenous emission is generated. The parameters may depend on (among other things) the material properties (in particular, the refractive index) of the first and second dielectric, the angle of incidence of light entering the waveguide, the wavelength(s) of the incident light and the distance between the pair of parallel surfaces of the waveguide. As will appreciated by the skilled person, there will be a plurality (usually a relatively large number) of arrangements of the plurality of layers that provide a waveguide with desired optical properties. However, common to all of these arrangements are the advantages that the layered structure of the first surface provides desired optical properties and can be manufactured quickly, inexpensively and reliably.

One example of a fast, inexpensive and reliable method of manufacturing the (first and second) layers of the (first and second dielectric) may comprise forming the layers by depositing the respective dielectric material on a waveguide substrate. A shadow mask may be used to control the flow of the dielectric material onto the substrate. Preferably, a shadow mask with a trapezoidal shape may be used. The percentage change in thickness of each layer may be determined by the shape of the mask and the overall thickness of each layer may be determined by the length of time that the dielectric material is allowed to flow. When the mask is trapezoidal, the percentage change in thickness of each layer may correspond to a percentage change in the short base to the long base of the trapezoid shape of the shadow mask. A different mask may be associated with each of the discrete values. For example, if there are first to fourth percentage change values then four different masks may be used to manufacture the layers of the coating. The waveguide substrate may advantageously simply be moved between different material sources having different masks.

The plurality of discrete values may comprise or consist of two or more discrete (allowable) values, optionally three or more (allowable) discrete, optionally four or more (allowable) values. The plurality of discrete values may consist of between two and six discrete values, optionally between two and four discrete values, optionally four discrete values. The number of discrete values may preferably be considerably lower than the total number of layers. For example, in some embodiments the total number of layer may be at least 10 layer, optionally at least 15 layers, optionally at least 20 layers.

The plurality of discrete values may comprise a first value, a second value and a third value. Each (first) layer (of the first dielectric) may have a percentage change in thickness equal to either the first value or the second value. In other words, there may only be two options for percentage change in the thickness of each (first) layer of the first dielectric.

At least one (second) layer of the (second) dielectric may have a percentage change in the thickness equal to the third value. When each of the layers of the first dielectric have either the first discrete value or the second discrete value, this may mean that at least one layer of the second dielectric has a different percentage change in thickness to all of the layers of the first dielectric.

In addition to the first to third values, the plurality of discrete values may comprise a fourth value. Each layer of the second dielectric may have a percentage change in thickness equal to either the third value or a fourth value. In other words, there may only be two options for the percentage change in the thickness of each layer of the second dielectric. When each of the layers of the first dielectric have either the first discrete value or the second discrete value, this may mean that each layer of the second dielectric has a different percentage thickness to all of the layers of the first dielectric.

Preferably, the rate of change of the thickness (e.g. optical and/or physical thickness) of each layer of the first and second dielectrics may be constant. When the rate of change of the physical thickness of each layer is constant, each of the layers may have a linear profile. It may be simpler to manufacture dielectric layers having a linear profile. Furthermore, the skilled person will appreciate that it may be more straightforward to calculate/determine discrete allowable values for a stack of layers having a linear profile.

The waveguide may be arranged to waveguide a light field that is input at a second surface of the pair of parallel surfaces of the waveguide. The light field may be generated by a display device. The waveguide may be arranged to receive the light field from the display device. The light field may comprise diffracted light. The light field may be encoded with a hologram.

The waveguide may be referred to as a waveguide pupil expander. In some embodiments, the pair of parallel/complementary surfaces are elongate or elongated surfaces, being relatively long along the first dimension and relatively short along a second dimension, for example being relatively short along each of two other dimensions, with each dimension being substantially orthogonal to each of the respective others.

In some embodiments, the first surface of the waveguide may be partially reflective-transmissive. In some embodiments, a second surface of the pair of parallel surfaces of the waveguide may be substantially fully reflective. In this way, light that is waveguided between the first and second surfaces of the waveguide may be reflected by each of the first and second surfaces. At each reflection on the first surface, the light field may be divided such that a portion of the light field is transmitted out of the waveguide at each reflection point creating a replica of the input light field at each reflection point. The remaining light may be reflected by the first surface. In this way, the waveguide may act as a pupil expander.

In some embodiments, the first surface may provide a plurality, n, of light emission zones for light waveguided between the first surface and second surface. The plurality of light emission zones may be distributed along a length of the first surface, in the direction of waveguiding. A replica of the input wavefront may be generated at each emission zone. The first end of each layer of the first and second dielectric layer may be at or adjacent to the first light emission zone. The second end of each layer of the first and second dielectric later may be at or adjacent to the nth light emission zone.

An angle of internal incidence at each emission zones may be in the range 0 to 70 degrees, preferably in the range of 10 to 50 degrees.

In some embodiments, the transmissivity of the first surface increases in the direction of waveguiding. More specifically, in some embodiments, the transmissivity of the first surface at a first and second visible wavelength may increase in the direction of waveguiding. In embodiments, the first and second visible wavelength are different. In particular, a difference between the first and second visible wavelength may be at least 50 nanometers, optionally at least 70 nm. The transmissivity of the first surface at said first and second visible wavelengths may increase with distance from the first light emission zone to the nth light emission zone in order to maintain the intensity of the plurality of light emissions substantially constant at the first and second wavelengths. This may advantageously provide spatially homogenous emission of light from the waveguide (at the first and second wavelengths). In some embodiments, the transmissivity of the first surface at a third wavelength may increase in the direction of waveguiding (in addition to the transmissivity increasing for the first and second wavelengths). The transmissivity of the first surface at said third visible wavelength may increase with distance from the first light emission zone to the nth light emission zone in order to maintain the intensity of the plurality of light emission zones substantially constant at the first, second and third wavelength. As above, this may advantageously provide spatially homogenous emission of light from the waveguide (at first, second and third wavelength). In embodiments, the first, second and third visible wavelength are different. In particular, a difference between the first or second visible wavelength and the third visible wavelength may be at least 50 nanometers, optionally at least 70 nm.

At other wavelengths (i.e. not the first, second and, optionally, third visible wavelength), the transmissivity of the first surface may or may not increase in the direction of waveguiding. As previously described, the waveguide of the present disclosure may be particularly advantageous in the context of waveguiding light at discrete wavelengths, rather than waveguiding light having a continuous spectrum. The inventors have appreciated that the parameters such as thickness and the values for the percentage change of thickness of the plurality of layers of the first and second dielectrics may be selected to provide a desired changing transmissivity behavior at the first, second and third wavelengths only and that there may be no need for the layers to provide that same transmissivity behavior at other wavelengths. The inventors have found that by confining the problem of providing a changing transmissivity behavior to only certain wavelengths, a coating comprising multiple layers having the same rate of change of thickness can provide the desired transmissivity behavior which, as above, can be manufactured inexpensively, quickly and reliably while still providing acceptable transmissive properties.

The first wavelength, referred to above, may preferably be red visible light, for example in a range 630-670 nm. The second wavelength may preferably be green visible light, for example in a range 500-540 nm. The third wavelength may preferably be blue visible light, for example in the range 430-470 nm. In other words, the first wavelength may correspond to red visible light. The second wavelength may correspond to green visible light. The third wavelength may correspond to blue visible light.

Preferably, the transmissivity of the first surface at each emission point, T(n), may satisfy the following equation: $T(n)=(T(n-1))/([1-T(n-1)]\times[1-L])$ wherein L is an optical loss factor of the waveguide material.

The first dielectric may be a first oxide, fluoride, sulfide or nitrate of a first transition metal or semiconductor. The second dielectric may be a second oxide, fluoride, sulfide or nitrate of a second transition metal or semiconductor. In some embodiments, the first dielectric comprises silicon, titanium, tantalum, niobium or hafnium. In some embodiments, the second dielectric comprises another of silicon, titanium, tantalum, niobium or hafnium.

Each layer may have a thickness in the range 2 to 300 nm. The thickness of each layer may not fall outside of this range at any point between the first end and second end. In some embodiments, each layer may have a thickness in the range 20 to 300 nm.

A minimum thickness of each layer may be between 2 and 300 nm, optionally between 20 and 300 nm. A maximum thickness of each layer may be between 2 and 300 nm, optionally between 20 and 300 nm. The minimum thickness of each layer is less than the maximum thickness of that respective layer. The minimum or maximum thickness of each layer may be at the first end of that layer. The other of the minimum or maximum thickness of the respective layer may be at the second end of that layer.

At least one of the plurality of discrete values for the percentage change in thickness may be positive. At least one of the plurality discrete values of the percentage change in thickness may be negative.

A positive percentage change in thickness may indicate that the thickness of the respective layer increases from the first end to the second end. In other words, a positive percentage change in thickness may indicate that the thickness of the respective layer increases in the direction of waveguiding. A negative percentage change in thickness may indicate that the thickness of the respective decreases from the first end to the second end. In other words, a negative percentage change in thickness may indicated that the thickness of the respective layer decreases in the direction of waveguiding.

Each of the plurality of discrete values for the percentage change in thickness may be in the range −150% to +150%.

The number of layers of the plurality of layers may be at least 10, optionally at least 15, optionally at least 20. The number of layers of the plurality of layers may be in the range 10 to 30, optionally, 15-25.

In a second aspect, there is provided a holographic system. The holographic system comprises a display device. The display device is arranged to display a hologram of an image and to output spatially modulated light in accordance with the hologram. The holographic system also comprises at least a first waveguide according to the first aspect. In other words, the holographic system comprises a waveguide comprising a pair of parallel/complementary surfaces arranged to provide waveguiding therebetween, wherein a first surface of the pair of parallel surfaces comprises a plurality of layers. The plurality of layers may comprise a plurality of layers of a first dielectric and a plurality of layers of a second dielectric. The plurality of layers may comprise a plurality of first layers, each first layer comprising (or consisting of) the first dielectric. The plurality of layers may comprise a plurality of second layers, each second layer comprising (or consisting of) the second dielectric. The plurality of layers may be arranged in a stack. The plurality of layers may be arranged in an alternating configuration. A percentage change in the thickness of each layer from the first end to the second end of that layer has one of a plurality of discrete allowable values; wherein the total number of layers of the first and second dielectric is greater than the total number of discrete allowable values; and wherein a difference in refractive index between the first dielectric and second dielectric is greater than 0.4, optionally 0.5. The first waveguide is arranged to receive the light encoded with the hologram output by the display device at a second surface of the pair of parallel surfaces.

The plurality of discrete values may comprise or consist of two or more discrete (allowable) values, optionally three or more discrete, optionally four or more values. The plurality of discrete values may consist of between two and six discrete values, optionally between two and four discrete values, optionally four discrete values. The number of discrete values may preferably be considerably lower than the total number of layers. For example, in some embodiments the total number of layer may be at least 10 layer, optionally at least 15 layers, optionally at least 20 layers.

The plurality of discrete (allowable) values may comprise a first value, a second value and a third value. Each layer of the first dielectric may have a percentage change in thickness equal to either the first value or the second value. In other words, there may be two options for percentage change in the thickness of each layer of the first dielectric.

At least one layer of the second dielectric may have a percentage change in the thickness equal to the third value. When each of the layers of the first dielectric have either the first discrete value or the second discrete value, this may mean that at least one layer of the second dielectric has a different percentage change in thickness to all of the layers of the first dielectric.

In aspects, the display device is part of a display system of the holographic system. The display device may be a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one waveguide pupil expander.

In some embodiments, the light field is spatially-modulated in accordance with a hologram. In other words, in such aspects, the light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The holographic system may comprise a second waveguide. Like the first waveguide, the second waveguide may comprise a pair of parallel surfaces arranged to provide waveguiding therebetween. A first surface of the pair of parallel surfaces of the second waveguide may by partially reflective-transmissive. A second surface of the pair of parallel surfaces of the second waveguide may be reflective. At least a portion of the first surface may be referred to or define an output of the second waveguide. At least a portion of the second surface may be referred to or define an input of the second waveguide. The second waveguide may be referred to as a second pupil expander. The second waveguide may be orthogonal to the first waveguide.

The first surface of the pair of parallel surfaces of the second waveguide may provide a plurality, n, of light emission zones for light waveguided between the first surface and second surface. An angle of internal incidence at each emission zones may be in the range 0 to 75 degrees, optionally 10 to 50 degrees.

The first surface (in particular, an output port) of the first waveguide may be coupled to an input port of a second waveguide. The second waveguide may be arranged to guide the light field—including some of, preferably most of, preferably all of, the replicas of the light field that are output by the first waveguide—from its input port to a respective output port by internal reflection between the pair of parallel surfaces of the second waveguide pupil expander.

The first waveguide may be arranged to provide pupil expansion, or replication, in a first direction and the second waveguide pupil expander may be arranged to provide pupil expansion, or replication, in a second, different direction. The second direction may be substantially orthogonal to the first direction. The second waveguide may be arranged to preserve the pupil expansion that the first waveguide has provided in the first direction and to expand (or, replicate) some of, preferably most of, preferably all of, the replicas that it receives from the first waveguide in the second, different direction. The second waveguide may be arranged to receive the light field directly or indirectly from the first waveguide. One or more other elements may be provided along the propagation path of the light field between the first and second waveguide pupil expanders.

The first waveguide may be substantially elongated and the second waveguide may be substantially planar. The elongated shape of the first waveguide may be defined by a length along a first dimension. The planar, or rectangular, shape of the second waveguide may be defined by a length along a first dimension and a width, or breadth, along a second dimension substantially orthogonal to the first dimension. A size, or length, of the first waveguide along its first dimension make correspond to the length or width of the second waveguide pupil expander along its first or second dimension, respectively. The second surface of the pair of parallel surfaces of the second waveguide, which comprises its input port, may be shaped, sized, and/or located so as to correspond to an area defined by the output port on the first surface of the first pair of parallel surfaces on the first waveguide pupil expander, such that the second waveguide is arranged to receive each of the replicas output by the first waveguide.

The first and second waveguide may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

The second waveguide may have one or more of the features of the waveguide described in relation to the first aspect. For example, the first surface of the second waveguide may comprise a plurality of layers of a first dielectric and a plurality of layers of a second dielectric. The plurality of layers of the first dielectric and second dielectric may be arranged in an alternating configuration. A percentage change in the thickness of each of layer of the first dielectric from a first end to a second end may have either a first value or a second value.

Each layer of the first and second dielectric may have a first end and a second end, wherein a percentage change in the thickness of each layer from the first end to the second end of that layer has one of a plurality of discrete allowable values; wherein the total number of layers of the first and second dielectric is greater than the total number of discrete allowable values. Preferably, a percentage change in the thickness of each layer of the second dielectric from the first end to a second end has either may have either a third value or a fourth value. A rate of change of the thickness of each layer of the first and second dielectric may be constant. A difference in the refractive index between the first dielectric and the second dielectric may be greater than 0.4, optionally 0.5.

The features of the waveguide of the first aspect, applied to the second waveguide, may provide the same advantages as have been described in relation to the first aspect. In particular, a second waveguide having a first surface comprising a layered structure, as described above, may provide spatially homogenous emission of a light field and may be manufactured in a relatively inexpensive, fast and reliable manner.

As above, the first surface of the second waveguide may provide a plurality, n, of light emission zones for light waveguided between the first surface and second surface. The transmissivity of the first surface at a first, second and third visible wavelength may increase with distance from the first light emission zone to the nth light emission zone in order to maintain the intensity of the plurality of light emissions substantially constant at the first, second and third wavelength. The first wavelength may be in the range 630-670 nm, the second wavelength may be in the range 500-540 nm and the third wavelength may be in the range 430-470 nm. The transmissivity of the first surface of the second waveguide at each emission point, T(n), may satisfy the following equation: $T(n)=(T(n-1))/([1-T(n-1)]\times[1-L])$ wherein L is an optical loss factor of the waveguide material. The first dielectric of the second waveguide may be a first oxide, fluoride, sulfide or nitrate of a first transition metal or semiconductor. The second dielectric of the second waveguide may be a second oxide, fluoride, sulfide or nitrate of a second transition metal or semiconductor. Each of the first to fourth values for the percentage change in thickness in the layers of first surface of the second waveguide may be in the range −150% to +150%. The number of layers of the plurality of layers may be in the range 10 to 30, optionally, 15-25. The first value for the percentage change may be different to the third value for the percentage change. The second value for the percentage change may be different to the fourth value for the percentage change.

The first waveguide may be substantially elongated. The first and second surfaces may be elongated surfaces. The second waveguide may be planar. The first and second surfaces are major surfaces of the planar second waveguide.

In a third aspect, there is provided a method of waveguiding a light field. The method comprises directing light into a first waveguide comprising a pair of parallel surfaces. The method further comprises guiding the light by internal reflection between the pair of parallel surfaces.

The first waveguide may be a waveguide according to the first aspect. In particular, a first surface of the pair of parallel surfaces comprises a plurality of layers of a first dielectric and a plurality of layers of second dielectric arranged in an alternating configuration. Each layer of the first and second dielectric has a first end and a second end. A percentage change in the thickness of each layer from the first end to the second end of that layer has one of a plurality of discrete allowable values. The total number of layers of the first and second dielectric is greater than the total number of discrete allowable values. A difference in refractive index between the first dielectric and second dielectric is greater than 0.4, optionally 0.5.

The first surface provides a plurality, n, of light emission zones for light waveguided between the first surface and second surface, optionally, wherein an angle of internal incidence at each emission zones is in the range 10 to 50 degrees.

The plurality of discrete values may comprise or consist of two or more discrete values, optionally three or more discrete, optionally four or more values. The plurality of discrete values may consist of between two and six discrete values, optionally between two and four discrete values, optionally four discrete values. The number of discrete values may preferably be considerably lower than the total number of layers. For example, in some embodiments the total number of layer may be at least 10 layer, optionally at least 15 layers, optionally at least 20 layers. In some embodiments, the number of allowable values is less than 50% or less than 25% of the number of layers.

The plurality of discrete values may comprise a first value, a second value and a third value. Each layer of the first dielectric may have a percentage change in thickness equal to either the first value or the second value. In other words, there may only be two options for percentage change in the thickness of each layer of the first dielectric.

At least one layer of the second dielectric may have a percentage change in the thickness equal to the third value. When each of the layers of the first dielectric have either the first discrete value or the second discrete value, this may mean that at least one layer of the second dielectric has a different percentage change in thickness to all of the layers of the first dielectric.

The step of directing light into the waveguide may comprise directing light having a first visible wavelength, a second visible wavelength and a third visible wavelength. The first wavelength may be in the range 630-670 nm, the second wavelength may be in the range 500-540 nm and the third wavelength may be in the range 430-470 nm. The transmissivity of the first surface at the first, second and third visible wavelength increases with distance from the first light emission zone to the nth light emission zone in order to maintain the intensity of the plurality of light emissions substantially constant at the first, second and third wavelength.

The method may further comprise directing light into a second waveguide comprising a pair of parallel surfaces and guiding the light by internal reflection between the pair of parallel surfaces. The step of directing light into the second waveguide may be carried out after the step of directing light into the first waveguide. The light that is directed into the second waveguide may be light that has been emitted from the first output.

According to a fourth aspect there is provided a method of manufacturing or providing a waveguide. The method comprising providing a waveguide substrate comprising a pair of parallel surfaces arranged to provide waveguiding therebetween; and applying a plurality of layers of a first dielectric and a plurality of layers of a second dielectric to the waveguide substrate such that the layers of first and second dielectric are in an alternating configuration.

The waveguide may be a waveguide according to the first aspect. In particular, each layer of the first and second dielectric may have a first end and a second end, wherein a percentage change in the thickness of each layer from the first end to the second end of that layer has one of a plurality of discrete allowable values. The total number of layers of the first and second dielectric may be greater than the total number of discrete allowable values. A difference in refractive index between the first dielectric and second dielectric may be greater than 0.4, optionally 0.5.

The step of applying a plurality of layers of a first dielectric and a second dielectric may comprise depositing a first layer of the first or second dielectric on to a surface of the waveguide substrate; and then depositing a second layer of the first or second dielectric on to the first layer.

The step of depositing each layer of the first or second dielectric may comprise controlling a flow of the respective dielectric material towards the waveguide substrate using a shadow mask.

The step of depositing each layer of the first or second dielectric may comprise controlling flow of the first dielectric material with a different shadow mask for each of the discrete allowable values. The step of depositing each layer of the first dielectric comprises controlling flow of the first dielectric using a first shadow or second shadow mask. The method may comprise depositing at least one layer of the second dielectric using a third shadow mask. The method may comprise depositing each layer of the second dielectric using a third or fourth shadow mask. At least one of, optionally each, of the first to fourth shadow masks comprises a trapezoid opening, optionally an isosceles trapezoid opening.

In another aspect, there is provided a waveguide comprising a pair of parallel surfaces arranged to provide waveguiding therebetween, wherein a first surface of the pair of parallel surfaces comprises a plurality of layers of a first dielectric and a plurality of layers of second dielectric arranged in an alternating configuration, wherein each layer of the first and second dielectric has a first end and a second end, wherein a percentage change in the thickness of each layer of the first dielectric from the first end to the second end of that layer has either a first value or a second value; wherein at least one layer of the second dielectric has a percentage change in thickness from the first end to the second end having a third value; and wherein a difference in refractive index between the first dielectric and second dielectric is greater than 0.4, optionally 0.5.

In another aspect, there is provided a waveguide comprising a pair of parallel surfaces arranged to provide waveguiding therebetween, wherein a first surface of the pair of parallel surfaces comprises a plurality of layers of a first dielectric and a plurality of layers of second dielectric arranged in an alternating configuration, wherein each layer of the first and second dielectric has a first end and a second end, wherein a percentage change in the thickness of each layer of the first dielectric from the first end to the second end of that layer has either a first value or a second value; wherein a percentage change in the thickness of each layer of the second dielectric from the first end to the second end of that layer has either a third value or a fourth value; and wherein a difference in refractive index between the first dielectric and second dielectric is greater than 0.4, optionally 0.5.

In another aspect, there is provided a method of designing a waveguide that comprises a pair of parallel surfaces arranged to provide waveguiding therebetween, a first surface of the pair of parallel surfaces comprising a plurality of layers of a first dielectric and comprising a plurality of layers of a first dielectric and a plurality of layers of second dielectric arranged in an alternating configuration, wherein each layer of the first and second dielectric has a first end and a second end. The method comprises determining, calculating or computing a plurality of discrete values for the percentage change in thickness of each of the plurality layers from the first end to the second end. The determined, calculated or computed values may provide a waveguide comprising a first surface having a predetermined (or target) transmissivity.

The target transmissivity may correspond to a transmissivity of the first surface that increases from the first end to the second end. The target transmissivity is preferably a transmissivity that provides spatially homogenous emission from the waveguide, as has been described in relation to previous aspects.

The waveguide may be a waveguide according to the first aspect. In particular, the plurality of discrete values may comprise or consist of two or more discrete (allowable) values, optionally three or more (allowable) discrete, optionally four or more (allowable) values. The plurality of discrete values may consist of between two and six discrete values, optionally between two and four discrete values, optionally four discrete values. The number of discrete values may preferably be considerably lower than the total number of layers. For example, in some embodiments the total number of layer may be at least 10 layer, optionally at least 15 layers, optionally at least 20 layers.

The plurality of discrete values may comprise a first value, a second value and a third value. Each layer of the first dielectric may have a percentage change in thickness equal to either the first value or the second value. In other words, there may only be two options for percentage change in the thickness of each layer of the first dielectric.

At least one layer of the second dielectric may have a percentage change in the thickness equal to the third value. When each of the layers of the first dielectric have either the first discrete value or the second discrete value, this may mean that at least one layer of the second dielectric has a different percentage change in thickness to all of the layers of the first dielectric. Preferably, each layer of second dielectric may have a percentage change in thickness equal to the third value or a fourth value.

The target transmissivity may comprise values for the transmissivity at a first wavelength range. The target transmissivity may comprise values for the transmissivity at a second wavelength range. The target transmissivity may comprise values for the transmissivity at a third wavelength range. The target transmissivity may only comprise values for the transmissivity at wavelengths of interest (or predetermined wavelengths). In this way, the computational model need only consider the performance of the waveguide at the wavelengths of interest and may ignore the performance of the waveguide at other wavelengths. The wavelengths of interest or predetermined wavelengths may comprise or consist of the first wavelength range, the second wavelength range and/or the third wavelength range. The first wavelength range may be between 630 and 670 nm. The second wavelength range may be between 500 and 540 nm. The third wavelength may be between 430 and 470 nm. Preferably, the first, second and/or third wavelength range consists of a single wavelength. The skilled person would understand that this sort of light may be output be a laser.

Determining, calculating or computing the plurality of discrete values may comprise simulating or modelling the transmissivity of a first waveguide from the first end to the second end using a computation model.

The computational model may simulate the optical performance of a waveguide having particular material properties. In particular, the computational model may simulate the transmissivity of the first surface of a waveguide having particular material properties when a light ray is incident on the waveguide at a particular, predetermined, angle of incidence. The transmissivity may depend on the refractive index of the first and second dielectric material and the number, absolute thickness and percentage change in thickness of the layers of the first and second dielectric. The skilled person will be familiar with such computational models for use in the design of optical elements.

The waveguide may comprise a predetermined number of layers of first and second dielectric material (for example, more than 12, more than 16, more than 20 layers). The material of the first dielectric may be predetermined. The material of the second dielectric may be predetermined. The method may comprise inputting the number of layers, and the material properties of the first and second dielectrics (in particular, the respective refractive indices of the first and second dielectrics) into the computational model. The method may also comprise inputting the wavelengths of interest into the computational model.

The method may comprise using the computational model to determine the plurality of discrete values for the percentage change in thickness of each of the layers of the waveguide.

The method may comprise outputting the discrete values for the percentage change in thickness of the layers determined using the computational model.

The step of determining, calculating or computing the plurality of discrete values using the computation model may comprise randomly generating a first set of discrete values for the percentage change in thickness of the layers.

The method may comprise assigning one of the first discrete values to each of the layers of dielectric of a first waveguide. This may comprise assigning each of the first layers of dielectric with a first value and/or a second value. This may comprise assigning each of the second layers of dielectric with a third and/or a fourth value.

The method may additionally comprise randomly generating a first set of values for the absolute thickness of the plurality of layers and assigning these values to the layers of first and second dielectric of the first waveguide.

The method may comprise determining a first transmissivity output for the first waveguide.

The method may comprise comparing the first transmissivity output to a target transmissivity. This may comprise comparing the values for the transmissivity of the first waveguide from the first end to the second end to corresponding target values of the target transmissivity. If a difference between the target transmissivity and the first transmissivity output is less than a predetermined value, the method may comprise outputting the first set of discrete values. Otherwise, the method may comprise modifying the first set of discrete values based on the comparison to form a second set of discrete values. The method may be repeated until for n iterations until the difference between the between the target transmissivity and the first transmissivity output is less than the predetermined value.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

The following statements are also disclosed:

Item 1. A waveguide comprising a pair of parallel surfaces arranged to provide waveguiding therebetween, wherein a first surface of the pair of parallel surfaces comprises a plurality of layers of a first dielectric and a plurality of layers of second dielectric arranged in an alternating configuration, wherein each layer of the first and second dielectric has a first end and a second end, wherein a percentage change in the thickness of each layer from the first end to the second end of that layer has one of a plurality of discrete allowable values; wherein the total number of layers of the first and second dielectric is greater than the total number of discrete allowable values; and wherein a difference in refractive index between the first dielectric and second dielectric is greater than 0.4.

Item 2. A waveguide as defined in item 1 wherein the plurality of discrete allowable values consists of between two and six discrete values, optionally between two and four discrete values, optionally four discrete values.

Item 3. A waveguide as defined in item 1 or 2 wherein the plurality of discrete allowable values comprises a first value, a second value and a third value, and wherein each layer of the first dielectric has a percentage change in thickness equal to either the first value or the second value and wherein at least one layer of the second dielectric has percentage change in thickness equal to the third value.

Item 4. A waveguide as defined in any one of the preceding items, wherein the plurality of discrete allowable values comprises a first to fourth value, and wherein each layer of the second dielectric has a percentage change in thickness equal to either the third value or the fourth value.

Item 5. A waveguide as defined in any one of the preceding items, wherein the rate of change of the thickness of each layer of the first and second dielectric is constant Item 6. A waveguide as defined in any one of the preceding items wherein the first surface is partially reflective-transmissive and/or a second surface of the pair of parallel surfaces is substantially fully reflective and wherein the first surface provides a plurality, n, of light emission zones for light waveguided between the first surface and second surface, optionally, wherein an angle of internal incidence at each emission zones is in the range 0 to 70 degrees, optionally 10 to 50 degrees.

Item 7. A waveguide as defined in item 6 wherein the transmissivity of the first surface at a first, second and third visible wavelength increases with distance from the first light emission zone to the nth light emission zone in order to maintain the intensity of the plurality of light emissions substantially constant at the first, second and third wavelength.

Item 8. A waveguide as defined in item 7 wherein the first wavelength is in the range 630-670 nm, the second wavelength is in the range 500-540 nm and the third wavelength is in the range 430-470 nm.

Item 9. A waveguide as defined in item 7 or 8 wherein the transmissivity of the first surface at each emission point, $T(n)$, satisfies the following equation: $T(n)=(T(n-1))/([1-T(n-1)]\times[1-L])$ wherein L is an optical loss factor of the waveguide material.

Item 10. A waveguide as defined in any preceding item wherein the first dielectric is a first oxide, fluoride, sulfide or nitrate of a first transition metal or semiconductor and the second dielectric is a second oxide, fluoride, sulfide or nitrate of a second transition metal or semiconductor.

Item 11. A waveguide as defined in any preceding item wherein each layer has a thickness in the range 2 to 300 nm, optionally between 20 and 200 nm.

Item 12. A waveguide as defined in any preceding item wherein at least one of the first to fourth values of the ratio is positive and at least one of the first to fourth values of the percentage change in thickness.

Item 13. A waveguide as defined in any preceding item wherein each of the first to fourth values for the percentage change in thickness is in the range −150% to +150%.

Item 14. A holographic system comprising:
a display device arranged to display a hologram of an image and to output spatially modulated light in accordance with the hologram;
a first waveguide arranged to receive the light encoded with the hologram output by the display device at a second surface of the pair of parallel surfaces;
wherein a first surface of the pair of parallel surfaces comprises a plurality of layers of a first dielectric and a plurality of layers of second dielectric arranged in an alternating configuration, wherein each layer of the first and second dielectric has a first end and a second end, wherein a percentage change in the thickness of each layer from the first end to the second end of that layer has one of a plurality of discrete allowable values; wherein the total number of layers of the first and second dielectric is greater than the total number of discrete allowable values; and wherein a difference in refractive index between the first dielectric and second dielectric is greater than 0.4.

Item 15. A holographic system as defined in item 14, further comprising a second waveguide comprising a pair of parallel surfaces arranged to provide waveguiding therebetween.

Item 16. A holographic system as defined in item 15, wherein the first surface of the first waveguide is arranged to provide a plurality, n, of light emission zones for light waveguided between the first surface and second surface and the second surface of the second waveguide is arranged to receive light from the n light emission zones of the first waveguide.

Item 17. A holographic system as defined in item 15 or 16, wherein the second waveguide is a waveguide as claimed in any one of the preceding claims.

Item 18. A holographic system as defined in any one of items 14 to 16, wherein the first waveguide is substantially elongated and wherein the first and second surfaces are elongated surfaces.

Item 19. A holographic system as defined in any one of items 14 to 18, wherein the second waveguide is planar and wherein the first and second surfaces are major surfaces of the planar second waveguide.

Item 20. A method of waveguiding a light field, the method comprising:
directing light into a first waveguide comprising a pair of parallel surfaces; and
guiding the light by internal reflection between the pair of parallel surfaces;
wherein a first surface of the pair of parallel surfaces comprises a plurality of layers of a first dielectric and a plurality of layers of second dielectric arranged in an alternating configuration, wherein each layer of the first and second dielectric has a first end and a second end, wherein a percentage change in the thickness of each layer from the first end to the second end of that layer has one of a plurality of discrete allowable values; wherein the total number of layers of the first and second dielectric is greater than the total number of discrete allowable values; and wherein a difference in refractive index between the first dielectric and second dielectric is greater than 0.4.

Item 21. A method of waveguiding as defined in any preceding item wherein the first surface provides a plurality, n, of light emission zones for light waveguided between the first surface and second surface, optionally, wherein an angle of internal incidence at each emission zones is in the range 10 to 50 degrees.

Item 22. A method of providing a waveguide, the method comprising:
providing a waveguide substrate comprising a pair of parallel surfaces arranged to provide waveguiding therebetween;
applying a plurality of layers of a first dielectric and a plurality of layers of a second dielectric to the waveguide substrate such that the layers of first and second dielectric are in an alternating configuration;
wherein a first surface of the pair of parallel surfaces comprises a plurality of layers of a first dielectric and a plurality of layers of second dielectric arranged in an alternating configuration, wherein each layer of the first and second dielectric has a first end and a second end, wherein a percentage change in the thickness of each layer from the first end to the second end of that layer has one of a plurality of discrete allowable values; wherein the total number of layers of the first and second dielectric is greater than the total number of discrete allowable values; and wherein a difference in refractive index between the first dielectric and second dielectric is greater than 0.4.

Item 23. A method as defined in item 22, wherein the step of applying a plurality of layers of a first dielectric and a second dielectric comprises depositing a first layer of the first or second dielectric on to a surface of the waveguide substrate; and then depositing a second layer of the first or second dielectric on to the first layer.

Item 24. A method as defined in item 23, wherein the step of depositing each layer of the first or second dielectric comprises controlling a flow of the respective dielectric material towards the waveguide substrate using a shadow mask.

Item 25. A method as defined in item 24, wherein the step of depositing each layer of the first or second dielectric comprises controlling flow of the first dielectric material with a first shadow or second shadow mask and controlling flow of the second dielectric material with a third or fourth shadow mask wherein at least one of, optionally each, of the first to fourth shadow masks comprises a trapezoid opening, optionally an isosceles trapezoid opening.

BRIEF DESCRIPTION OF THE DRAWINGS

Specific embodiments are described by way of example only with reference to the following figures:

FIG. 20 show a cross-sectional schematic of a portion of an apparatus for manufacturing a waveguide according to the present disclosure in which a waveguide substrate is passing under a source of dielectric material;

FIGS. 23A-C show graphs related to an Tenth Example of a waveguide according to the present disclosure comprising 24 alternating layers of SiO2 and SiN4 in which FIGS. 23A and 23B respectively show the thickness of the SiO2 and SiN4 layers and FIG. 19C shows the transmissivity of a first surface of the waveguide of the Tenth Example compared to the ideal transmissivity at red, green and blue wavelengths for which the waveguide has been designed;

FIGS. 24A-C show graphs related to an Eleventh Example of a waveguide according to the present disclosure comprising 24 alternating layers of SiO2 and TiO2 in which FIGS. 24A and 24B respectively show the thickness of the SiO2 and TiO2 layers and FIG. 19C shows the transmissivity of a first surface of the waveguide of the Eleventh Example compared to the ideal transmissivity at red, green and blue wavelengths for which the waveguide has been designed.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
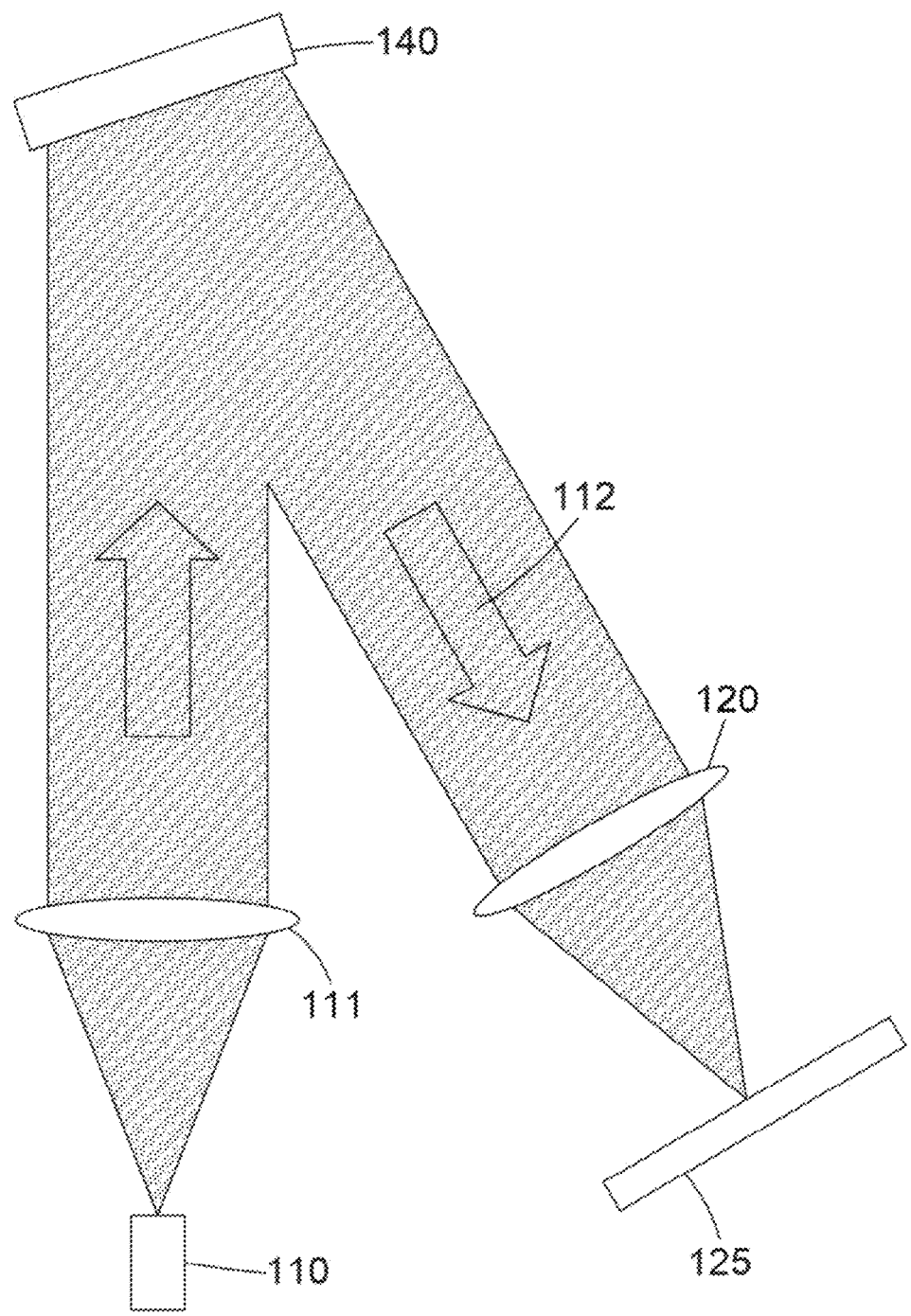
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
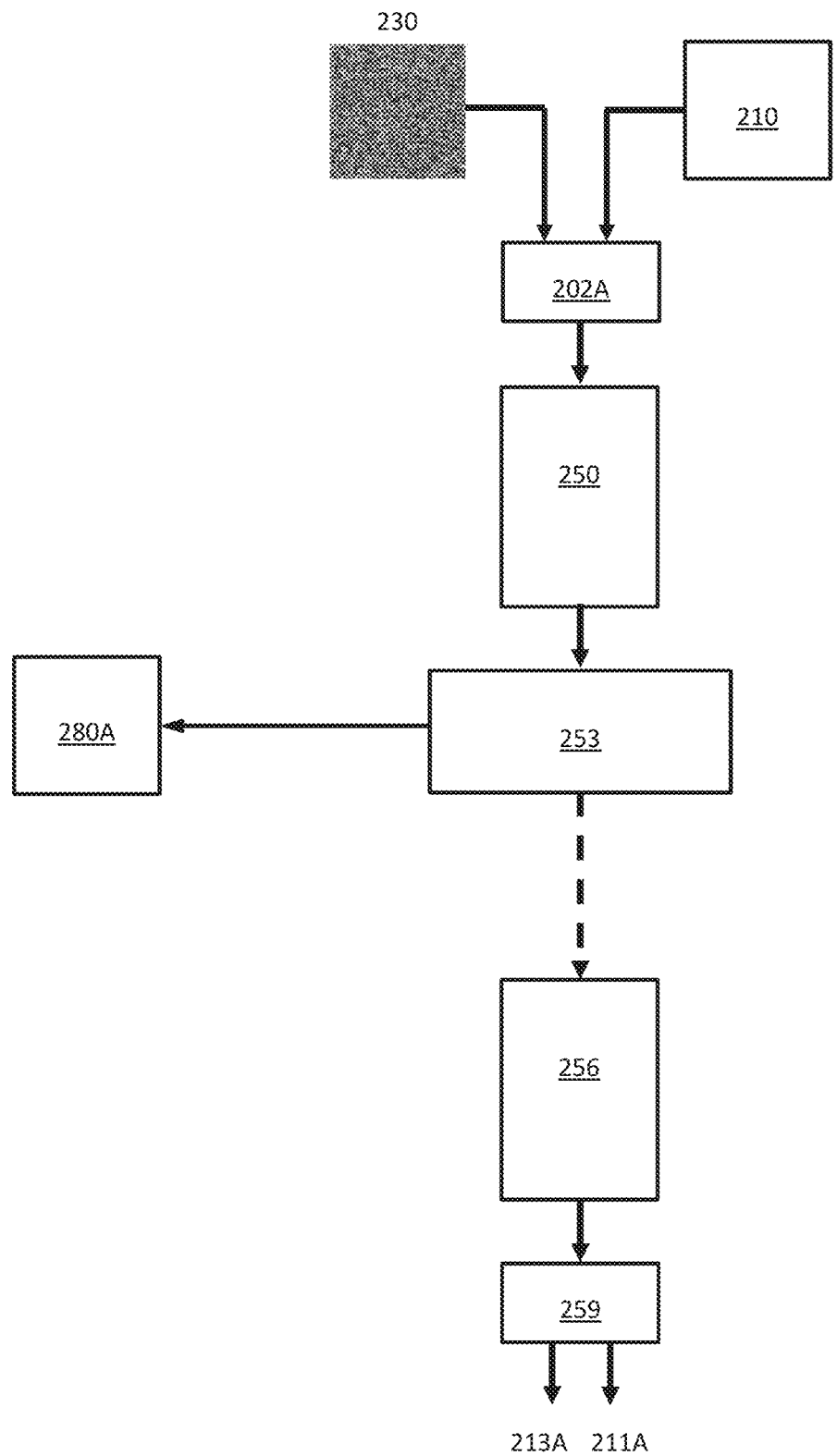
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
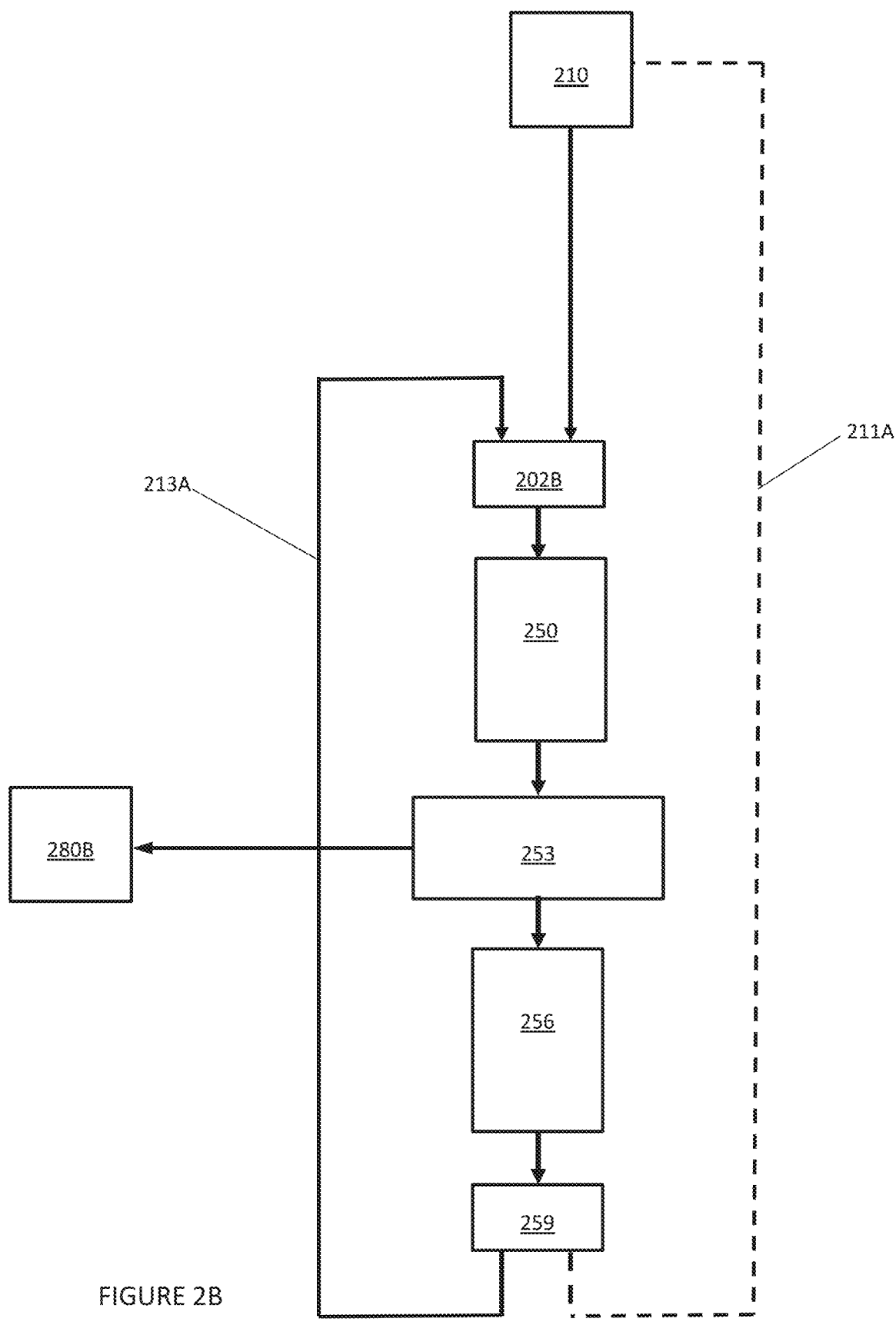
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
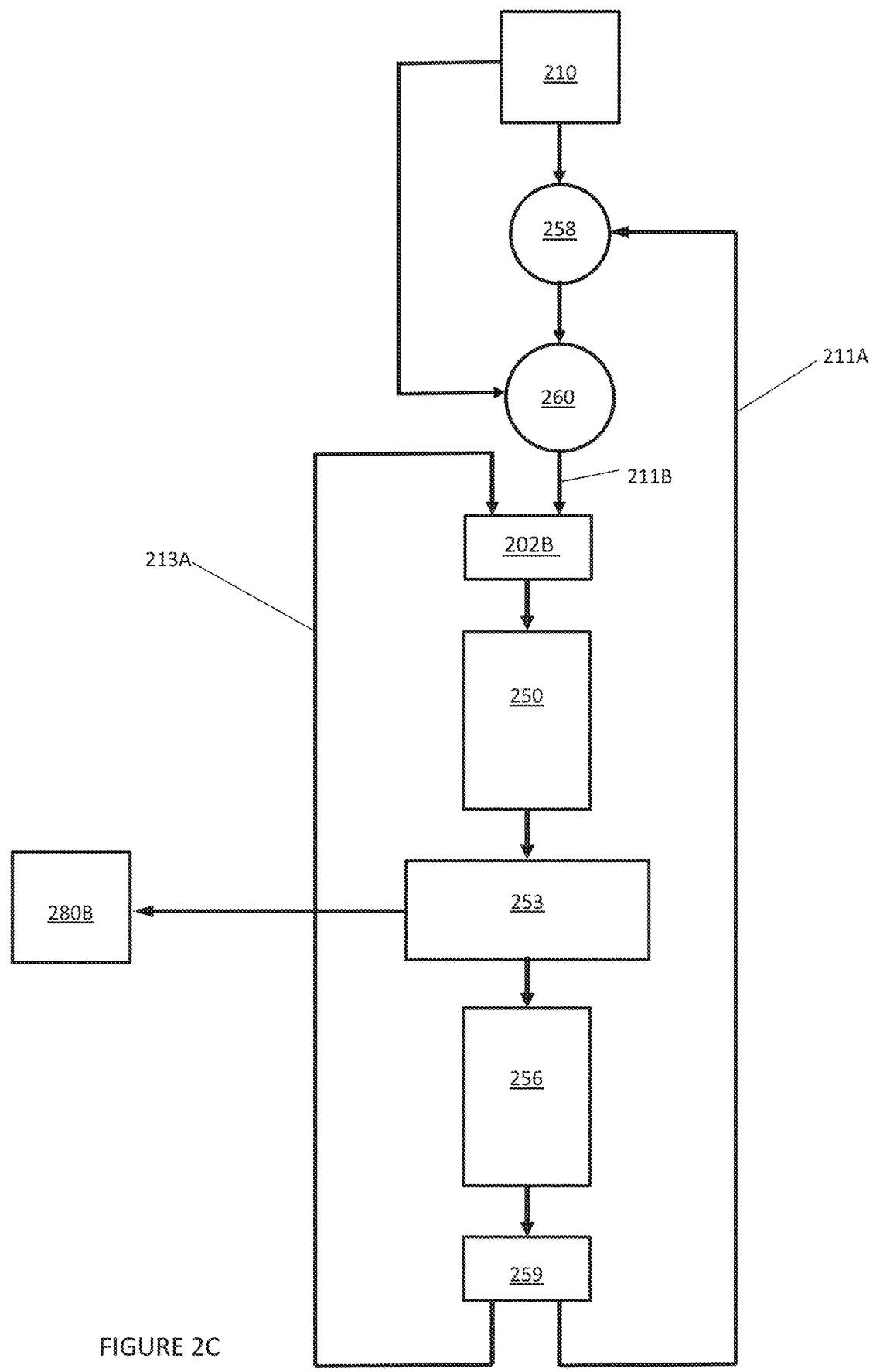
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing blocks 258 and 260 subtract the distribution of magnitude values of the input image 210 from the distribution of magnitude values 211 of the previous iteration, scales that difference by a gain factor $\alpha$ and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i \angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
$\angle$ is the phase component;
$\psi$ is the phase-only hologram 280B;
$\eta$ is the new distribution of magnitude values 211B; and
$\alpha$ is the gain factor.

The gain factor $\alpha$ may be fixed or variable. In some embodiments, the gain factor $\alpha$, is determined based on the size and rate of the incoming target image data. In some embodiments, the gain factor $\alpha$ is dependent on the iteration number. In some embodiments, the gain factor $\alpha$ is solely function of the iteration number.

The embodiment of FIG. 2C is the same as that of FIG. 2A and FIG. 2B in all other respects. It may be said that the phase-only hologram $\psi(u, v)$ comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
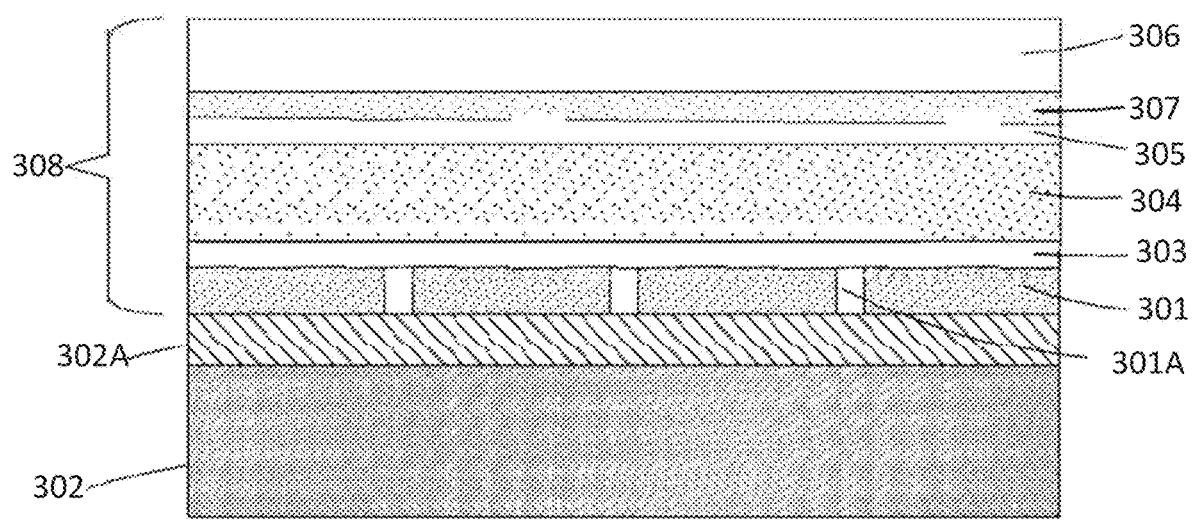
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images).

However, the teachings of the present disclosure may equally be implemented using a transmissive LCOS SLM.

Light Channeling

The optical system disclosed herein is applicable to pupil expansion with any diffracted light field. In some embodiments, the diffracted light field is a holographic light field—that is, a complex light field that has been spatially modulated in accordance with a hologram of an image, not the image itself. In some embodiments, the hologram is a special type of hologram that angularly divides/channels the image content. This type of hologram is described further herein merely as an example of a diffracted light field that is compatible with the present disclosure. Other types of hologram may be used in conjunction with the display systems and light engines disclosed herein.

A display system and method is described herebelow, which comprises a waveguide pupil expander. As will be familiar to the skilled reader, a waveguide may be regarded as being a 'pupil expander' because it can be used to increase the area over (or, within) which the light emitted by a relatively small light emitter—such as a relatively small SLM or other pixelated display device as used in the arrangements described herein—can be viewed by a human viewer or other viewing system that is located at a distance, such as a relatively large distance, away from the light emitter. The waveguide achieves this by increasing the number of transmission points from which the light is output, towards the viewer. As a result, the light may be seen from a plurality of different viewer locations and, for example, the viewer may be able to move their head, and therefore their line of sight, whilst still being able to see the light from the light emitter. Thus, it can be said that the viewer's 'eye-box' or 'eye-motion box' is enlarged, through use of a waveguide pupil expander. This has many useful applications, for example but not limited to head-up displays, for example but not limited to automotive head-up displays.

A display system as described herein may be configured to guide light, such as a diffracted light field, through a waveguide pupil expander in order to provide pupil expansion in at least one dimension, for example in two dimensions. The diffracted light field may comprise light output by a spatial light modulator (SLM), such as an LCOS SLM. For example, that diffracted light field may comprise light that is encoded by a hologram displayed by the SLM. For example, that diffracted light field may comprise light of a holographically reconstructed image, corresponding to a hologram displayed by the SL M. The hologram may comprise a computer-generated hologram (CGH) such as, but not limited to, a point-cloud hologram, a Fresnel hologram, or a Fourier hologram. The hologram may be referred to as being a 'diffractive structure' or a 'modulation pattern'. The SLM or other display device may be arranged to display a diffractive pattern (or, modulation pattern) that comprises the hologram and one or more other elements such as a software lens or diffraction grating, in a manner that will be familiar to the skilled reader.

The hologram may be calculated to provide channeling of the diffracted light field. This is described in detail in each of GB2101666.2, filed 5 Feb. 2021 (published as GB2603517), GB2101667.0, filed 5 Feb. 2021 (published as GB2603518), and GB2112213.0, filed 26 Aug. 2021 (published as GB2610203A), all of which are incorporated by reference herein. In general terms, the hologram may be calculated to correspond to an image that is to be holographically reconstructed. That image, to which the hologram corresponds, may be referred to as an 'input image' or a 'target image'. The hologram may be calculated so that, when it is displayed on an SLM and suitably illuminated, it forms a light field (output by the SLM) that comprises a cone of spatially modulated light. In some embodiments the cone comprises a plurality of continuous light channels of spatially modulated light that correspond with respective continuous regions of the image. However, the present disclosure is not limited to a hologram of this type.

Although we refer to a 'hologram' or to a 'computer-generated hologram (CGH)' herein, it will be appreciated that an SLM may be configured to dynamically display a plurality of different holograms in succession or according to a sequence. The systems and methods described herein are applicable to the dynamic display of a plurality of different holograms.

Figure 4A:
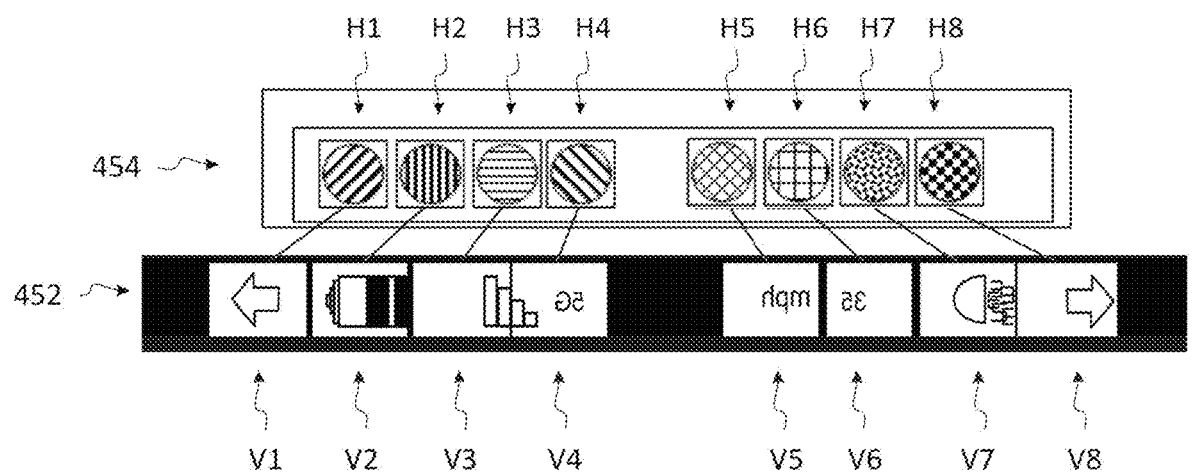
FIG. 4A shows an image comprising a plurality of image areas (bottom) and corresponding hologram comprising a plurality of hologram components (top)
Figure 4B:
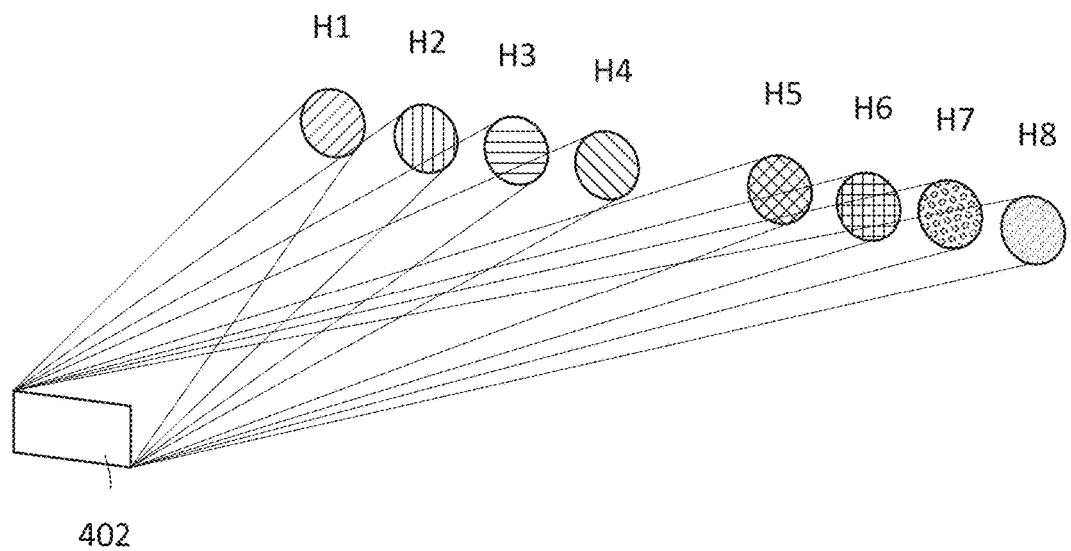
FIG. 4B shows a hologram characterised by the routing or channeling of holographically encoded light into a plurality of discrete hologram channels.
Figure 5:
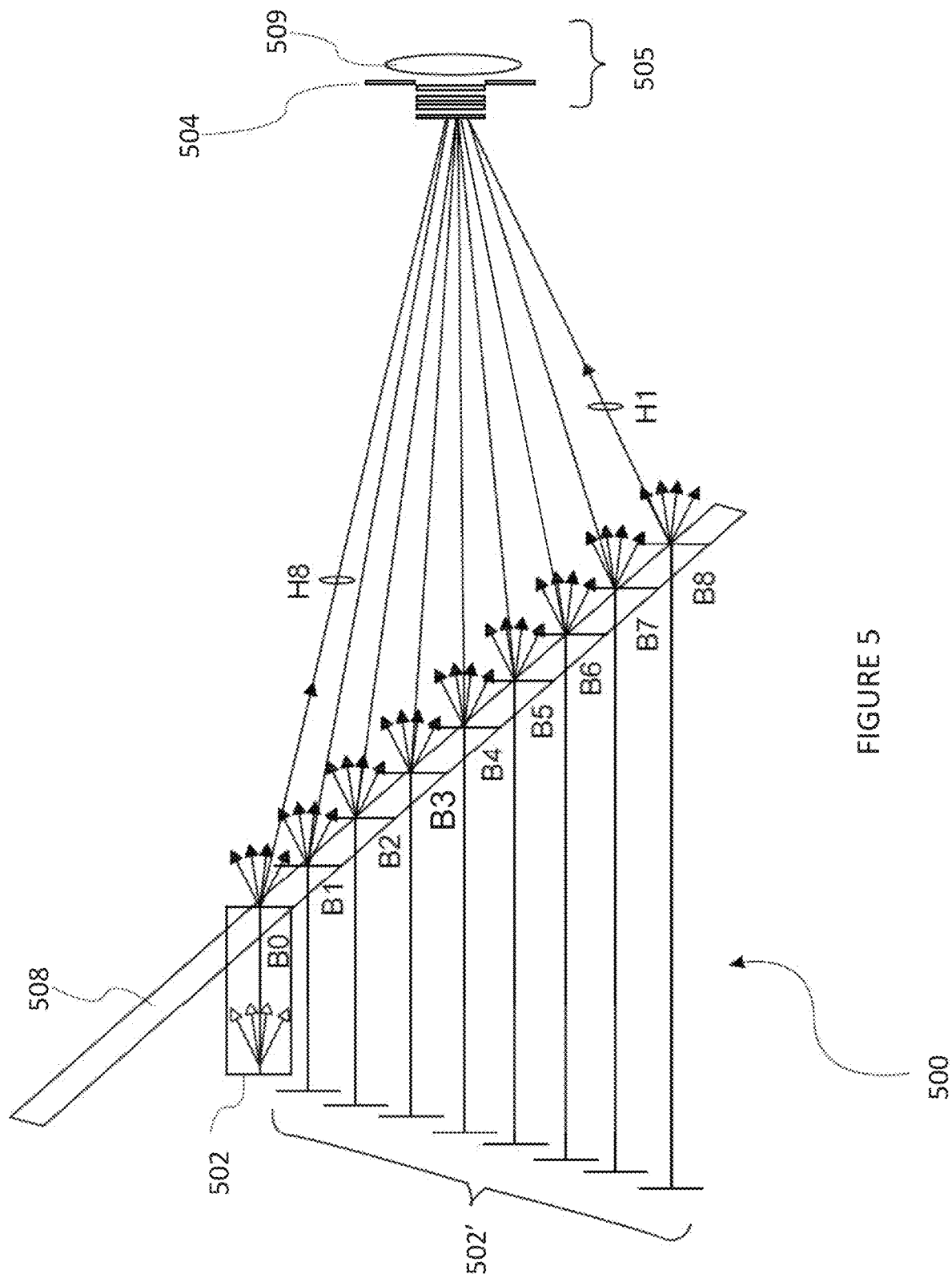
FIG. 5 shows a system arranged to route the light content of each hologram channel of FIG. 4B through a different optical path to the eye.

FIGS. 4A to 5 show an example of a type of hologram that may be displayed on a display device such as an SLM, which can be used in conjunction with a pupil expander as disclosed herein. However, this example should not be regarded as limiting with respect to the present disclosure.

FIG. 4A shows an image 452 for projection comprising eight image areas/components, V1 to V8. FIG. 4A shows eight image components by way of example only and the image 452 may be divided into any number of components. FIG. 4A also shows an encoded light pattern 454 (i.e., hologram) that can reconstruct the image 452—e.g., when transformed by the lens of a suitable viewing system. The encoded light pattern 454 comprises first to eighth sub-holograms or components, H1 to H8, corresponding to the first to eighth image components/areas, V1 to V8. FIG. 4A further shows how a hologram may decompose the image content by angle. The hologram may therefore be characterised by the channeling of light that it performs. This is illustrated in FIG. 4B. Specifically, the hologram 402 in this example directs light into a plurality of discrete areas. The discrete areas are discs in the example shown but other shapes are envisaged. The size and shape of the optimum disc may, after propagation through the waveguide, be related to the size and shape of the entrance pupil of the viewing system.

FIG. 5 shows a viewing system 500, including a display device that displays a hologram that has been calculated as illustrated in FIGS. 4A and 4B.

The viewing system 500 comprises a display device, which in this arrangement comprises an LCOS 502. The LCOS 502 is arranged to display a modulation pattern (or 'diffractive pattern') comprising the hologram and to project light that has been holographically encoded towards an eye 505 that comprises a pupil that acts as an aperture 504, a lens 509, and a retina (not shown) that acts as a viewing plane. There is a light source (not shown) arranged to illuminate the LCOS 502. The lens 509 of the eye 505 performs a hologram-to-image transformation. The light source may be of any suitable type. For example, it may comprise a laser light source.

The viewing system 500 further comprises a waveguide 508 positioned between the LCOS 502 and the eye 505. The presence of the waveguide 508 enables all angular content from the LCOS 502 to be received by the eye, even at the relatively large projection distance shown. This is because the waveguide 508 acts as a pupil expander, in a manner that is well known and so is described only briefly herein.

In brief, the waveguide 508 shown in FIG. 5 comprises a substantially elongate formation. In this example, the waveguide 508 comprises an optical slab of refractive material, but other types of waveguide are also well known and may be used. The waveguide 508 is located so as to intersect the light cone (i.e., the diffracted light field) that is projected from the LCOS 502, for example at an oblique angle. In this example, the size, location, and position of the waveguide 508 are configured to ensure that light from each of the eight ray bundles, within the light cone, enters the waveguide 508. Light from the light cone enters the waveguide 508 via its first planar surface (located nearest the LCOS 502) and is guided at least partially along the length of the waveguide 508, before being emitted via its second planar surface, substantially opposite the first surface (located nearest the eye). As will be well understood, the second planar surface is partially reflective, partially transmissive. In other words, when each ray of light travels within the waveguide 508 from the first planar surface and hits the second planar surface, some of the light will be transmitted out of the waveguide 508 and some will be reflected by the second planar surface, back towards the first planar surface. The first planar surface is reflective, such that all light that hits it, from within the waveguide 508, will be reflected back towards the second planar surface. Therefore, some of the light may simply be refracted between the two planar surfaces of the waveguide 508 before being transmitted, whilst other light may be reflected, and thus may undergo one or more reflections, (or 'bounces') between the planar surfaces of the waveguide 508, before being transmitted.

FIG. 5 shows a total of nine "bounce" points, B0 to B8, along the length of the waveguide 508. Although light relating to all points of the image (V1-V8) as shown in FIG. 4A is transmitted out of the waveguide at each "bounce" from the second planar surface of the waveguide 508, only the light from one angular part of the image (e.g. light of one of V1 to V8) has a trajectory that enables it to reach the eye 505, from each respective "bounce" point, B0 to B8. Moreover, light from a different angular part of the image, V1 to V8, reaches the eye 505 from each respective "bounce" point. Therefore, each angular channel of encoded light reaches the eye only once, from the waveguide 508, in the example of FIG. 5.

The methods and arrangements described above can be implemented in a variety of different applications and viewing systems. For example, they may be implemented in a head-up-display (HUD) or in a head or helmet mounted device (HMD) such as an Augmented Reality (AR) HMD.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 5 includes a single waveguide that provides pupil expansion in one dimension, pupil expansion can be provided in more than one dimension, for example in two dimensions. Moreover, whilst the example in FIG. 5 uses a hologram that has been calculated to create channels of light, each corresponding to a different portion of an image, the present disclosure and the systems that are described herebelow are not limited to such a hologram type.

Figure 6:
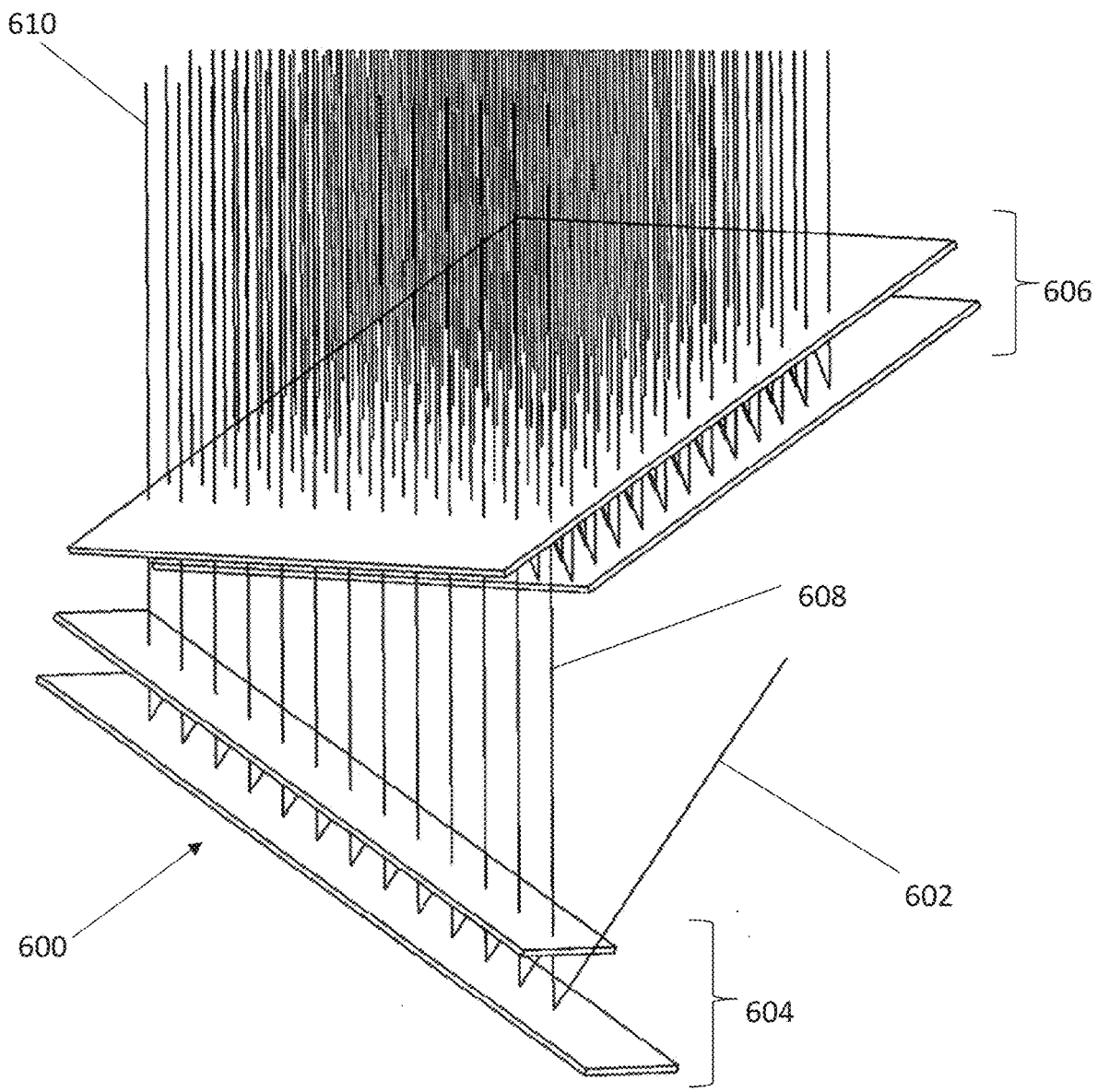
FIG. 6 shows a perspective view of a pair of stacked image replicators arranged for expanding a beam in two dimensions.

FIG. 6 shows a perspective view of a system 600 comprising two replicators, 604, 606 arranged for expanding a light beam 602 in two dimensions.

In the system 600 of FIG. 6, the first replicator 604 comprises a first pair of surfaces, stacked parallel to one another, and arranged to provide replication—or, pupil expansion—in a similar manner to the waveguide 508 of FIG. 5. The first pair of surfaces are similarly (in some cases, identically) sized and shaped to one another and are substantially elongate in one direction. The collimated light beam 602 is directed towards an input on the first replicator 604. Due to a process of internal reflection between the two surfaces, and partial transmission of light from each of a plurality of output points on one of the surfaces (the upper surface, as shown in FIG. 6), which will be familiar to the skilled reader, light of the light beam 602 is replicated in a first direction, along the length of the first replicator 604. Thus, a first plurality of replica light beams 608 is emitted from the first replicator 604, towards the second replicator 606.

The second replicator 606 comprises a second pair of surfaces stacked parallel to one another, arranged to receive each of the collimated light beams of the first plurality of light beams 608 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 608, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 6), light of each light beam within the first plurality of light beams 608 is replicated in the second direction. Thus, a second plurality of light beams 610 is emitted from the second replicator 606, wherein the second plurality of light beams 610 comprises replicas of the input light beam 602 along each of the first direction and the second direction. Thus, the second plurality of light beams 610 may be regarded as comprising a two-dimensional grid, or array, of replica light beams.

Thus, it can be said that the first and second replicators 604, 605 of FIG. 6 combine to provide a two-dimensional replicator (or, "two-dimensional pupil expander").

Improved Waveguide

As described in relation to FIG. 5, light in the waveguide 508 is reflected between a partially reflective, partially transmissive surface and a reflective surface of a waveguide. Light may undergo one or more reflections or bounces between the two reflective/reflective-transmissive planar surfaces and, at each bounce point on the partially transmissive surface, the light is divided such that a portion of the light is emitted out of the waveguide and the remaining (typically larger) portion of the light is reflected to continue to propagate between the two surfaces of the waveguide. This effectively results in the partially transmissive surface of the waveguide providing a plurality, n, of light emission zones for light waveguided between the first surface and second surface. After each bounce point/emission zone, the intensity of the light propagating in the waveguide will decrease. In other words, the intensity of the light propagating in the waveguide decreases in the direction of waveguiding.

It is desirable for the intensity of the light emitted out of the waveguide at each of the n light emission zones to be substantially the same. This can be achieved this by providing an improved waveguide in which a layered coating is provided on the partially transmissive surface of the waveguide to cause the transmissivity of the partially transmissive surface to decrease in the direction of waveguiding. This accounts for the decrease in the intensity of the propagating light in the direction of waveguiding.

Figure 7:
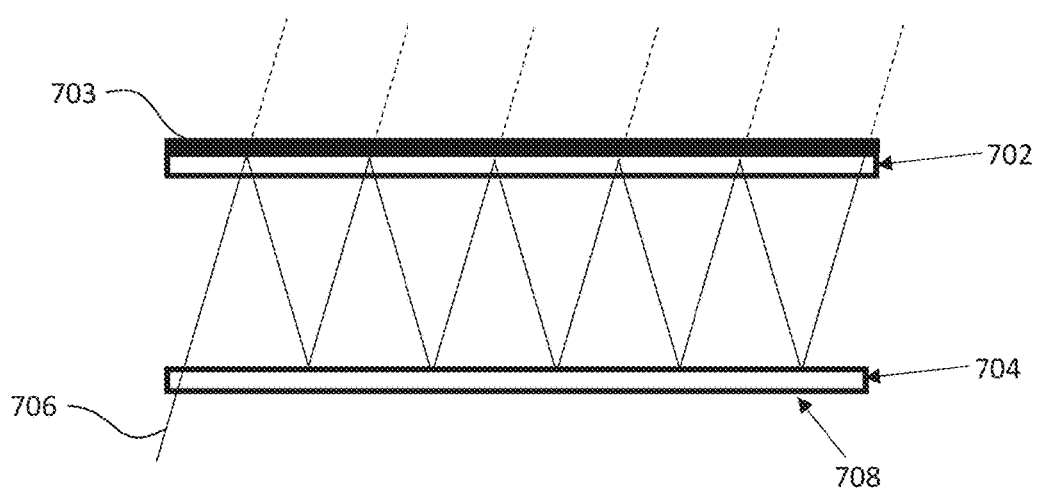
FIG. 7 shows a cross-sectional schematic view of a first waveguide according to the present disclosure.

FIG. 7 is schematic cross-sectional view of a waveguide 708 according to the disclosure. The waveguide 708 comprises a first surface 702 and a second surface 704. A light field 706 (represented by one light ray in FIG. 7) is shown propagating through the waveguide 708. The second surface 704 comprises an input port arranged to receive the light field. The first surface 702 is partially transmissive, partially reflective and comprises a coating 703. The term "coating" is merely used herein for convenience and the person skilled in the art will appreciate that components described as a "coating" may be formed by any method including, but not limited to, a coating process. The second surface 704 is substantially fully reflective (other than at the input). FIG. 7 shows the path of the light field through the waveguide, bouncing between the first and second surfaces. On each reflection at the first surface, the light field divides such that a portion of the light field is emitted through the first surface and a remaining portion is reflected and continues to propagate between the first and second surfaces by reflection. So, an emission zone is effectively formed at each reflection point. FIG. 7 shows 6 emission zones, however the skilled person will understand that there could, of course, be a larger or smaller number of reflections and emission zones. FIG. 7 is merely illustrative.

Figure 8:
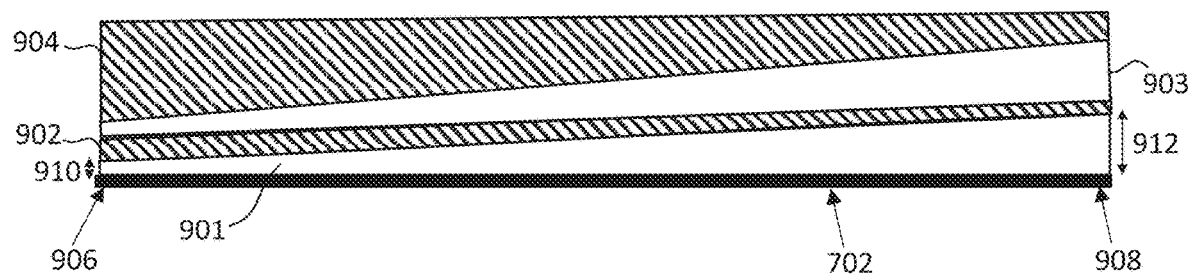
FIG. 8 shows a close-up cross-sectional schematic view of a portion of the first waveguide of FIG. 7.

The coating 703 comprises a plurality of layers of a first dielectric and a plurality of layers of a second dielectric in an alternating configuration. This is illustrated in FIG. 8. The layers of the coating will be referred to herein by number, with the layer in contact with the first surface 702 being the first layer (layer 901). Layer 902 is on top of layer 901 and layer 903 is on top of layer 902. The layer furthest from the first surface 702, which is in top of layer 903, is the fourth layer 904. In this example, layers 901 and 903 are formed of silicon dioxide (SiO2) and layers 902 and 904 are formed of titanium dioxide (TiO2) such that the layers are in an alternating configuration in which subsequent layers of SiO2 (the first dielectric) are separated by layers of TiO2 (the second dielectric).

Each of layers 901 to 904 has a varying thickness in the direction of waveguiding (from left to right in FIG. 9) and, in this embodiment by way of example, has a linear profile. In other words, the rate of change of thickness of each layer is constant. The profile of each layer can be characterized using a percentage change in thickness. Each layer has a first end 906 and a second end 908. The percentage change in thickness is defined as the change in thickness from the first end 906 to the second end 908 divided by the thickness at the first end 906 multiplied by 100. For the case of the first layer 901, the percentage change in thickness is 100×(final thickness 912−initial thickness 910)/initial thickness 910.

Layer 903 has the same percentage change in thickness as layer 901. Furthermore, the percentage change value is positive for both layers 901 and 903 (i.e. the thickness of the layer increases from the first end 906 to the second end 908). Layer 902 and 904 both have different percentage changes to one another and to layers 901 and 903. Furthermore, both the percentage change of layers 902 and 904 is negative (i.e. the thickness of the layers decreases from the first end 906 to the second end 908).

The inventors have found that by, selecting an appropriate number of alternating layers of the first and second dielectric, with the layers having an appropriate thickness and percentage change in thickness from the first end to the second end, a first surface of the waveguide can be provided having a transmissivity that increases in the direction of waveguiding. In this way, the intensity of the light field emitted at each emission zone (i.e. the intensity of each replica emitted at each emission zone) is substantially constant. This may advantageously achieve a substantially spatially homogeneous emission of light from the waveguide.

Figure 9:
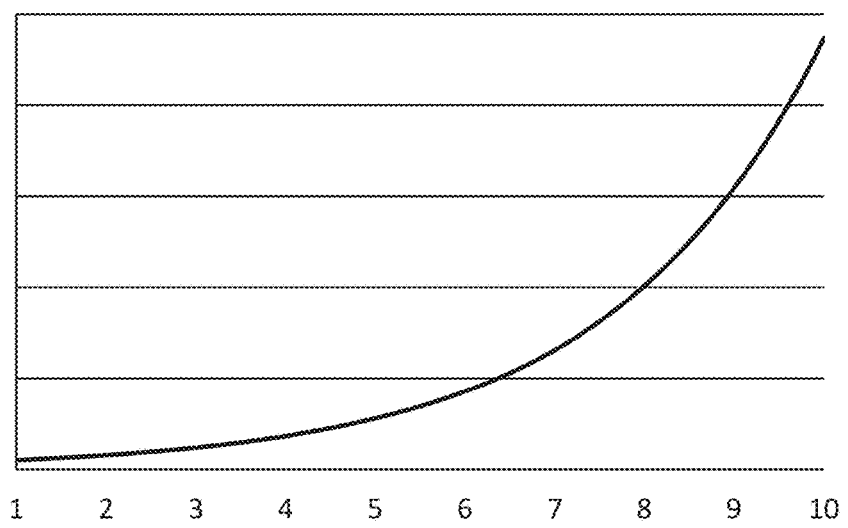
FIG. 9 shows a graph of the ideal increasing transmissivity of a waveguide in the direction of waveguiding.

An ideal exponential increase of the transmissivity of the first surface 702 is shown in FIG. 9 which is a graph showing transmissivity on the Y axis and position along the first surface 702 on the X axis. The numbers on the X axis represent the n emission zone. Specifically, the transmissivity increases according to the following equation:

$$T(n) = \frac{T(n-1)}{[1-T(n-1)] \times [1-L]}$$

where L is the optical loss factor of the waveguide material.

The example shown in FIG. 8 is representative only. FIG. 8 is not drawn to scale. Typically, the coatings according to the present invention comprise more than four layers. Hereebelow are disclosed 9 examples of layered coatings according to the disclosure which provide a satisfactory increase in the transmissivity of the first surface. Each of these examples have been determined by simulation. The skilled person will appreciate that the present disclosure is not limited to the examples disclosed herein. For example, the coating could comprise a different number of layers (greater or lesser) than the coatings disclosed herein. Furthermore, layers of different dielectric materials could be used.

First Example

Figure 10A:
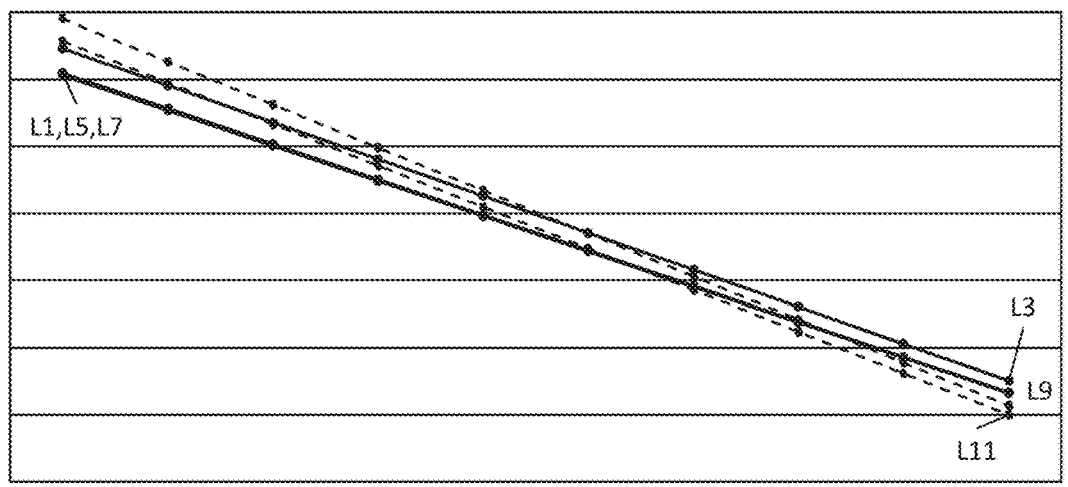
FIGS. 10A-C show graphs related to a First Example of a waveguide according to the present disclosure comprising 12 alternating layers of SiO2 and TiO2 in which FIGS. 10A and 10B respectively show the thickness of the SiO2 and TiO2 layers and FIG. 10C shows the transmissivity of a first surface of the waveguide of the First Example compared to the ideal transmissivity at red, green and blue wavelengths for which the waveguide has been designed.
Figure 10B:
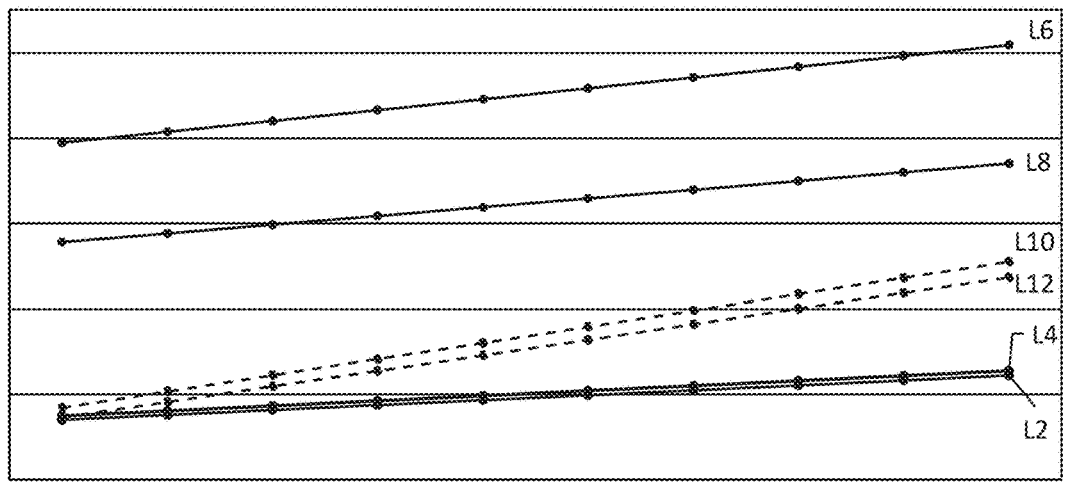
Figure 10C:
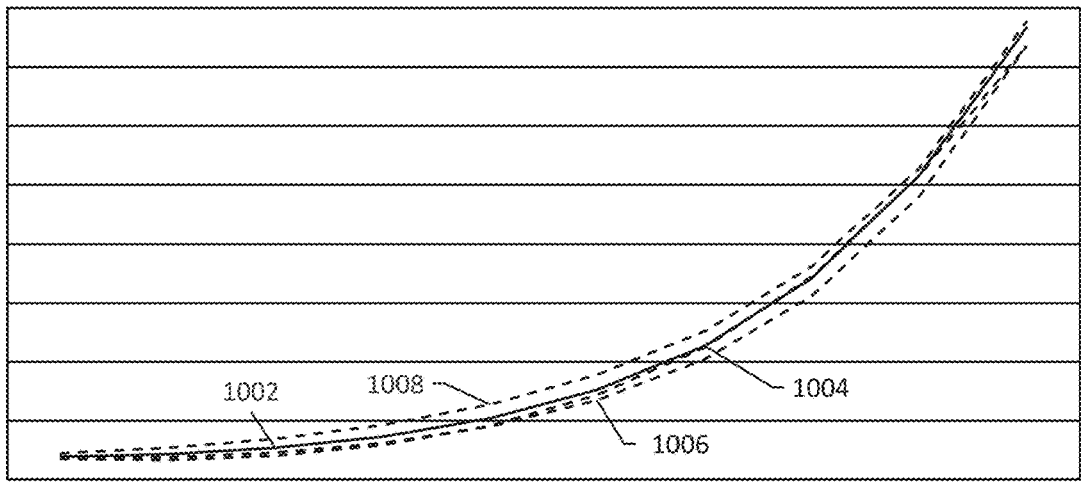

FIGS. 10a to 10c relate to a first real example of a coating according to the invention of the present disclosure. The coating of this first example comprises 12 alternating layers of SiO2 and TiO2. The layers are numbered from 1 to 12 such that light emitted from the waveguide passes through each of layers 1 to 12 sequentially. The odd numbered layers (layers L1, L3, L5, L7, L9 and L11) are layers of SiO2. The even numbered layers (layer L2, L4, L6, L8, L10 and L12) are layers of TiO2.

FIGS. 10a and 10b show how the thickness of each of the layers varies with distance along the first surface of the waveguide (i.e. from the first end to the second end of each layer). The Y axis represents thickness and the X axis represents position in the direction of waveguiding. The numbers 1 to 10 on the X axis represent the emission zones of first surface. FIG. 10a shows the SiO2 layers (i.e. the odd numbered layers in this example). FIG. 10b shows the TiO2 layers (i.e. the even numbered layers in the example).

As shown in FIG. 10a, there are two subsets of layers of SiO2. A first subset of the layers has a first value of percentage change of thickness. These layers are represented by the continuous (i.e. unbroken) lines in FIG. 10a. A second subset of the layers has a second value of percentage change of thickness that is different to the first. These layers are represented by the dashed (i.e. broken) lines in FIG. 10a. Both the first and second values in this example are negative. In this example, the first value of percentage change is −50%+/−10%. The second value of percentage change is −60%+/−10%. For the avoidance of doubt, the first value is different to the second value. The minimum thickness of the thinnest layer is 50 nm+/−15 nm.

As shown in FIG. 10b, there are two subsets of layers of TiO2. A first subset of the layers has a third value of percentage change of thickness. These layers are represented by the continuous lines in FIG. 10b. A second subset of the layers has a fourth value of percentage change of thickness that is different to the first. These layers are represented by the dashed lines in FIG. 10b. Both the first and second values in this example are positive. In this example, the third value of percentage change is 20%+/−10%. The fourth value of percentage change is 60%+/−10%. The minimum thickness of the thinnest layer is 50 nm+/−15 nm.

The skilled person will appreciate that, while the percentage change in the thickness of two layers may be the same, the maximum and minimum thicknesses of those layers may differ. For example, a first layer having a minimum thickness of 2 nm and a maximum thickness of 4 nm has a percentage increase of 100%. A second layer having a minimum thickness of 5 nm and a maximum thickness of 10 nm also has a percentage increase of 100% despite the absolute thicknesses of the two layers being different.

Coated waveguides according to the present disclosure will typically perform differently at different wavelengths. As the skilled person will appreciate, a combination of blue, green and red can be used to provide full colour images (i.e. light having three different wavelengths). For example, in many holographic systems, blue, green and red light sources are used to generate the full colour image. If the waveguide of the present disclosure is to be suitable for use in such systems, the transmissivity of the coated first surface should substantially follow the ideal transmissivity shown in FIG. 9 at each desired wavelength.

FIG. 10c is a graph showing the transmissivity of the first surface of the waveguide of the First Example. The Y axis represents transmissivity. The X axis represents the nth emission zone along the first surface of the waveguide. The solid (unbroken) line 1002 of FIG. 10c represents the ideal transmissive behaviour (also shown in FIG. 9). The three dashed (broken) lines show the simulated transmissivity of the waveguide at three different wavelengths of electromagnetic radiation. The three wavelengths shown in FIG. 10c relate to blue 1004, green 1006 and red 1008 laser light, respectively. FIG. 10c shows how the coating of the first example provides good transmissive performance at each of the three wavelengths.

The inventors have appreciated that, when confining the problem of providing a changing transmissivity behavior to only three specific wavelengths, an alternating stack of layers of the first and second dielectric can provide a desired increase in transmissivity in the waveguiding direction even when the number of discrete values of percentage change in thickness is less than (preferably significantly less than) the total number of layers. This is advantageous because it may be simpler, cheaper and more reliable to manufacture such a coating compared to a coating comprising a unique percentage change of thickness for each layer. This is explained with respect to the First Example below.

The First Example comprises 12 layers of dielectric. However, the percentage change in the thickness of each layer from the first end to the second end of that layer has one of four discrete allowable values. In particular, each layer of the first dielectric has a percentage change in thickness equal to either a first value or a second value and each layer of the second dielectric has a percentage change in thickness equal to either a third value or a fourth value. So, the total number of layers of the first and second dielectric (i.e. 12) is greater than the total number of discrete allowable values (i.e. four). As demonstrated in FIG. 10c, the transmissivity at blue, green and red wavelengths of that the coating is designed for is acceptable. However, as shown in FIG. 11, the transmissivity of the coated waveguided does not perform acceptably at other wavelengths.

Figure 11:
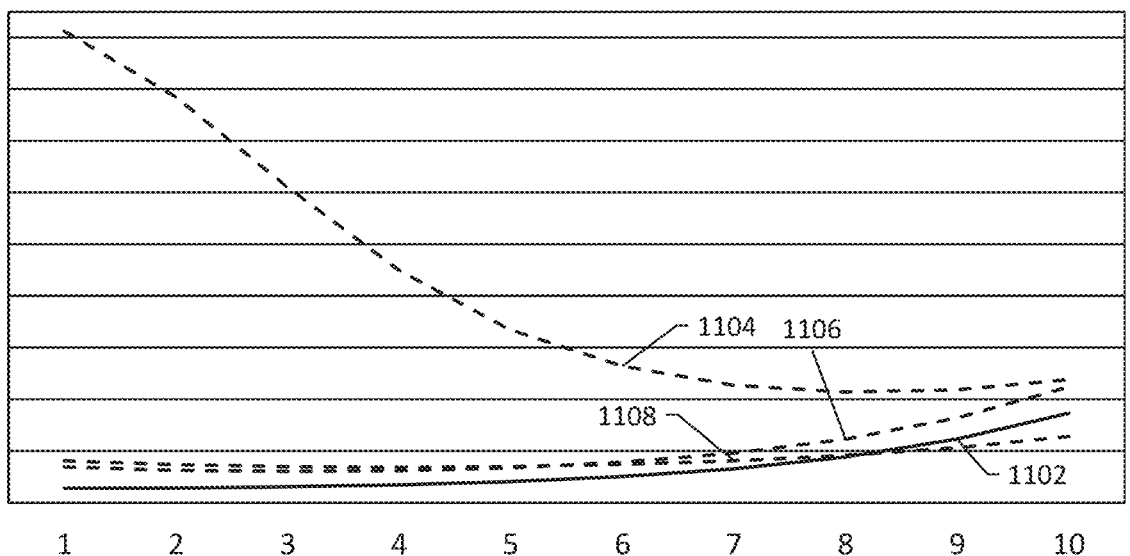
FIG. 11 shows a graph of the transmissivity of the waveguide of the First Example at other wavelengths, compared to the ideal transmissivity.

FIG. 11 is a graph. The Y axis of FIG. 11 represents transmissivity. The X axis represents represents the nth emission zone along the first surface of the waveguide. The solid line 1102 represents the ideal transmissivity of the first surface. The solid line 1102 appears to differ to that shown in FIG. 9 but this is because the scale of the Y axis in FIG. 11 is different to that of FIG. 9. The three dashed lines show the simulated transmissivity of the waveguide at three different wavelengths of electromagnetic radiation that the waveguide of the First Example has not been configured for (1104, 1106, 1108). The three dashed lines show that the transmissivity of the coated waveguide does not follow the ideal behaviour at the respective wavelengths. The 1104 wavelength diverges very significantly from the ideal behaviour.

So, the transmissivity of the waveguide having the coating of First Example for wavelengths outside of the specific wavelengths that the waveguide coating is designed for may not be acceptable. But that is not a concern for applications in which those wavelengths are not transmitted through the waveguide (i.e. are not used for formation of the image).

Second Example

Figure 12A:
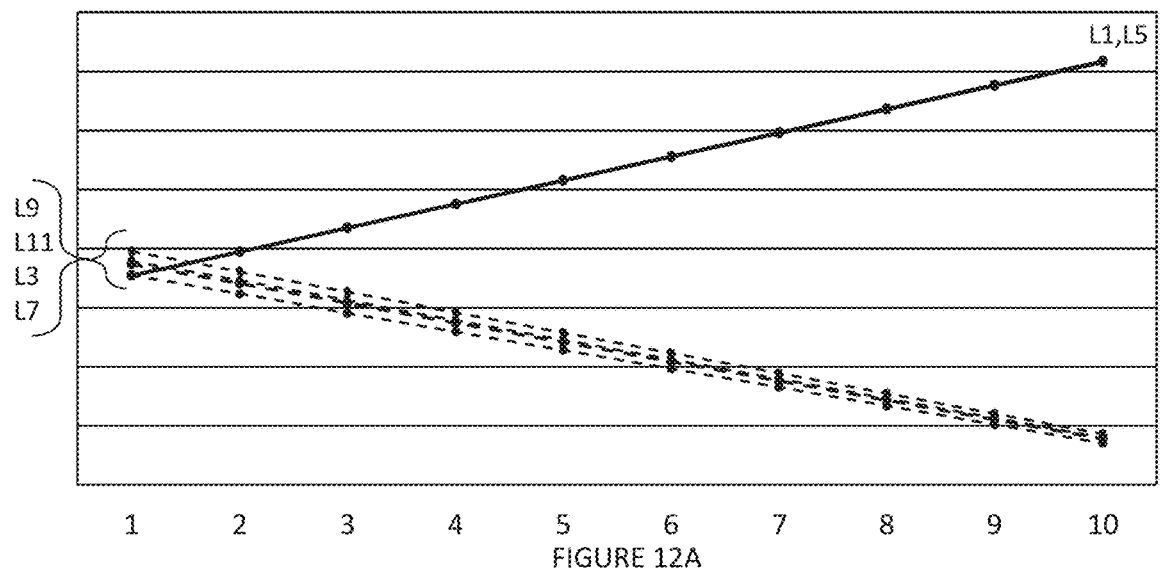
FIGS. 12A-C show graphs related to a Second Example of a waveguide according to the present disclosure comprising 12 alternating layers of SiO2 and TiO2 in which FIGS. 12A and 12B respectively show the thickness of the SiO2 and TiO2 layers and FIG. 12C shows the transmissivity of a first surface of the waveguide of the Second Example compared to the ideal transmissivity at red, green and blue wavelengths for which the waveguide has been designed.
Figure 12B:
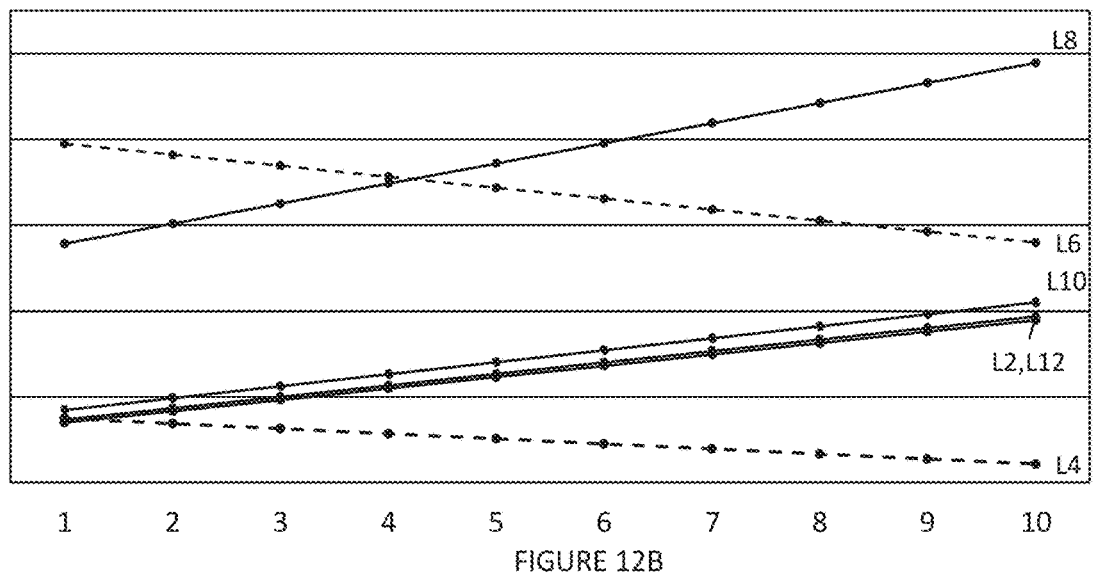
Figure 12C:
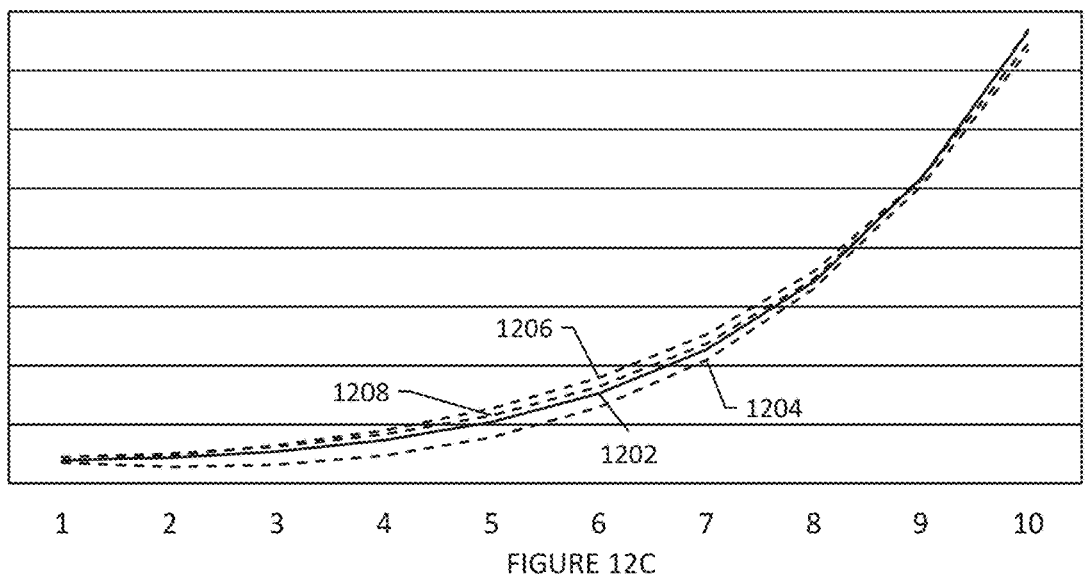

FIGS. 12a to 12c relate to a second real example of a coating according to the invention of the present disclosure. The coating of this second example again comprises 12 alternating layers of SiO2 and TiO2. The layers are numbered from 1 to 12 such that light emitted from the waveguide passes through each of layers 1 to 12 sequentially. The odd numbered layers (layers L1, L3, L5, L7, L9 and L11) are layers of SiO2. The even numbered layers (layer L2, L4, L6, L8, L10 and L12) are layers of TiO2.

FIGS. 12a and 12b show how the thickness of each of the layers varies with distance along the first surface of the waveguide (i.e. from the first end to the second end of each layer). The Y axis represents thickness and the X axis represents position in the direction of waveguiding. The numbers 1 to 10 on the X axis represent the emission zones of first surface. FIG. 12a shows the SiO2 layers (i.e. the odd numbered layers). FIG. 12b shows the TiO2 layers (i.e. the even numbered layers).

As shown in FIG. 12a, there are two subsets of layers of SiO2. A first subset of the layers has a first value of percentage change of thickness. These layers are represented by the continuous (unbroken) lines in FIG. 12a. A second subset of the layers has a second value of percentage change of thickness that is different to the first. These layers are represented by the dashed (broken) lines in FIG. 12a. In this example, the first value of percentage change is +80%+/−10%. The second value of percentage change is −60%+/−10%. The minimum thickness of the thinnest layer is 40 nm+/−15 nm.

As shown in FIG. 12b, there are two subsets of layers of TiO2. A first subset of the layers has a third value of percentage change of thickness. These layers are represented by the continuous (unbroken) lines in FIG. 12b. A second subset of the layers has a fourth value of percentage of thickness that is different to the third. These layers are represented by the dashed (broken) lines in FIG. 12b. The third value of percentage change is +45%+/−10%. The fourth value of percentage change is −20%+/−10%. The minimum thickness of the thinnest layer is 40 nm+/−10%.

FIG. 12c is a graph showing the transmissivity of the first surface of a waveguide which comprises the layered coating of the second example. The Y axis represents transmissivity.

The X axis represents the nth emission zone along the first surface of the waveguide. The solid (unbroken) line 1202 of FIG. 12*c* represents the ideal transmissive behaviour (also shown in FIG. 9). The three dashed (broken) lines show the simulated transmissivity of the waveguide at three different wavelengths of electromagnetic radiation. The three wavelengths shown in FIG. 12*c* relate to blue 1204, green 1206 and red 1208 laser light, respectively. FIG. 12*c* shows how the waveguide of the Second Example provides acceptable transmissive performance at each of the three wavelengths.

Third Example

Figure 13A:
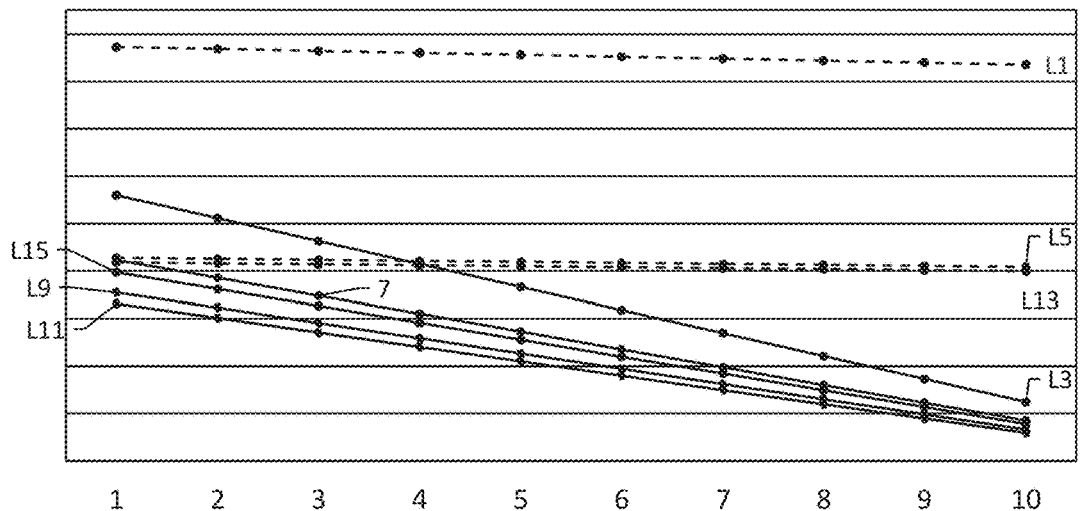
FIGS. 13A-C show graphs related to a Third Example of a waveguide according to the present disclosure comprising 16 alternating layers of SiO2 and TiO2 in which FIGS. 13A and 13B respectively show the thickness of the SiO2 and TiO2 layers and FIG. 13C shows the transmissivity of a first surface of the waveguide of the Third Example compared to the ideal transmissivity at red, green and blue wavelengths for which the waveguide has been designed.
Figure 13B:
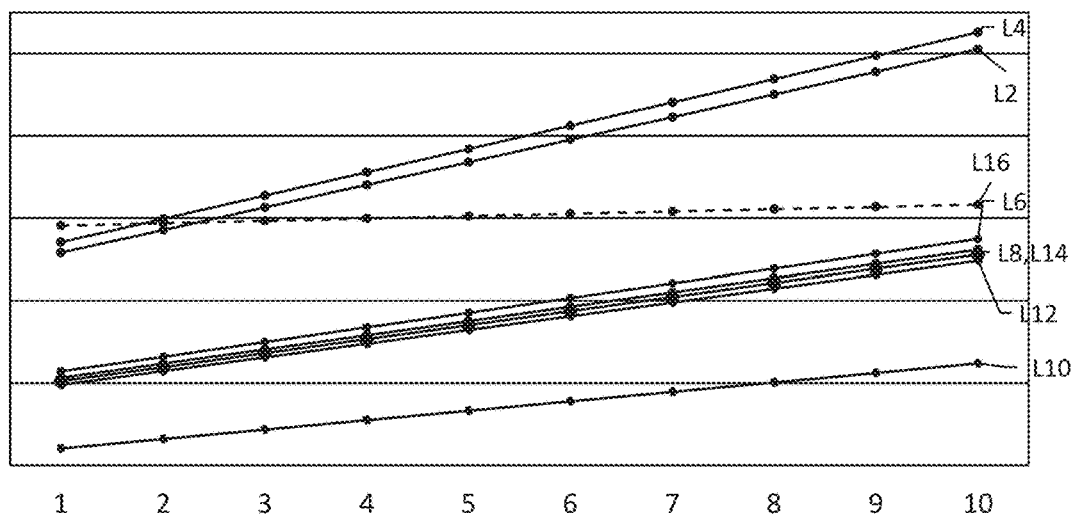
Figure 13C:
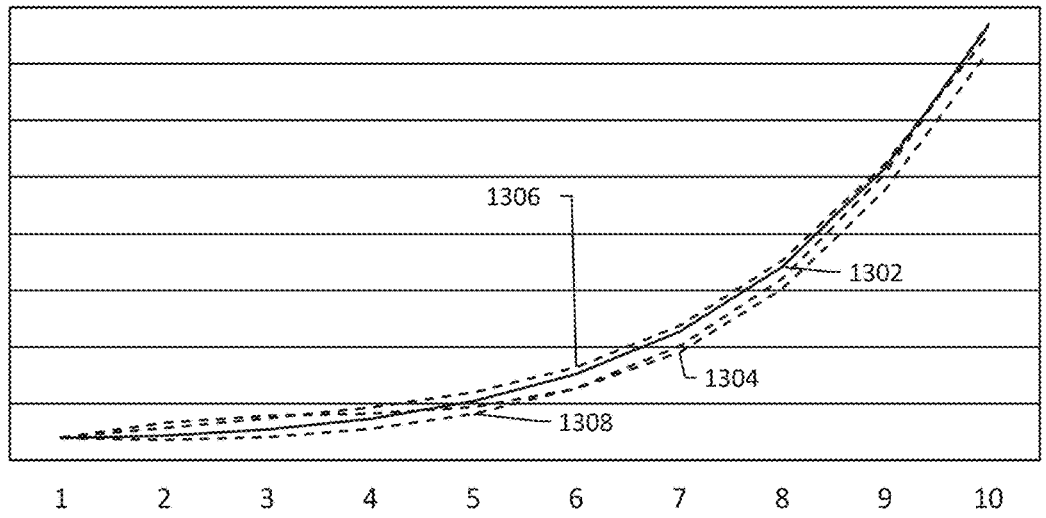

FIGS. 13*a* to 13*c* relate to a third real example of a coating according to the invention of the present disclosure. The coating of this third example comprises 16 alternating layers of SiO2 and TiO2. The layers are numbered from 1 to 16 such that light emitted from the waveguide passes through each of layers 1 to 16 sequentially. The odd numbered layers (layers L1, L3, L5, L7, L9, L11, L13 and L15) are layers of SiO2. The even numbered layers (layer L2, L4, L6, L8, L10, L12, L14 and L16) are layers of TiO2.

FIGS. 13*a* and 13*b* show how the thickness of each of the layers varies with distance along the first surface of the waveguide (i.e. from the first end to the second end of each layer). The Y axis represents thickness and the X axis represents position in the direction of waveguiding. The numbers 1 to 10 on the X axis represent the emission zones of first surface. FIG. 13*a* shows the SiO2 layers (i.e. the odd numbered layers). FIG. 13*b* shows the TiO2 layers (i.e. the even numbered layers).

As shown in FIG. 13*a*, there are two subsets of layers of SiO2. A first subset of the layers has a first value of percentage change of thickness. These layers are represented by the continuous (unbroken) lines in FIG. 13*a*. A second subset of the layers has a second value of percentage change of thickness that is different to the first. These layers are represented by the dashed (broken) lines in FIG. 13*a*. The first value of percentage change is −5%+/−2%. The second value of percentage change is −70%+/−10%. The minimum thickness of the thinnest layer is 20 nm+/−15 nm.

As shown in FIG. 13*b*, there are two subsets of layers of TiO2. A first subset of the layers has a third value of percentage change of thickness. These layers are represented by the continuous (unbroken) lines in FIG. 13*b*. A second subset of the layers has a fourth value of percentage of thickness that is different to the third. These layers are represented by the dashed (broken) lines in FIG. 13*b*. The third value of percentage change is +60%+/−10%. The fourth value of percentage change is +5%+/−2%. The minimum thickness of the thinnest layer is 35 nm+/−15 nm.

FIG. 13*c* is a graph showing the transmissivity of the first surface of a waveguide which comprises the layered coating of the third example. The Y axis represents transmissivity. The X axis represents the nth emission zone along the first surface of the waveguide. The solid line 1302 of FIG. 13*c* represents the ideal transmissive behaviour (also shown in FIG. 9). The three dashed (broken) lines show the simulated transmissivity of the waveguide at three different wavelengths of electromagnetic. The three wavelengths shown in FIG. 13*c* relate to blue 1304, green 1306 and red 1308 laser light, respectively. FIG. 13*c* shows how the waveguide of the Third Example provides acceptable transmissive performance at each of the three wavelengths.

Fourth Example

Figure 14A:
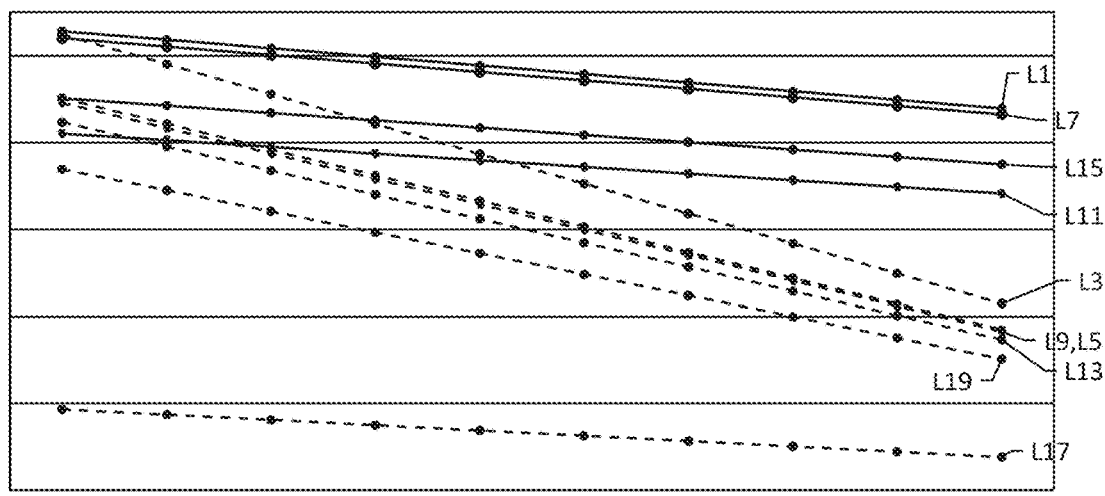
FIGS. 14A-C show graphs related to a Fourth Example of a waveguide according to the present disclosure comprising 20 alternating layers of SiO2 and TiO2 in which FIGS. 14A and 14B respectively show the thickness of the SiO2 and TiO2 layers and FIG. 14C shows the transmissivity of a first surface of the waveguide of the Fourth Example compared to the ideal transmissivity at red, green and blue wavelengths for which the waveguide has been designed.
Figure 14B:
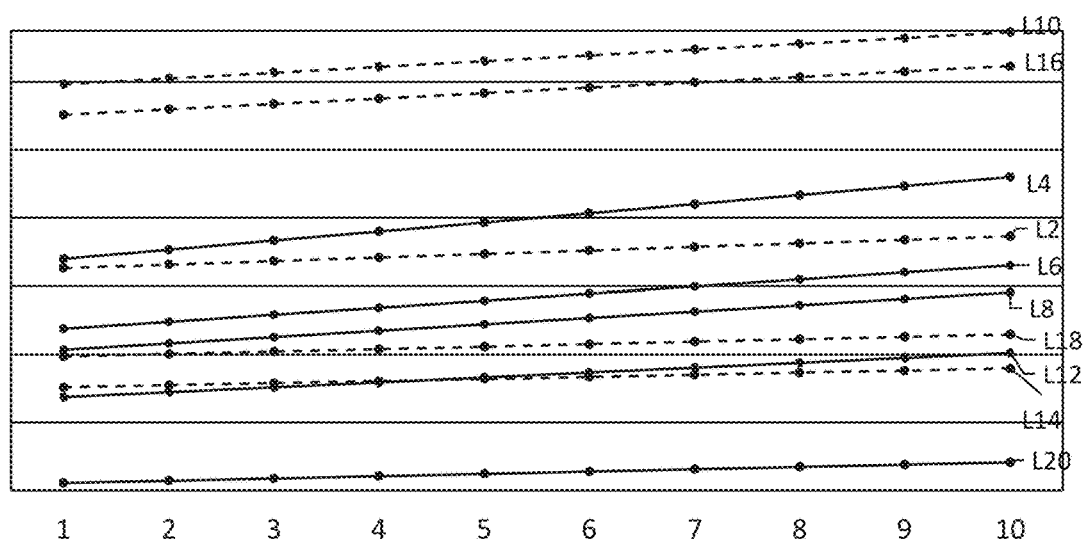
Figure 14C:
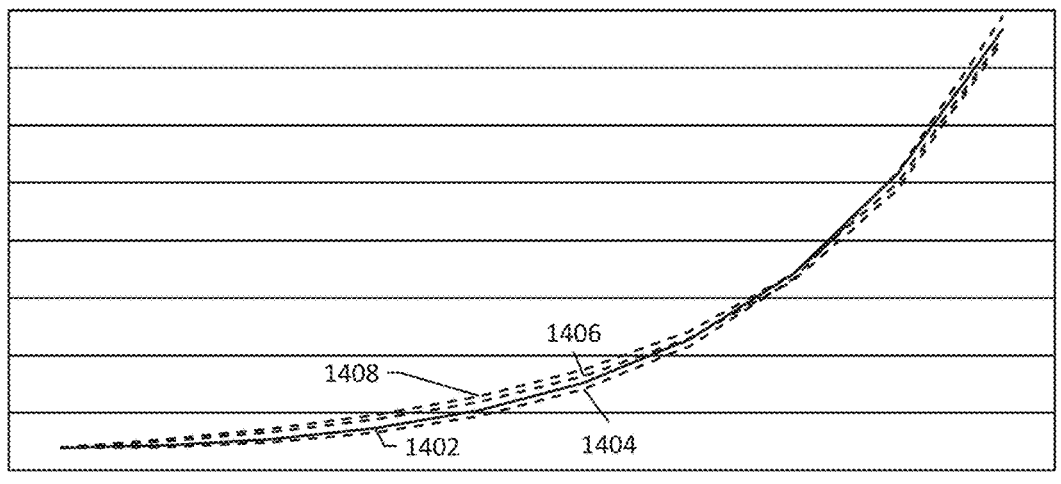

FIGS. 14*a* to 14*c* relate to a fourth real example of a coating according to the invention of the present disclosure.

The coating of this fourth example comprises 20 alternating layers of SiO2 and TiO2. The layers are numbered from 1 to 20 such that light emitted from the waveguide passes through each of layers 1 to 20 sequentially. The odd numbered layers (layers L1, L3, L5, L7, L9, L11, L13, L15, L17 and L19) are layers of SiO2. The even numbered layers (layer L2, L4, L6, L8, L10, L12, L14, L16, L18 and L20) are layers of TiO2.

FIGS. 14*a* and 14*b* show how the thickness of each of the layers varies with distance along the first surface of the waveguide (i.e. from the first end to the second end of each layer). The Y axis represents thickness and the X axis represents position in the direction of waveguiding. The numbers 1 to 10 on the X axis represent the emission zones of first surface. FIG. 14*a* shows the SiO2 layers (i.e. the odd numbered layers). FIG. 14*b* shows the TiO2 layers (i.e. the even numbered layers).

As shown in FIG. 14*a*, there are two subsets of layers of SiO2. A first subset of the layers has a first value of percentage change of thickness. These layers are represented by the continuous (unbroken) lines in FIG. 14*a*. A second subset of the layers has a second value of percentage change of thickness that is different to the first. These layers are represented by the dashed (broken) lines in FIG. 14*a*. The first value of percentage change is −15%+/−10%. The second value of percentage change is −60%+/−10%. The minimum thickness of the thinnest layer is 5 nm+/−2 nm.

As shown in FIG. 14*b*, there are two subsets of layers of TiO2. A first subset of the layers has a third value of percentage change of thickness. These layers are represented by the continuous (unbroken) lines in FIG. 14*b*. A second subset of the layers has a fourth value of percentage of thickness that is different to the third. These layers are represented by the dashed (broken) lines in FIG. 14*b*. The third value of percentage change is +30%+/−10%. The fourth value of percentage change is +10%+/−5%. The minimum thickness of the thinnest layer is 20 nm+/−15 nm.

FIG. 14*c* is a graph showing the transmissivity of the fourth surface of a waveguide which comprises the layered coating of the first example. The Y axis represents transmissivity. The X axis represents the nth emission zone along the first surface of the waveguide. The solid line 1402 of FIG. 14*c* represents the ideal transmissive behaviour (also shown in FIG. 9). The three dashed lines show the simulated transmissivity of the waveguide at three different wavelengths of electromagnetic radiation. The three wavelengths shown in FIG. 14*c* relate to blue 1404, green 1406 and red 1408 laser light, respectively. FIG. 14*c* shows how the waveguide of the Fourth Example provides acceptable transmissive performance at each of the three wavelengths.

Fifth Example

Figure 15A:
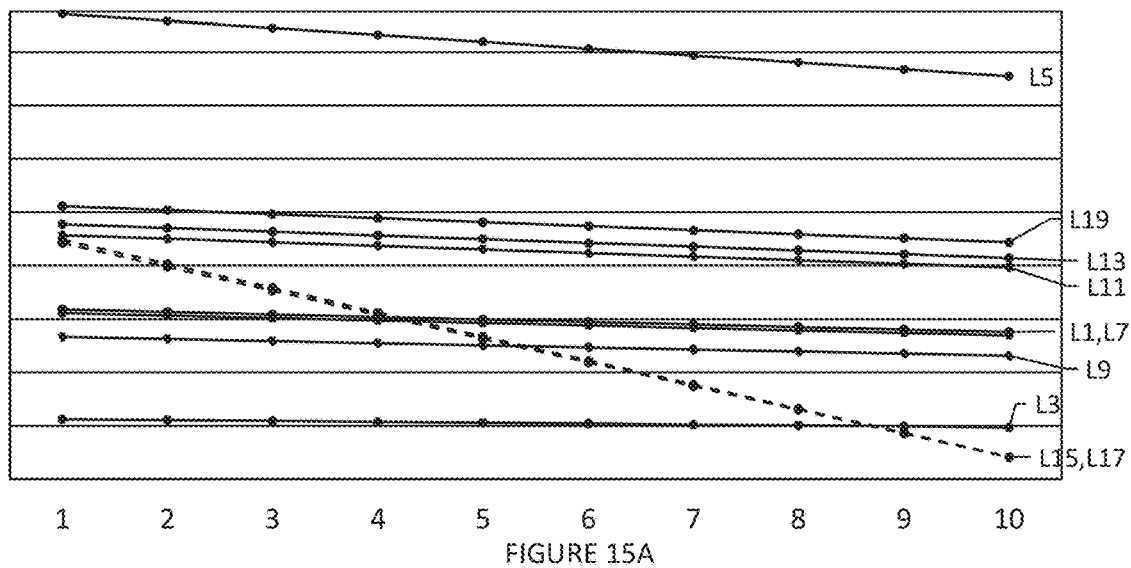
FIGS. 15A-C show graphs related to a Fifth Example of a waveguide according to the present disclosure comprising 20 alternating layers of SiO2 and TiO2 in which FIGS. 15A and 15B respectively show the thickness of the SiO2 and TiO2 layers and FIG. 15C shows the transmissivity of a first surface of the waveguide of the Fifth Example compared to the ideal transmissivity at red, green and blue wavelengths for which the waveguide has been designed.
Figure 15B:
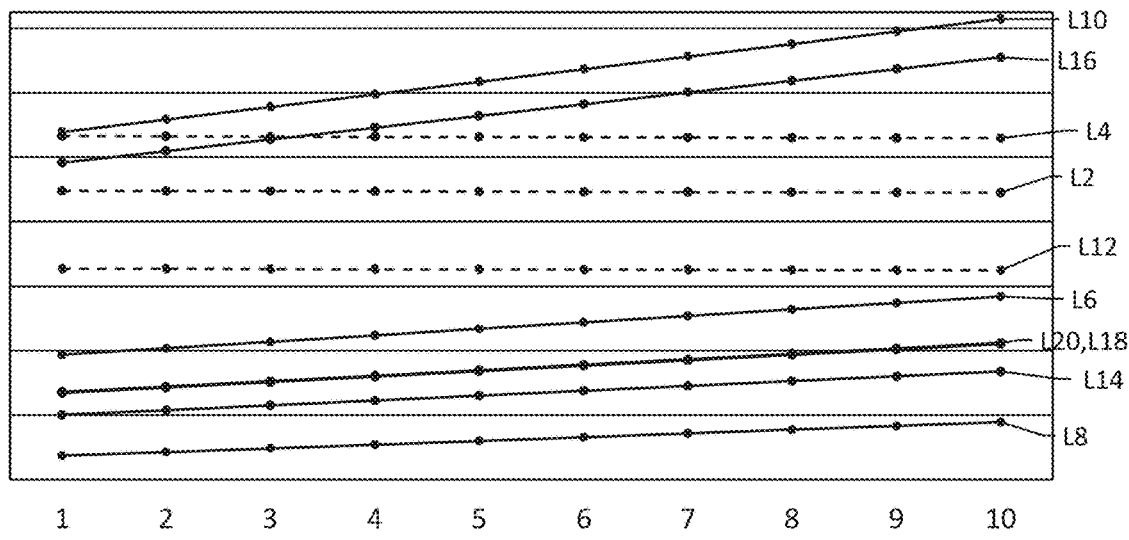
Figure 15C:
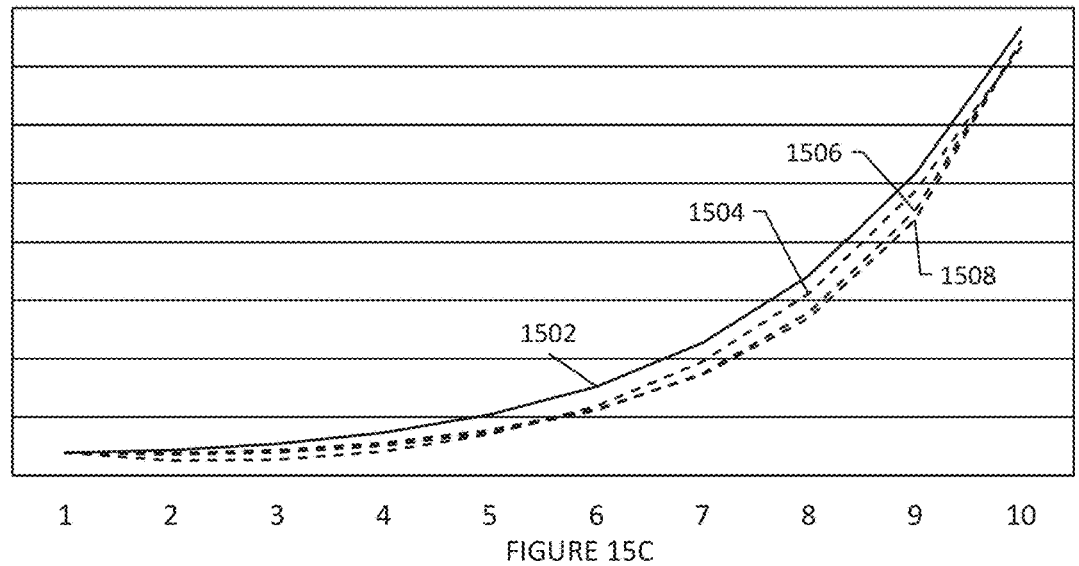

FIGS. 15*a* to 15*c* relate to a fifth real example of a coating according to the invention of the present disclosure. The coating of this fifth example comprises 20 alternating layers of SiO2 and TiO2. The layers are numbered from 1 to 20 such that light emitted from the waveguide passes through each of layers 1 to 20 sequentially. The odd numbered layers (layers L1, L3, L5, L7, L9, L11, L13, L15, L17 and L19) are layers of SiO2. The even numbered layers (layer L2, L4, L6, L8, L10, L12, L14, L16, L18 and L20) are layers of TiO2. FIG. 15*a* shows the SiO2 layers (i.e. the odd numbered layers). FIG. 15*b* shows the TiO2 layers (i.e. the even numbered layers).

A first subset of the layers of FIG. 15*a* has a first value of percentage change of thickness, represented by the continuous (unbroken) lines. A second subset of the layers has a second value of percentage change of thickness, represented by the dashed (broken) lines. The first value of percentage change is −10%+/−5%. The second value of percentage change is −90%+/−5%. The minimum thickness of the thinnest layer is 5 nm+/−2 nm.

A first subset of the layers of FIG. 15b has a third value of percentage change of thickness, represented by the continuous (unbroken) lines. A second subset of the layers has a fourth value of percentage of thickness, represented by the dashed (unbroken) lines. The third value of percentage change is +25%+/−10%. The fourth value of percentage change is −0.5%+/−0.05%. The minimum thicknesses of the thinnest layer is 40 nm+/−15 nm.

FIG. 15c shows how the waveguide of the Fifth Example provides acceptable transmissive performance at each of the three wavelengths. The solid line 1502 of FIG. 15c represents the ideal transmissive behaviour. The three dashed lines show the simulated transmissivity of the waveguide at three different wavelengths of electromagnetic radiation. The three wavelengths shown in FIG. 15c relate to blue 1504, green 1506 and red 1508 laser light, respectively.

Sixth Example

Figure 16A:
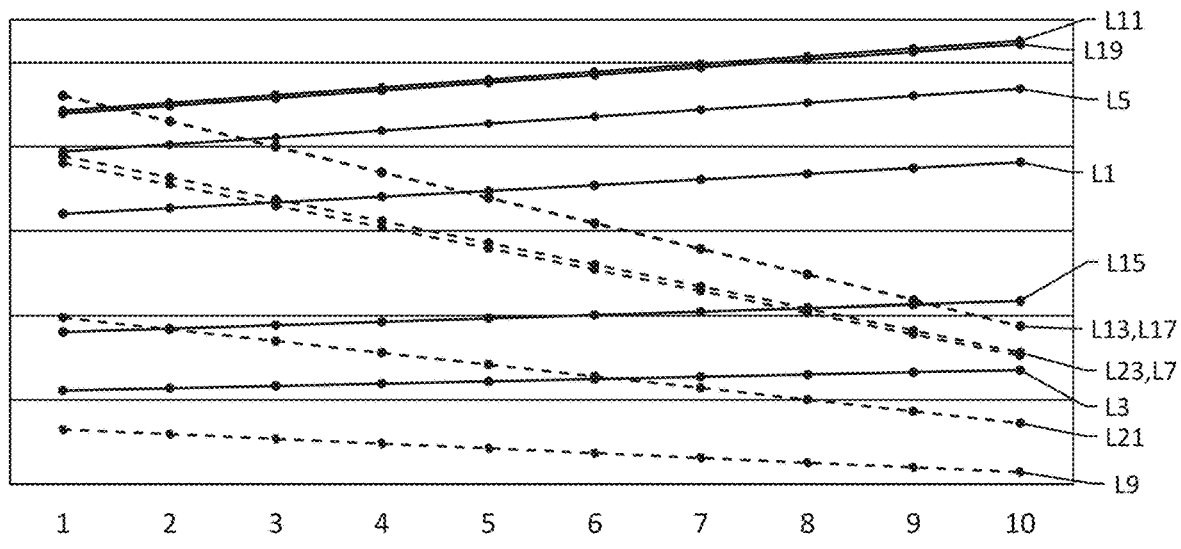
FIGS. 16A-C show graphs related to a Sixth Example of a waveguide according to the present disclosure comprising 24 alternating layers of SiO2 and TiO2 in which FIGS. 16A and 16B respectively show the thickness of the SiO2 and TiO2 layers and FIG. 16C shows the transmissivity of a first surface of the waveguide of the Sixth Example compared to the ideal transmissivity at red, green and blue wavelengths for which the waveguide has been designed.
Figure 16B:
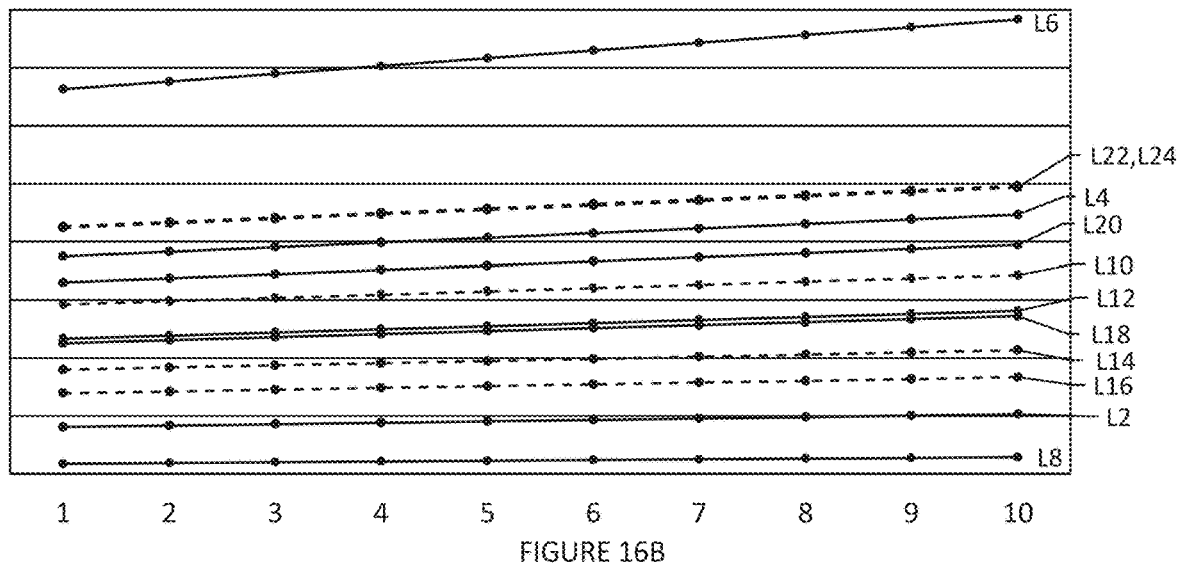
Figure 16C:
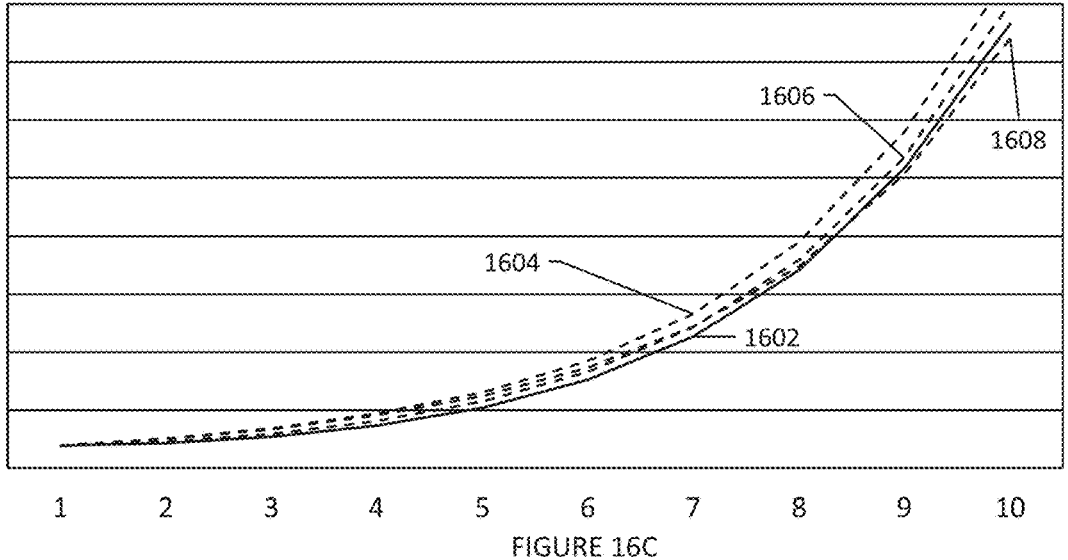

FIGS. 16a to 16c relate to a sixth real example of a coating according to the invention of the present disclosure. The coating of this sixth example comprises 24 alternating layers of SiO2 and TiO2. The layers are numbered from 1 to 24 such that light emitted from the waveguide passes through each of layers 1 to 24 sequentially. The odd numbered layers (layers L1, L3, L5, L7, L9, L11, L13, L15, L17, L19, L21 and L23) are layers of SiO2. The even numbered layers (layer L2, L4, L6, L8, L10, L12, L14, L16, L18, L20, L22 and L24) are layers of TiO2. FIG. 16a shows the SiO2 layers (i.e. the odd numbered layers). FIG. 16b shows the TiO2 layers (i.e. the even numbered layers).

A first subset of the layers of FIG. 16a has a first value of percentage change of thickness, represented by the continuous (unbroken) lines. A second subset of the layers has a second value of percentage change of thickness, represented by the dashed (broken) lines. The first value of percentage change is +20%+/−10%. The second value of percentage change is −55%+/−10%. The minimum thickness of the thinnest layer is 15 nm+/−10 nm.

A first subset of the layers of FIG. 16b has a third value of percentage change of thickness, represented by the continuous (unbroken) lines. A second subset of the layers has a fourth value of percentage of thickness, represented by the dashed (broken) lines. The third value of percentage change is +20%+/−10%. The fourth value of percentage change is +15%+/−10%. The minimum thickness of the thinnest layer is 10 nm+/−5 nm.

FIG. 16c shows how the waveguide of the sixth example provides acceptable transmissive performance at each of the three wavelengths. The solid line 1602 of FIG. 16c represents the ideal transmissive behaviour. The three dashed lines show the simulated transmissivity of the waveguide at three different wavelengths of electromagnetic radiation. The three wavelengths shown in FIG. 15c relate to blue 1604, green 1606 and red 1608 laser light, respectively.

Seventh Example

Figure 17A:
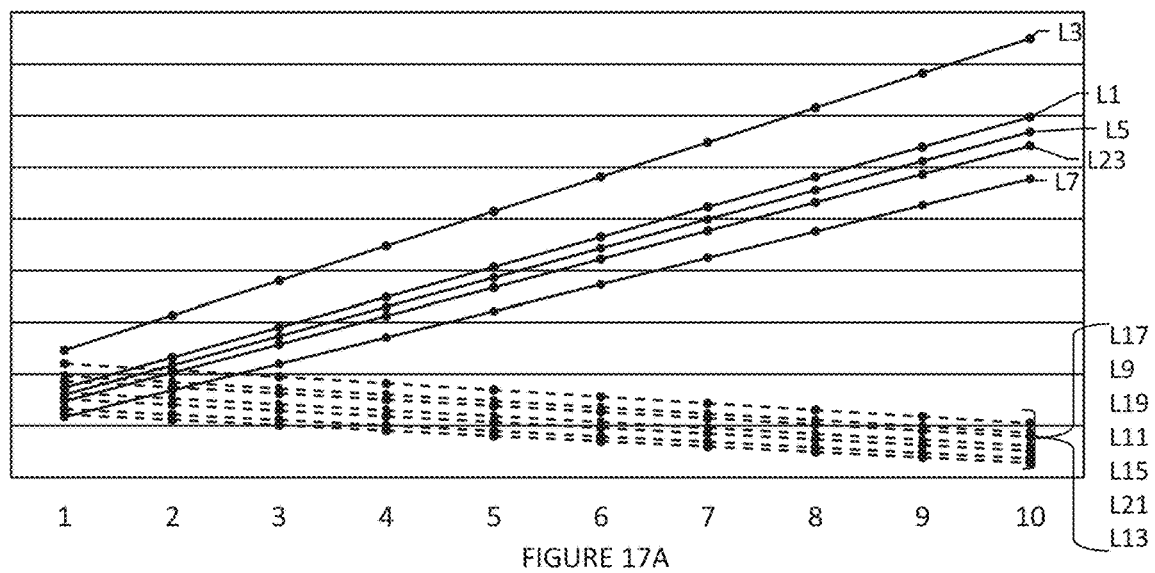
FIGS. 17A-C show graphs related to a Seventh Example of a waveguide according to the present disclosure comprising 24 alternating layers of SiO2 and TaO5 in which FIGS. 17A and 17B respectively show the thickness of the SiO2 and TaO5 layers and FIG. 17C shows the transmissivity of a first surface of the waveguide of the Seventh Example compared to the ideal transmissivity at red, green and blue wavelengths for which the waveguide has been designed.
Figure 17B:
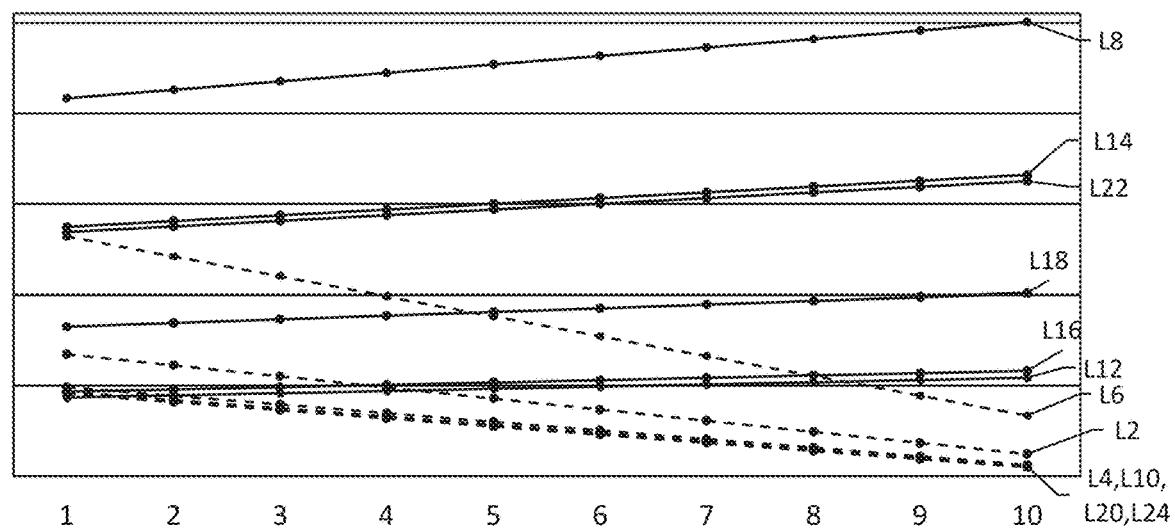
Figure 17C:
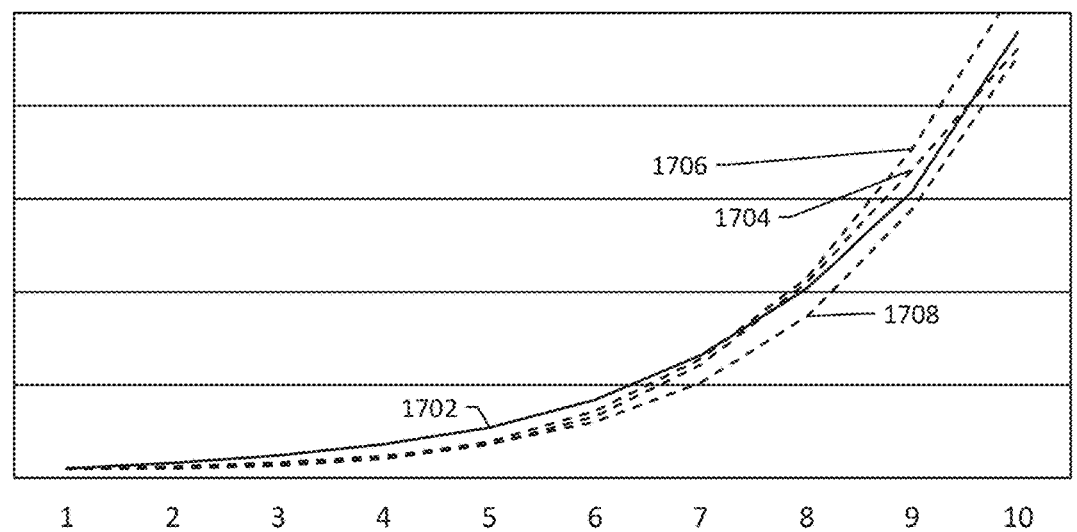

FIGS. 17a to 17c relate to a seventh real example of a coating according to the invention of the present disclosure. The coating of this seventh example comprises 24 alternating layers of SiO2 and TaO5. The layers are numbered from 1 to 24 such that light emitted from the waveguide passes through each of layers 1 to 24 sequentially. The odd numbered layers (layers L1, L3, L5, L7, L9, L11, L13, L15, L17, L19, L21 and L23) are layers of SiO2. The even numbered layers (layer L2, L4, L6, L8, L10, L12, L14, L16, L18, L20, L22 and L24) are layers of TaO5. FIG. 17a shows the SiO2 layers (i.e. the odd numbered layers). FIG. 17b shows the TaO5 layers (i.e. the even numbered layers).

A first subset of the layers of FIG. 17a has a first value of percentage change of thickness, represented by the continuous (unbroken) lines. A second subset of the layers has a second value of percentage change of thickness, represented by the dashed (broken) lines. The first value of percentage change is +110.0%+/−10%. The second value of percentage change is −20%+/−10%. The minimum thickness of thinnest layer is 60 nm+/−15 nm.

A first subset of the layers of FIG. 17b has a third value of percentage change of thickness, represented by the continuous (unbroken) lines. A second subset of the layers has a fourth value of percentage of thickness, represented by the dashed (unbroken) lines. The third value of percentage change is +20%+/−10%. The fourth value of percentage change is −70%+/−10%. The minimum thickness of the thinnest layer is 20 nm+/−15 nm.

FIG. 17c shows how the waveguide of the sixth example provides acceptable transmissive performance at each of the three wavelengths. The solid line 1702 of FIG. 17c represents the ideal transmissive behaviour. The three dashed lines show the simulated transmissivity of the waveguide at three different wavelengths of electromagnetic radiation. The three wavelengths shown in FIG. 17c relate to blue 1704, green 1706 and red 1708 laser light, respectively.

Eighth Example

Figure 18A:
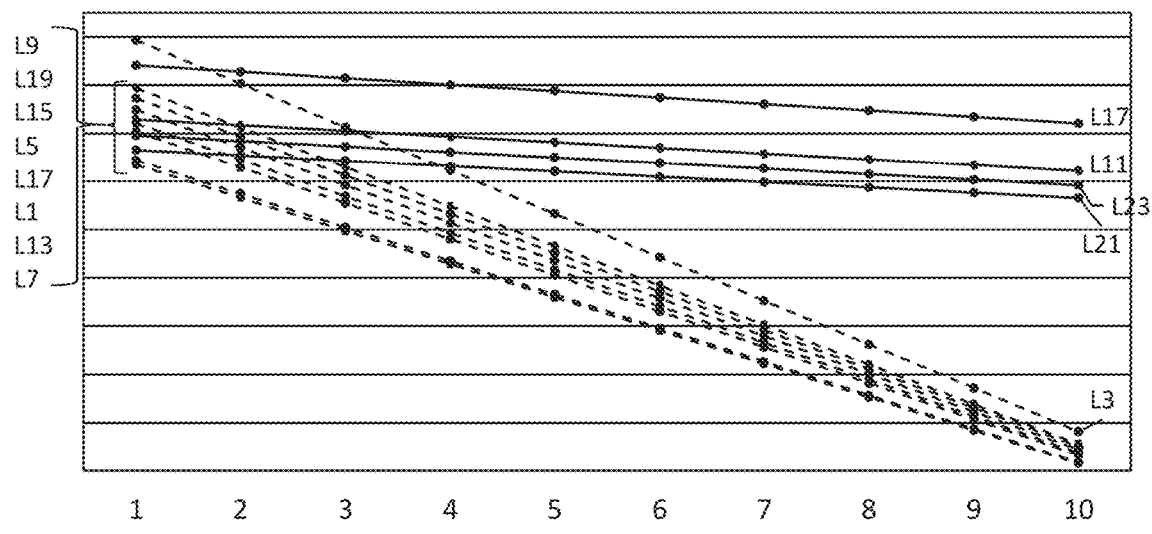
FIGS. 18A-C show graphs related to an Eighth Example of a waveguide according to the present disclosure comprising 24 alternating layers of SiO2 and TaO5 in which FIGS. 18A and 18B respectively show the thickness of the SiO2 and TaO5 layers and FIG. 18C shows the transmissivity of a first surface of the waveguide of the Eighth Example compared to the ideal transmissivity at red, green and blue wavelengths for which the waveguide has been designed.
Figure 18B:
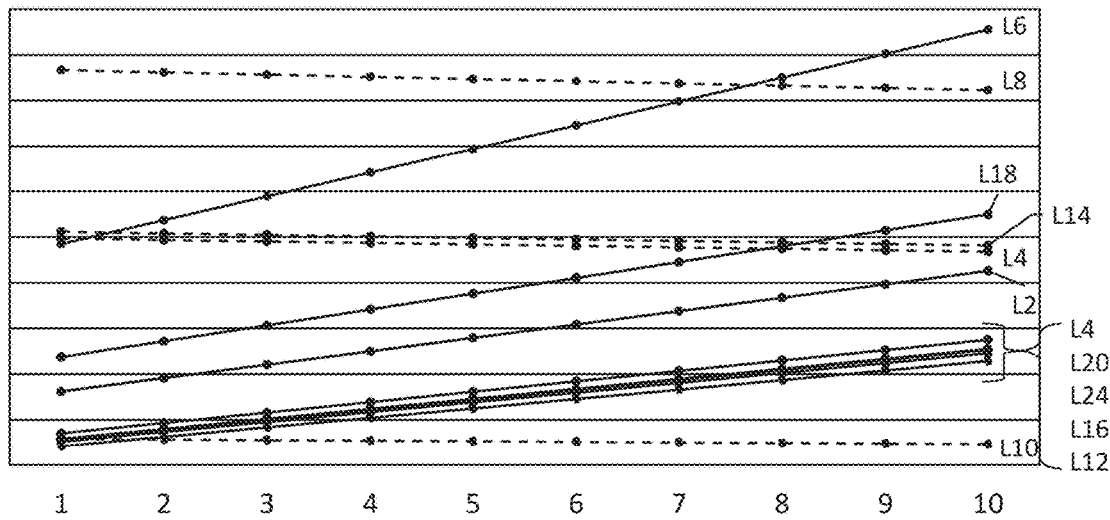
Figure 18C:
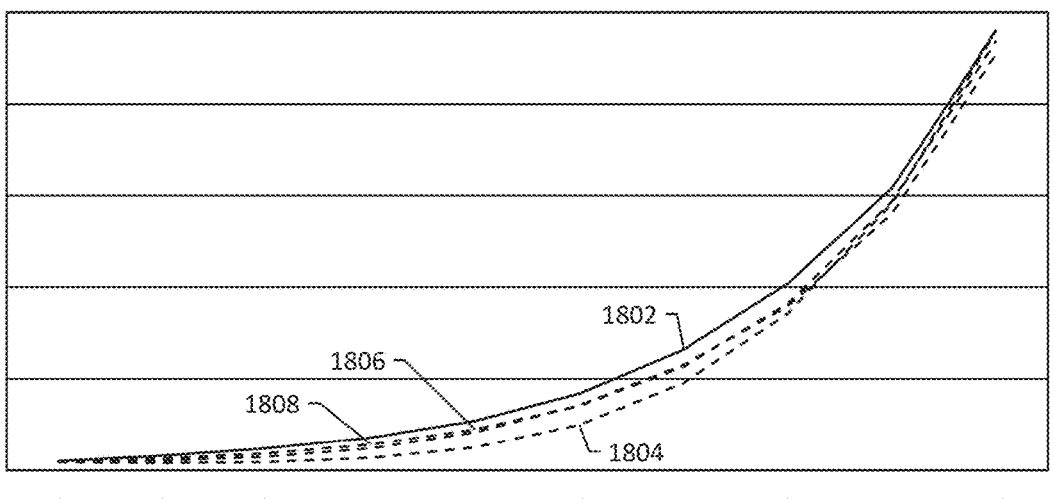

FIGS. 18a to 18c relate to a eighth real example of a coating according to the invention of the present disclosure. The coating of this seventh example comprises 24 alternating layers of SiO2 and TaO5. The layers are numbered from 1 to 24 such that light emitted from the waveguide passes through each of layers 1 to 24 sequentially. The odd numbered layers (layers L1, L3, L5, L7, L9, L11, L13, L15, L17, L19, L21 and L23) are layers of SiO2. The even numbered layers (layer L2, L4, L6, L8, L10, L12, L14, L16, L18, L20, L22 and L24) are layers of TaO5. FIG. 18a shows the SiO2 layers (i.e. the odd numbered layers). FIG. 18b shows the TaO5 layers (i.e. the even numbered layers).

A first subset of the layers of FIG. 18a has a first value of percentage change of thickness, represented by the continuous lines. A second subset of the layers has a second value of percentage change of thickness, represented by the dashed lines. The first value of percentage change is −10%+/−5%. The second value of percentage change is −75%+/−10%. The minimum thickness of the thinnest layer is 20 nm+/−15 nm.

A first subset of the layers of FIG. 18b has a third value of percentage change of thickness, represented by the continuous lines. A second subset of the layers has a fourth value of percentage of thickness, represented by the dashed lines. The third value of percentage change is +65%+/−10%. The fourth value of percentage change is −5%+/−2%. The minimum thickness of the thinnest layer is 55 nm+/−15 nm.

FIG. 18c shows how the waveguide of the eighth example provides acceptable transmissive performance at each of the three wavelengths. The solid line 1802 of FIG. 18c represents the ideal transmissive behaviour. The three dashed lines show the simulated transmissivity of the waveguide at three different wavelengths of electromagnetic radiation. The three wavelengths shown in FIG. 18c relate to blue 1804, green 1806 and red 1808 laser light, respectively.

Ninth Example

Figure 19A:
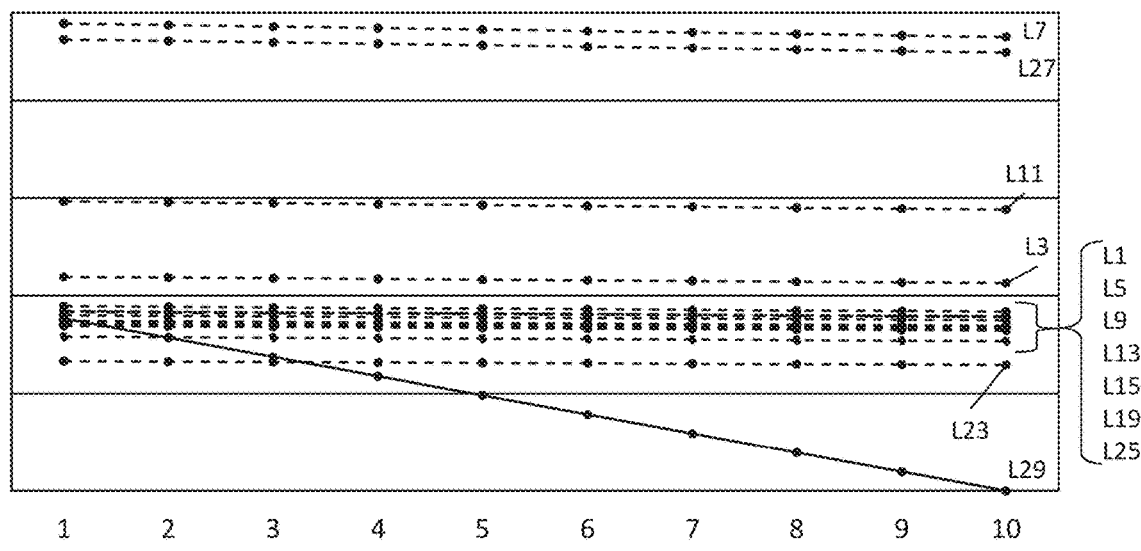
FIGS. 19A-C show graphs related to an Ninth Example of a waveguide according to the present disclosure comprising 30 alternating layers of SiO2 and HfO2 in which FIGS. 19A and 19B respectively show the thickness of the SiO2 and HfO2 layers and FIG. 19C shows the transmissivity of a first surface of the waveguide of the Ninth Example compared to the ideal transmissivity at red, green and blue wavelengths for which the waveguide has been designed.
Figure 19B:
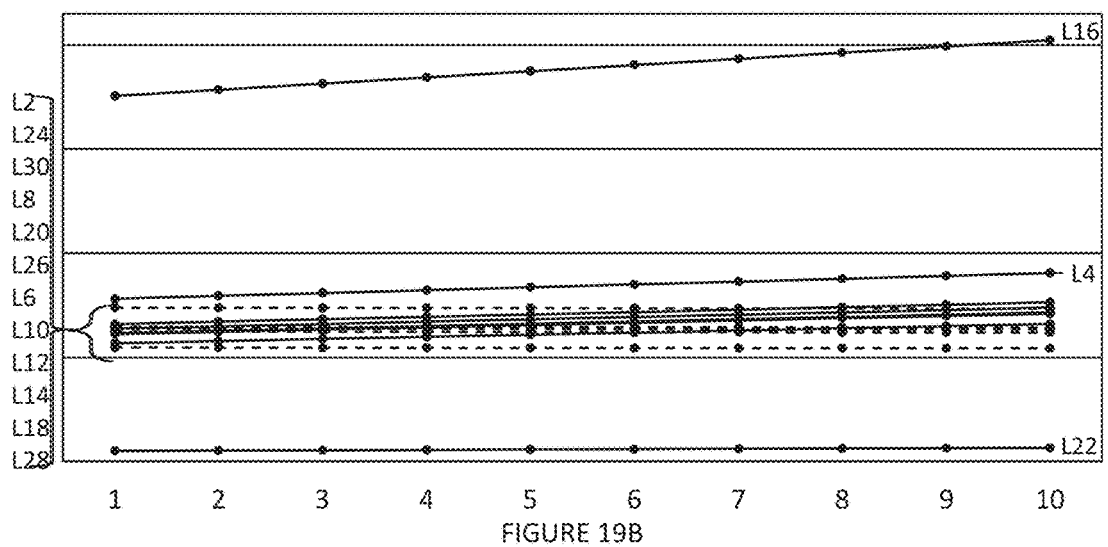
Figure 19C:
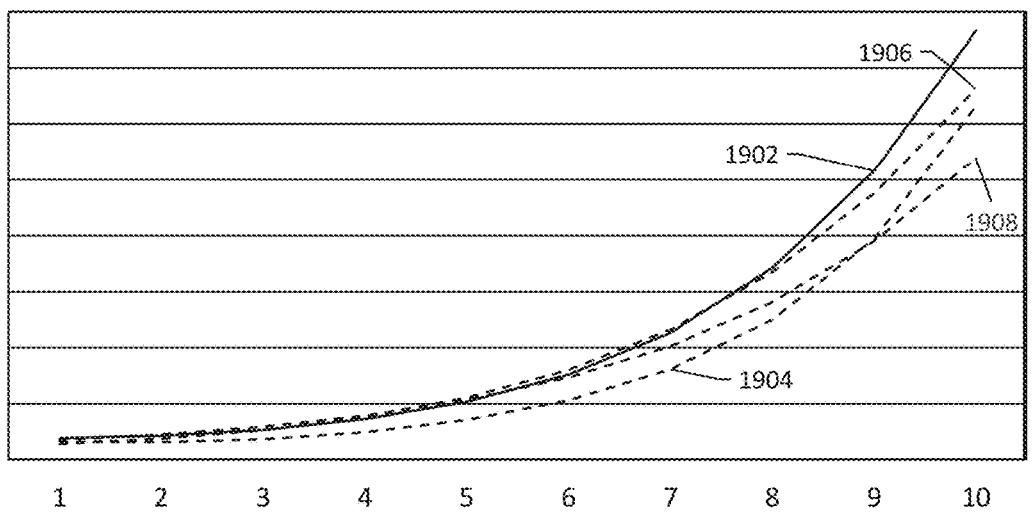

FIGS. 19a to 19c relate to a ninth real example of a coating according to the invention of the present disclosure. The coating of this seventh example comprises 30 alternating layers of SiO2 and HfO2. The layers are numbered from 1 to 30 such that light emitted from the waveguide passes through each of layers 1 to 30 sequentially. The odd numbered layers (layers L1, L3, L5, L7, L9, L11, L13, L15, L17, L19, L21, L23, L25, L27 and L29) are layers of SiO2. The even numbered layers (layer L2, L4, L6, L8, L10, L12, L14, L16, L18, L20, L22, L24, L26, L28 and L30) are layers of HfO2. FIG. 19a shows the SiO2 layers (i.e. the odd numbered layers). FIG. 18b shows the HfO2 layers (i.e. the even numbered layers).

A first subset of the layers of FIG. 19a has a first value of percentage change of thickness, represented by the continuous lines. A second subset of the layers has a second value of percentage change of thickness, represented by the dashed lines. The first value of percentage change is −100%+/−10%. The second value of percentage change is −2%+/−0.5%. The minimum thickness of the thinnest layer is 0.1 nm+/−0.01 nm.

A first subset of the layers of FIG. 19b has a third value of percentage change of thickness, represented by the continuous lines. A second subset of the layers has a fourth value of percentage of thickness, represented by the dashed lines. The third value of percentage change is +15%+/−5%. The fourth value of percentage change is −0.5%+/−0.25%. The minimum thickness of the thinnest layer is 10 nm+/−5 nm.

FIG. 19c shows how the waveguide of the eighth example provides acceptable transmissive performance at each of the three wavelengths. The solid line 1902 of FIG. 19c represents the ideal transmissive behaviour. The three dashed lines show the simulated transmissivity of the waveguide at three different wavelengths of electromagnetic radiation. The three wavelengths shown in FIG. 19c relate to blue 1904, green 1906 and red 1908 laser light, respectively.

Method of Manufacture

An advantage of the layered coating of the present disclosure is that it can be manufactured in an inexpensive, fast and reliable way. Herein, one example of such a method is disclosed. However, the skilled person will appreciate that other methods are possible.

The method comprises the steps of providing a waveguide substrate comprising a pair of parallel surfaces arranged to provide waveguiding therebetween; and applying a plurality of layers of a first dielectric and a plurality of layers of a second dielectric to the waveguide substrate such that the layers of first and second dielectric are in an alternating configuration.

An apparatus for performing the method comprises two sources of a first dielectric material (for example SiO2) and two sources of a second dielectric material (for example TiO2), a shadow mask comprising first to fourth trapezoidal apertures and a means for moving a waveguide substrate with respect to the shadow mask. Each aperture of the shadow mask is associated with a source of dielectric material. During manufacture of each layer, dielectric material from the one of the sources is configured to flow through one of the apertures of the shadow mask. A waveguide substrate is moved with respect to the shadow mask (or vice versa) such that the shadow mask is between the source and the waveguide substrate. The waveguide substrate passes under the aperture and a layer of dielectric material is formed on a surface of the waveguide substrate. This is shown in FIG. 19.

FIG. 20 is a schematic cross-sectional view of a portion of the apparatus for manufacturing a waveguide according to the present disclosure, the cross-section being in X-Y plane. The portion of the apparatus shown in FIG. 20 comprises a first source of SiO2 and a shadow mask 2004 comprising a first aperture 2006. A waveguide substrate 2008 (in the form of a glass or Perspex block or slab) is also shown. SiO2 material 2010 is configured to flow out of the first source 2002 and through the first aperture 2006 of the shadow mask 2004. The flow of material is in the negative Y direction. The shape of the first aperture 2006 determines the shape of the flow SiO2 downstream of the shadow mask 2004. FIG. 20 is not drawn to scale.

The means to move the waveguide substrate 2008 (not shown in drawings) is arranged to move the waveguide substrate 2008 in a first plane that is perpendicular to the Y direction such that the waveguide substrate 2008 passes under the first aperture 2006. In some embodiments, the motion is entirely in the X direction. However, in other embodiments the waveguide substrate 2008 may be rotated in the first plane such that the motion is in both an X direction and a Z direction.

In FIG. 20, the waveguide substrate 2008 has yet to pass under the first aperture 2006 and so no dielectric coating layer is present on the waveguide substrate 2008. As the waveguide substrate passes under the first aperture 2006 (in the X direction), dielectric coating is deposited on the substrate. Generally, in order to manufacture a complete layer, the waveguide substrate 2008 will need to pass under the first aperture 2006 multiple times until the desired thickness is achieved.

Once the first layer 2010 has been formed, the waveguide substrate 2008 will be moved under one of the sources of second dielectric material such that a second layer of (of second dielectric material) is formed on top of the first layer 2010 of first dielectric material.

Figure 21:
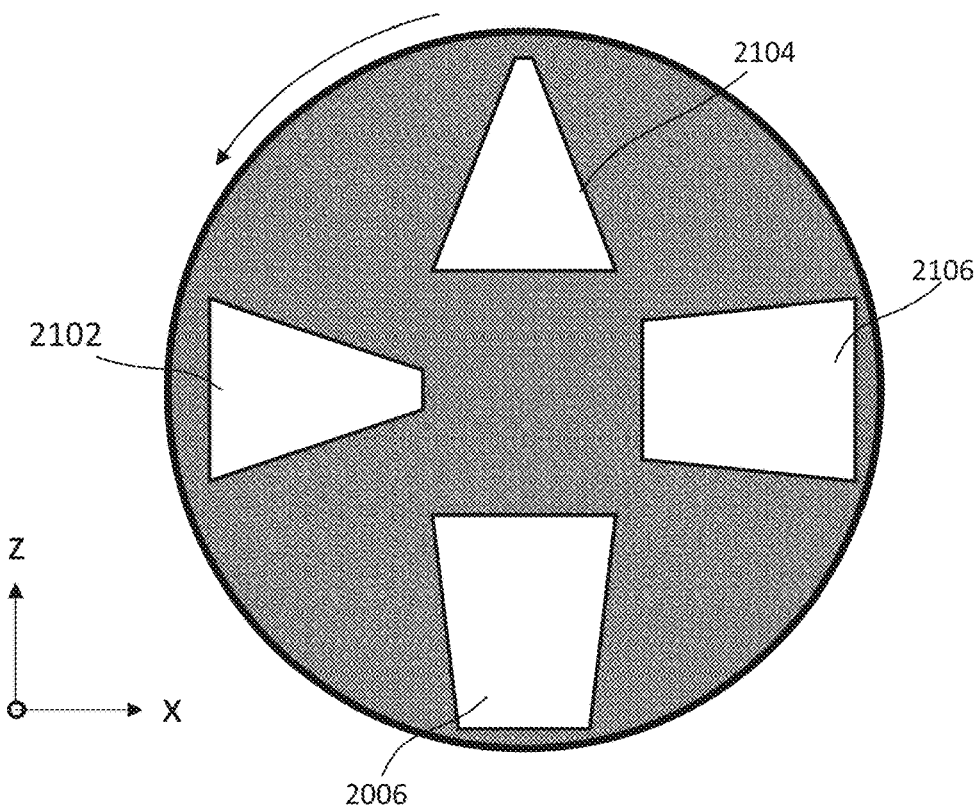
FIG. 21 is a schematic view of a shadow mask of the apparatus of FIG. 20 comprising four apertures, the cross-section being in a plane that is orthogonal to the plane of the cross-section of FIG. 20.

FIG. 21 is a schematic view of the shadow mask 2004, the view being taken in the X-Z plane (i.e. orthogonal to the plane of view of FIG. 20). The shadow mask comprises four apertures, the first aperture 2006 (described above), a second aperture 2102, a third aperture 2104 and a fourth aperture 2106. The first and third apertures 2006, 2104 are each connected to source(s) of the first dielectric material. The second and fourth aperture 2102 and 2106 are each connected to source(s) of the second dielectric material. Each of the apertures has a trapezoidal shape comprising a short base and a long base.

In order to manufacture subsequent alternating layers of the first and second dielectric material, the waveguide substrate 2008 is moved under different apertures in turn. The order of the layers can be controlled depending on the order of the apertures that the waveguide substrate 2008 is moved under. The waveguide substrate 2008 is rotated/moved with respect to the shadow mask 2004 in order to pass under different apertures such that the waveguide substrate 2008 is passed under the aperture in the X direction and such that short base and long base of the aperture spaced apart in the Z direction. In this way, the thickness of each deposited layer in the Z direction varies. A percentage change in the thickness of the layer from a first end to a second end (in the Z direction) will depend on the percentage change in width of the short base and the long base of the respective aperture. This is explained with reference to FIG. 21.

Figure 22A:
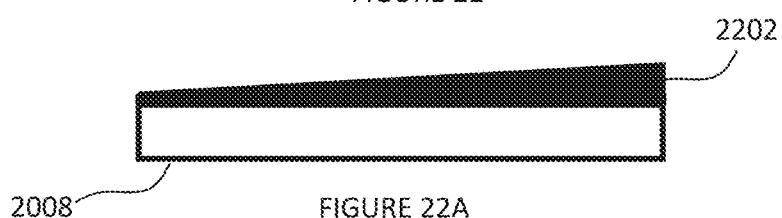
FIGS. 22A-D show cross-sectional schematic views of four different waveguide substrates each having a layer of dielectric material formed on a first surface using the mask of FIG. 21, wherein each layer has been formed using a different aperture of the mask.
Figure 22B:
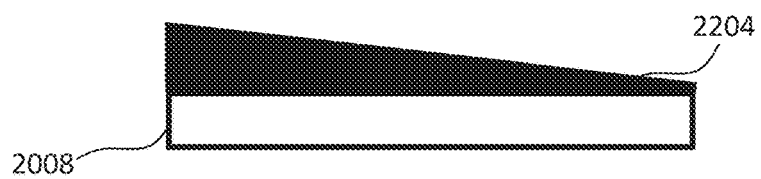
Figure 22C:
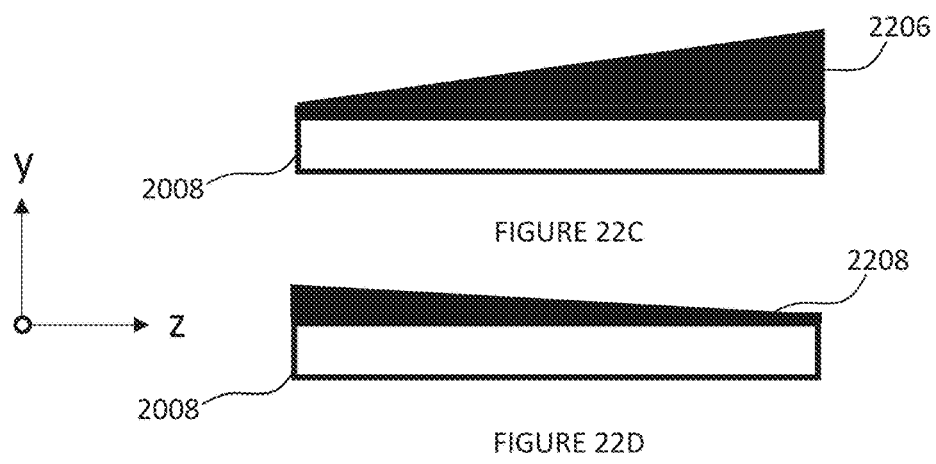
Figure 22D:
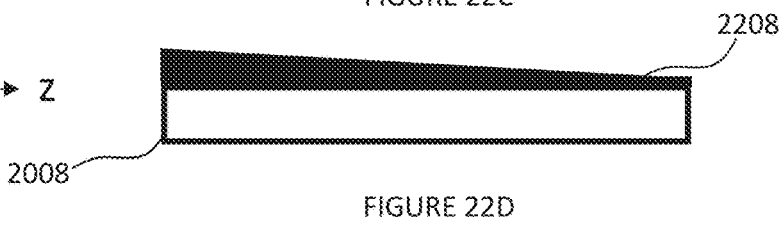

FIGS. 22a to 22d are each cross-sectional schematic views of four different first layers formed on a waveguide substrate 2008. FIG. 22a shows a layer 2202 formed when the waveguide substrate 2008 is passed under first aperture 2006. FIG. 22b shows a layer 2204 formed when the waveguide substrate 2008 is passed under second aperture 2102. FIG. 22c shows a layer 2206 formed when the waveguide substrate 2008 is passed under second aperture 2104. FIG. 22d shows a layer 2208 formed when the waveguide substrate 12008 is passed under second aperture 2106. As the skilled person will appreciate, the thickness profile of each of layers 2202 to 2208 corresponds to the shape of the respective aperture.

In particular, layers 2202 and 2206 have a positive gradient from left to right because the width of the apertures 2006 and 2104 increase in the Z direction of the waveguide substrate when the shadow mask and the waveguide substrate are rotated with respect to one another. The percentage change in thickness of the layer 2206 is greater than that of layer 2202 because the percentage change of the width of the short base to the long base of aperture 2104 is greater than aperture 2006. Layers 2204 and 2208 have a negative gradient from left to right because width of apertures 2102 and 2106 decrease in the Z direction when the shadow mask and the waveguide substrate are rotated with respect to one another. The percentage change in thickness of the layer 2204 is greater than that of layer 2208 because the percentage change of the width of the short base to the long base of aperture 2102 is greater than aperture 2106.

As will be appreciated, the arrangement of the shadow mask 2004 with four differently shaped apertures and with two apertures connected to a first dielectric material source and two apertures connected to a second dielectric material source provides a means for manufacturing a plurality of layers of a first dielectric and a plurality of layers of second dielectric arranged in an alternating configuration. Each layer of the first dielectric will have a percentage change in thickness equal to either a first value or a second value, wherein all layers having the first value are related to, for example, the first aperture 2006 and all layers having the second value are related to, for example, the second aperture 2102. Each layer of the second dielectric will have a percentage change in thickness equal to either a first value or a second value, wherein all layers having the third value are related to, for example, the third aperture 2104 and all layers having the second value are related to, for example, the fourth aperture 2106. In other words, a means for manufacturing a layered coating according to the present disclosure is provided.

The advantages of this method of manufacture are that the waveguide substrate can quickly and simply be moved/rotated to pass under the apertures of the shadow mask 2004 as necessary to build up a plurality of alternating layers of the first and second dielectric material, as necessary. The number of unique masks having a different shape governs the number of discrete values for the percentage change in thickness of layers that are available and so the percentage change in thickness of any particular layer can be controlled simply by selecting the aperture order. The absolute thickness of any layer can be controlled by either controlling the speed at which the waveguide substrate passes under a particular shadow mask 2004 or be controlling the material flow speed.

It should be understood that the manufacturing method disclosed herein is not restricted to their being four apertures and two sources of dielectric material. For example increasing or decreasing the number of differently shaped masks will simply have the effect of increasing or decreasing the discrete number of allowable percentage change in thickness values of layers available.

Tenth Example

Figure 23A:
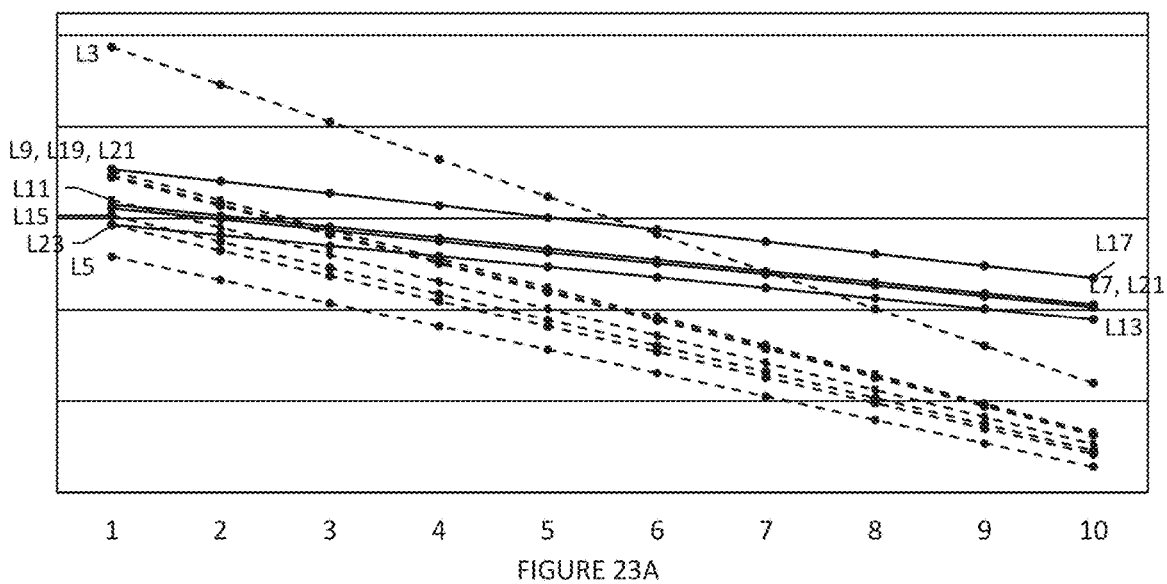
Figure 23B:
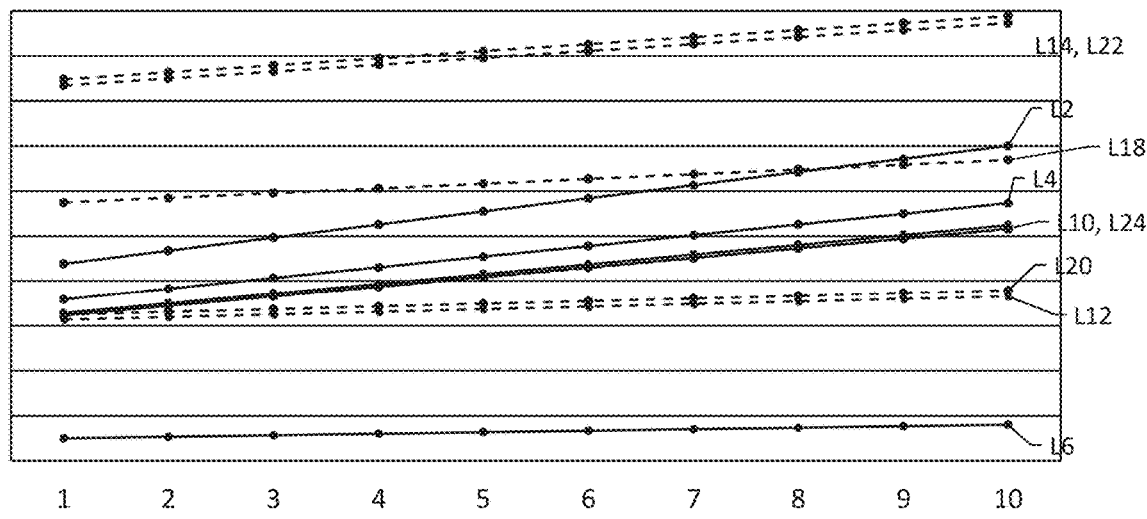
Figure 23C:
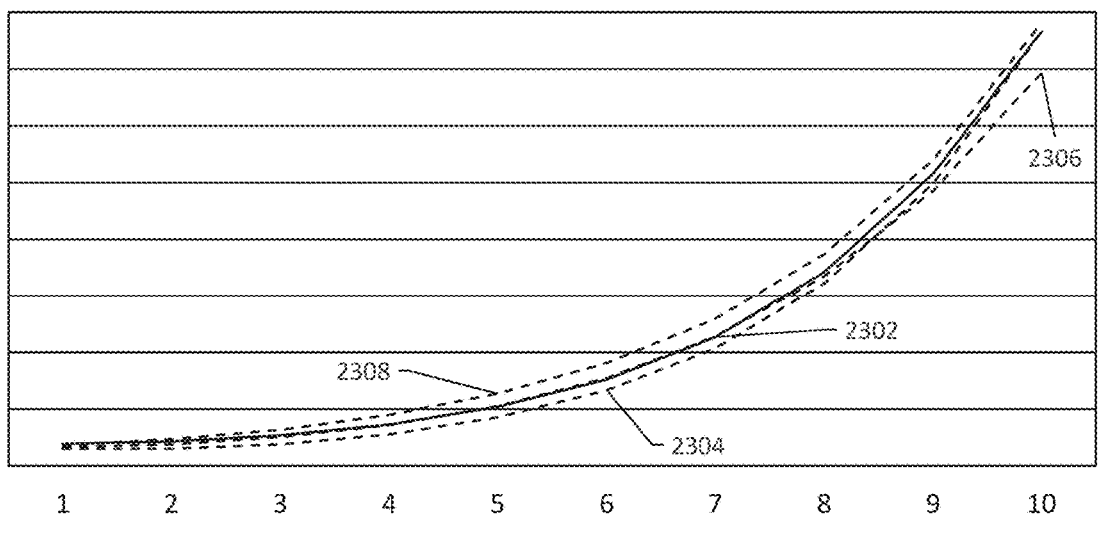

FIGS. 23a to 23c relate to a tenth real example of a coating according to the invention of the present disclosure. The coating of this seventh example comprises 24 alternating layers of SiO2 and Si3N4. The layers are numbered from 1 to 24 such that light emitted from the waveguide passes through each of layers 1 to 24 sequentially. The odd numbered layers (layers L1, L3, L5, L7, L9, L11, L13, L15, L17, L19, L21 and L23) are layers of SiO2. The even numbered layers (layer L2, L4, L6, L8, L10, L12, L14, L16, L18, L20, L22 and L24) are layers of Si3N4. FIG. 23a shows the SiO2 layers (i.e. the odd numbered layers). FIG. 23b shows the Si3N4 layers (i.e. the even numbered layers).

A first subset of the layers of FIG. 23a has a first value of percentage change of thickness, represented by the continuous lines. A second subset of the layers has a second value of percentage change of thickness, represented by the dashed lines. The first value of percentage change is −60%+/−10%. The second value of percentage change is −25%+/−5%.

A first subset of the layers of FIG. 23b has a third value of percentage change of thickness, represented by the continuous lines. A second subset of the layers has a fourth value of percentage of thickness, represented by the dashed lines. The third value of percentage change is +60%+/−10%. The fourth value of percentage change is 15%+/−2%.

FIG. 23c shows how the waveguide of the tenth example provides acceptable transmissive performance at each of the three wavelengths. The solid line 2302 of FIG. 23c represents the ideal transmissive behaviour. The three dashed lines show the simulated transmissivity of the waveguide at three different wavelengths of electromagnetic radiation. The three wavelengths shown in FIG. 23c relate to blue 2304, green 2306 and red 2308 laser light, respectively.

Eleventh Example

Figure 24A:
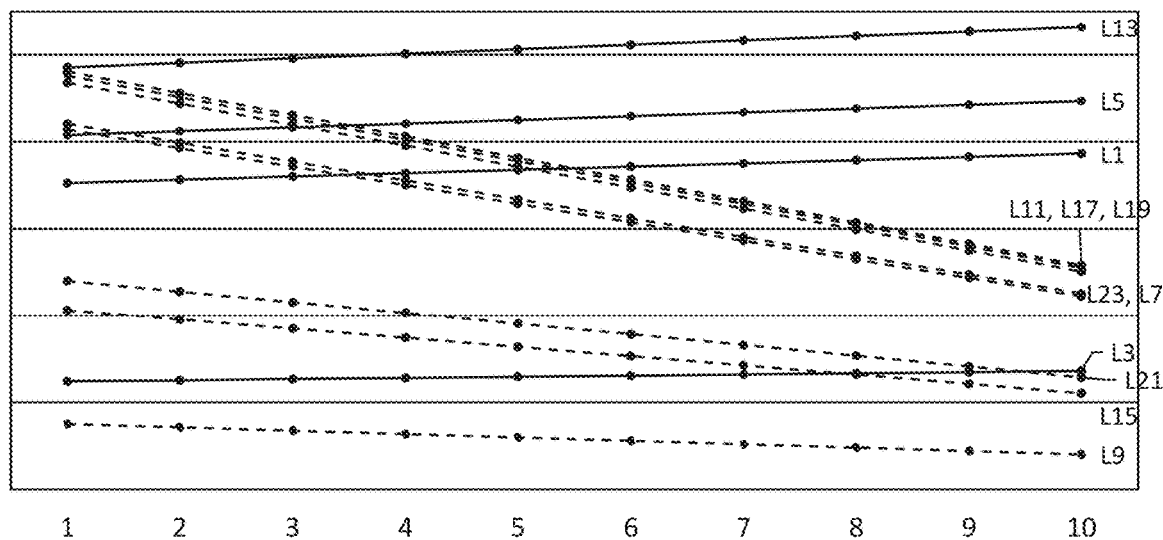
Figure 24B:
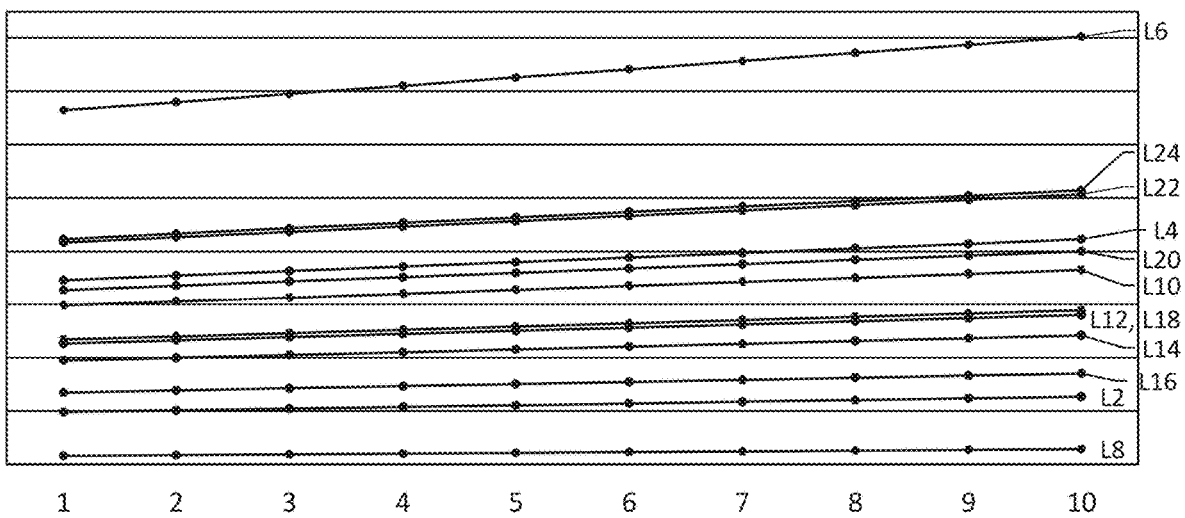
Figure 24C:
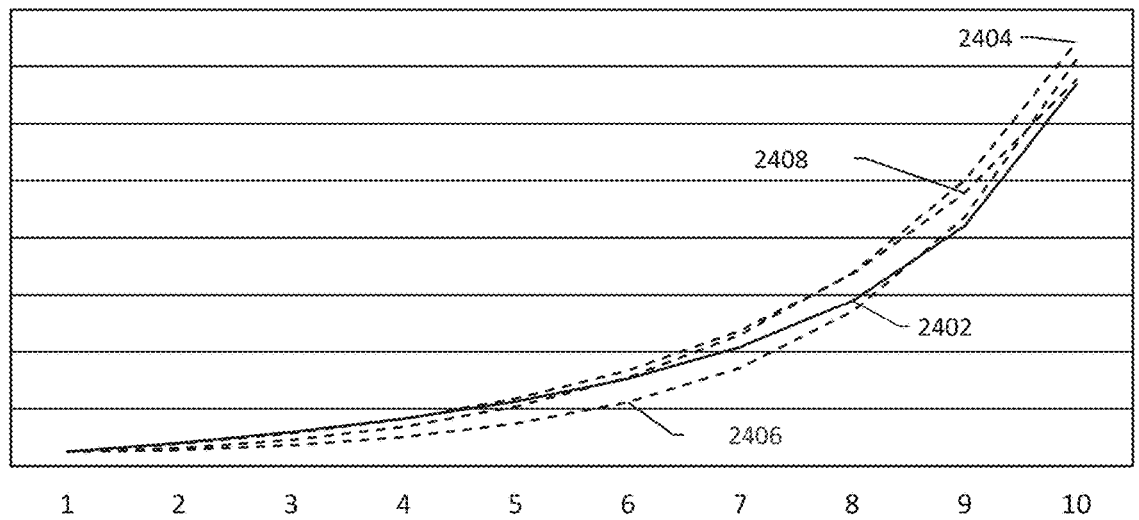

FIGS. 24a to 24c relate to a tenth real example of a coating according to the invention of the present disclosure. The coating of this seventh example comprises 24 alternating layers of SiO2 and TiO2. The layers are numbered from 1 to 24 such that light emitted from the waveguide passes through each of layers 1 to 24 sequentially. The odd numbered layers (layers L1, L3, L5, L7, L9, L11, L13, L15, L17, L19, L21 and L23) are layers of SiO2. The even numbered layers (layer L2, L4, L6, L8, L10, L12, L14, L16, L18, L20, L22 and L24) are layers of TiO2. FIG. 24a shows the SiO2 layers (i.e. the odd numbered layers). FIG. 24b shows the TiO2 layers (i.e. the even numbered layers).

A first subset of the layers of FIG. 24a has a first value of percentage change of thickness, represented by the continuous lines. A second subset of the layers has a second value of percentage change of thickness, represented by the dashed lines. The first value of percentage change is 10%+/−1%. The second value of percentage change is −50%+/−5%.

All of the layers of FIG. 24b have a third value of percentage change of thickness, represented by continuous lines. The third value of percentage change is +20%+/−2%. So, the tenth example differs from the previous examples, in that the there are three different (discrete) percentage of thicknesses of the layers, rather than four.

FIG. 24c shows how the waveguide of the eleventh example provides acceptable transmissive performance at each of the three wavelengths. The solid line 2402 of FIG. 24c represents the ideal transmissive behaviour. The three dashed lines show the simulated transmissivity of the waveguide at three different wavelengths of electromagnetic radiation. The three wavelengths shown in FIG. 24c relate to blue 2404, green 2406 and red 2408 laser light, respectively.

Twelfth Example

Figure 25A:
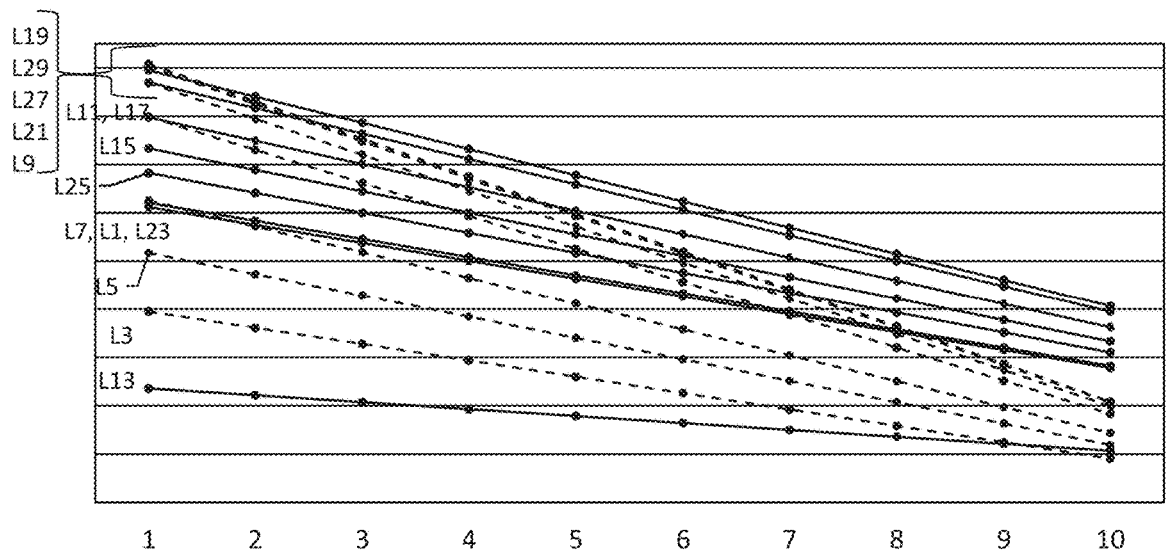
FIGS. 25A-C show graphs related to an Twelfth Example of a waveguide according to the present disclosure comprising 30 alternating layers of SiO2 and Nb2O5 in which FIGS. 25A and 25B respectively show the thickness of the SiO2 and Nb2O5 layers and FIG. 25C shows the transmissivity of a first surface of the waveguide of the Twelfth Example compared to the ideal transmissivity at red, green and blue wavelengths for which the waveguide has been designed.
Figure 25B:
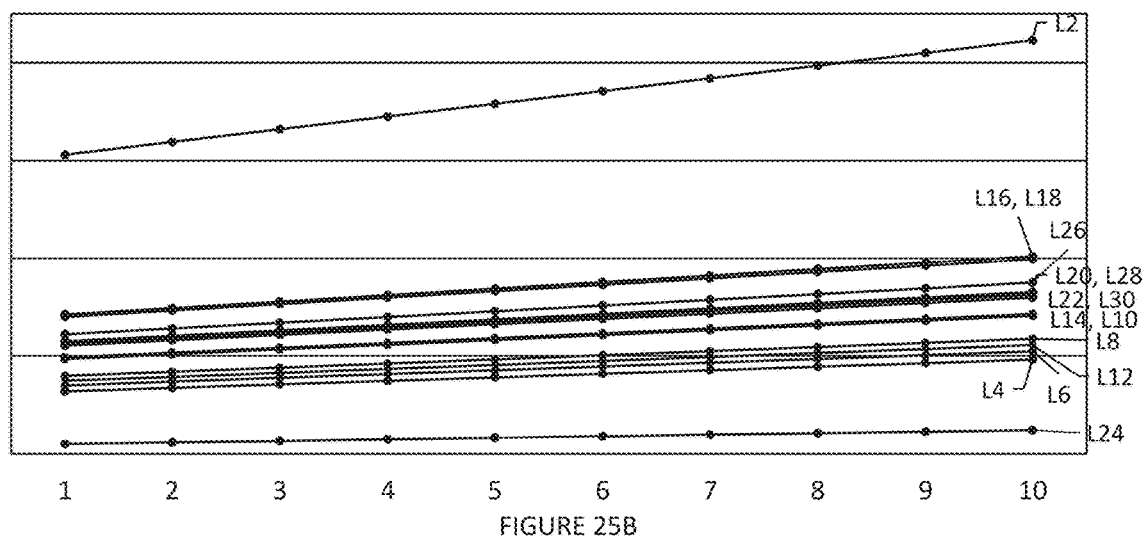
Figure 25C:
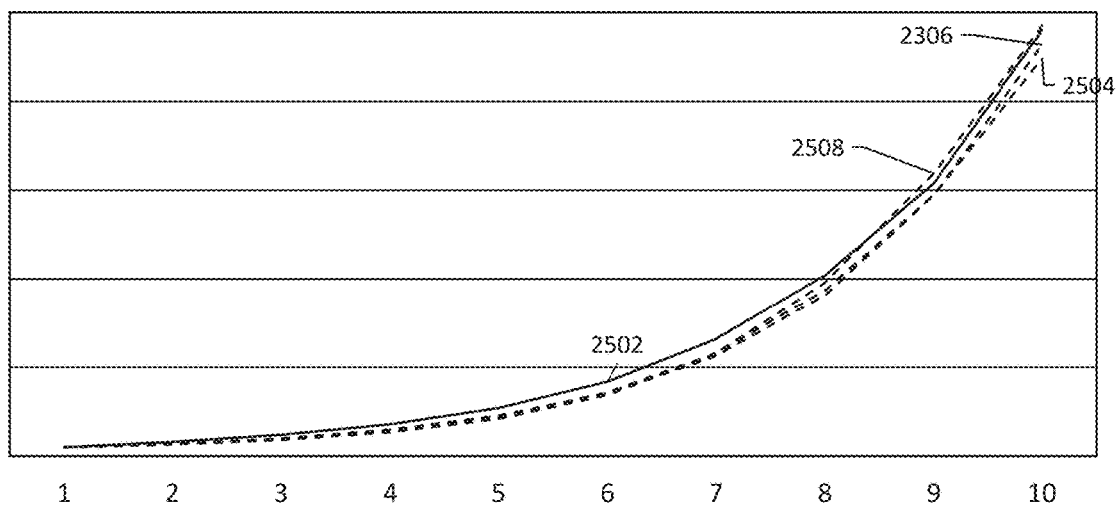

FIGS. 25a to 25c relate to a tenth real example of a coating according to the invention of the present disclosure. The coating of this seventh example comprises 30 alternating layers of SiO2 and Nb2O5. The layers are numbered from 1 to 24 such that light emitted from the waveguide passes through each of layers 1 to 24 sequentially. The odd numbered layers (layers L1, L3, L5, L7, L9, L11, L13, L15, L17, L19, L21, L23, L25, L27 and L29) are layers of SiO2. The even numbered layers (layer L2, L4, L6, L8, L10, L12, L14, L16, L18, L20, L22, L24, L26, L28 and L30) are layers of Nb2O5. FIG. 25a shows the SiO2 layers (i.e. the odd numbered layers). FIG. 25b shows the NbO5 (i.e. the even numbered layers).

A first subset of the layers of FIG. 25a has a first value of percentage change of thickness, represented by the continuous lines. A second subset of the layers has a second value of percentage change of thickness, represented by the dashed lines. The first value of percentage change is −55%+/−5%. The second value of percentage change is −80%+/−5%.

All of the layers of FIG. 25b have a third value of percentage change of thickness, represented by continuous lines. The third value of percentage change is +35%+/−5%. So, the twelfth example is another example comprising three different (discrete) percentage of thicknesses of the layers.

FIG. 25c shows how the waveguide of the twelfth example provides acceptable transmissive performance at each of the three wavelengths. The solid line 2502 of FIG. 25c represents the ideal transmissive behaviour. The three dashed lines show the simulated transmissivity of the waveguide at three different wavelengths of electromagnetic radiation. The three wavelengths shown in FIG. 25c relate to blue 2504, green 2506 and red 2508 laser light, respectively.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the detector is a photodetector such as a photodiode. In some embodiments, the light receiving surface is a diffuser surface or screen such as a diffuser. The holographic projection system of the present disclosure may be used to provide an improved head-up display (HUD). In some embodiments, there is provided a vehicle comprising the display system installed in the vehicle to provide a HUD. The vehicle may be an automotive vehicle such as a car, truck, van, lorry, motorcycle, train, airplane, boat, or ship.

The quality of a holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some arrangements describe 2D holographic reconstructions by way of example only. In other arrangements, the holographic reconstruction is a 3D holographic reconstruction. That is, in some arrangements, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A waveguide comprising a pair of complementary surfaces arranged to provide waveguiding therebetween, wherein a first surface of the pair of complementary surfaces comprises a plurality of first layers, each first layer comprising a first dielectric, and a plurality of second layers, each second layer comprising a second dielectric, wherein each first and second layer has a first end and a second end, wherein a percentage change in the thickness of each layer from the first end to the second end of that layer has one of a plurality of discrete allowable values; wherein the total number of first and second layers is greater than the total number of discrete allowable values; and wherein a difference in refractive index between the first dielectric and second dielectric is greater than 0.4.

2. The waveguide as claimed in claim 1, wherein the plurality of discrete allowable values consists of between two and six discrete values.

3. The waveguide as claimed in claim 1, wherein the plurality of discrete allowable values comprises a first value, a second value and a third value, and wherein each layer of the first dielectric has a percentage change in thickness equal to either the first value or the second value and wherein at least one layer of the second dielectric has percentage change in thickness equal to the third value.

4. The waveguide as claimed in claim 1, wherein the plurality of discrete allowable values comprises a first to fourth value, and wherein each layer of the second dielectric has a percentage change in thickness equal to either the third value or the fourth value.

5. The waveguide as claimed in claim 1, wherein a rate of change of the thickness of each layer of the first and second dielectric is constant.

6. The waveguide as claimed claim 1, wherein the first surface is partially reflective-transmissive and/or a second surface of the pair of complimentary surfaces is substantially fully reflective and wherein the first surface provides a plurality, n, of light emission zones for light waveguided between the first surface and second surface.

7. The waveguide as claimed in claim 6, wherein the transmissivity of the first surface at a first, second and third visible wavelength increases with distance from the first light emission zone to the nth light emission zone in order to maintain the intensity of the plurality of light emissions substantially constant at the first, second and third wavelength.

8. The waveguide as claimed in claim 7, wherein the first wavelength is in the range 630-670 nm, the second wavelength is in the range 500-540 nm and the third wavelength is in the range 430-470 nm.

9. The waveguide as claimed in claim 7, wherein the transmissivity of the first surface at each emission point, T(n), satisfies the following equation:

$$T(n) = \frac{T(n-1)}{[1 - T(n-1)] \times [1 - L]}$$

wherein L is an optical loss factor of the waveguide material.

10. The waveguide as claimed in claim 1, wherein the first dielectric is a first oxide, fluoride, sulfide or nitrate of a first transition metal or semiconductor and the second dielectric is a second oxide, fluoride, sulfide or nitrate of a second transition metal or semiconductor.

11. The waveguide as claimed in claim 1, wherein each layer has a thickness in the range 2 to 300 nm.

12. The waveguide as claimed in claim 1, wherein at least one of the first to fourth values of the ratio is positive and at least one of the first to fourth values of the percentage change in thickness.

13. The waveguide as claimed in claim 1, wherein each of the first to fourth values for the percentage change in thickness is in the range −150% to +150%.

14. The waveguide as claimed in claim 1, wherein the percentage change in thickness of the respective layer is at least one of: a percentage change in a physical thickness or a percentage in an optical thickness.

15. The waveguide as claimed in claim 1, wherein the first surface provides a plurality, n, of light emission zones for light waveguided between the first surface and second surface.

16. A holographic system comprising:
a display device arranged to display a hologram of an image and to output spatially modulated light in accordance with the hologram;
a first waveguide arranged to receive the light encoded with the hologram output by the display device at a second surface of the pair of complimentary surfaces; and
a second waveguide arranged to receive light waveguided by the first waveguide,
wherein the first waveguide is a waveguide according to claim 1.

17. The holographic system as claimed in claim 16, wherein the first surface of the first waveguide is arranged to provide a plurality, n, of light emission zones for light waveguided between the first surface and second surface and the second surface of the second waveguide is arranged to receive light from the n light emission zones of the first waveguide.

18. A holographic system comprising:
a display device arranged to display a hologram of an image and to output spatially modulated light in accordance with the hologram;
a first waveguide arranged to receive the light encoded with the hologram output by the display device at a second surface of the pair of complimentary surfaces; and
a second waveguide arranged to receive light waveguided by the first waveguide,
wherein each of the first waveguide and the second waveguide is a waveguide according to claim 1.

19. The holographic system as claimed in claim 18, wherein the second waveguide is planar and wherein the first and second surfaces are major surfaces of the planar second waveguide.

20. A method of waveguiding a light field, the method comprising directing light into a first waveguide, the first waveguide being a waveguide according to claim 1, and guiding the light by internal reflection between the pair of complementary surfaces of the first waveguide.

21. A holographic system comprising:
a display device arranged to display a hologram of an image and to output spatially modulated light in accordance with the hologram;
a first waveguide arranged to receive the light encoded with the hologram output by the display device at a second surface of the pair of complimentary surfaces;
wherein a first surface of the pair of complimentary surfaces comprises a plurality of first layers of a first dielectric and a plurality of second layers of a second dielectric, wherein each first and second layer has a first end and a second end, wherein a percentage change in the thickness of each layer from the first end to the second end of that layer has one of a plurality of discrete allowable values; wherein the total number of first and second layers is greater than the total number of discrete allowable values; and wherein a difference in refractive index between the first dielectric and second dielectric is greater than 0.4.

22. The holographic system as claimed in claim 21, wherein the first waveguide is elongated and wherein the first and second surfaces are elongated surfaces.

23. A method of providing a waveguide, the method comprising:
providing a waveguide substrate comprising a pair of complimentary surfaces arranged to provide waveguiding therebetween; and
applying a plurality of layers of a first dielectric and a plurality of layers of a second dielectric to the waveguide substrate such that the layers of first and second dielectric are in an alternating configuration;
wherein a first surface of the pair of complimentary surfaces comprises a plurality of layers of a first dielectric and a plurality of layers of second dielectric arranged in an alternating configuration, wherein each layer of the first and second dielectric has a first end and a second end, wherein a percentage change in the thickness of each layer from the first end to the second end of that layer has one of a plurality of discrete allowable values; wherein the total number of layers of the first and second dielectric is greater than the total number of discrete allowable values; and wherein a difference in refractive index between the first dielectric and second dielectric is greater than 0.4.

* * * * *